US012583607B2

(12) United States Patent　　(10) Patent No.:　US 12,583,607 B2
Anderson et al.　　　　　　　　(45) Date of Patent:　　Mar. 24, 2026

(54) SIMULTANEOUS AIR COOLING OF MULTIPLE ELEMENTS OF A HYBRID POWERPLANT

(71) Applicant: VerdeGo Aero, Inc., De Leon Springs, FL (US)

(72) Inventors: Richard Pat Anderson, De Leon Springs, FL (US); David N. Spitzer, Port Orange, FL (US); Mark Ricklick, Port Orange, FL (US); Austin Cassels, Daytona Beach, FL (US); Eric Richard Bartsch, Wilmette, IL (US)

(73) Assignee: VerdeGo Aero, Inc., Daytona Beach, FL (US)

( * ) Notice: Subject to any disclaimer, the term of this patent is extended or adjusted under 35 U.S.C. 154(b) by 0 days.

(21) Appl. No.: 18/370,213

(22) Filed: Sep. 19, 2023

(65) Prior Publication Data

US 2024/0002066 A1　　Jan. 4, 2024

Related U.S. Application Data

(63) Continuation of application No. PCT/US2022/020602, filed on Mar. 16, 2022.
(Continued)

(51) Int. Cl.
　B64D 33/08　　　(2006.01)
　B64D 27/02　　　(2006.01)
　(Continued)

(52) U.S. Cl.
　CPC ............. B64D 33/08 (2013.01); B64D 27/33 (2024.01); B64D 35/024 (2024.01); B64D 27/026 (2024.01)

(58) Field of Classification Search
　CPC ...... B64D 27/02; B64D 27/026; B64D 33/08; B64D 2221/00
　(Continued)

(56) References Cited

U.S. PATENT DOCUMENTS

| | | | |
|---|---|---|---|
| 5,045,027 A | 9/1991 | Larsen | |
| 5,255,733 A | 10/1993 | King | |
(Continued)

FOREIGN PATENT DOCUMENTS

| | | |
|---|---|---|
| CN | 101075768 A | 11/2007 |
| CN | 107476837 A | 12/2017 |
(Continued)

OTHER PUBLICATIONS

International Search Report and Written Opinion of international application No. PCT/NL2023/050229, mailed Sep. 15, 2023, 18 pp.
(Continued)

*Primary Examiner* — Brady W Frazier
(74) *Attorney, Agent, or Firm* — Greenberg Traurig, LLP

(57)　　　　　ABSTRACT

An aerospace hybrid powertrain system includes an engine, a power shaft, and an electric machine having the power shaft therein or passing therethrough. The aerospace hybrid powertrain system further includes a fan, impeller, or blower connected to the power shaft and configured to direct air toward components of at least one of the engine or the electric machine. The fan, impeller, or blower may further be configured to direct air toward cooling elements such as heat exchangers or finned heat sinks arranged to cool the components of at least one of the piston combustion engine or the electric machine.

28 Claims, 31 Drawing Sheets

Related U.S. Application Data

(60) Provisional application No. 63/280,568, filed on Nov. 17, 2021, provisional application No. 63/163,165, filed on Mar. 19, 2021.

(51) Int. Cl.
    B64D 27/33      (2024.01)
    B64D 35/024      (2025.01)

(58) Field of Classification Search
    USPC ........................................................ 244/57
    See application file for complete search history.

(56) References Cited

U.S. PATENT DOCUMENTS

| | | | |
|---|---|---|---|
| 5,939,800 | A | 8/1999 | Artinian |
| 6,340,289 | B1 | 1/2002 | Vos |
| 8,324,746 | B2 | 12/2012 | Bradbrook |
| 8,365,510 | B2 | 2/2013 | Lugg |
| 8,446,060 | B1 | 5/2013 | Lugg |
| 8,544,575 | B1 | 10/2013 | Scaringe |
| 8,636,241 | B2 | 1/2014 | Lugg |
| 8,814,081 | B2 | 8/2014 | Gagne |
| 9,102,326 | B2 | 8/2015 | Anderson |
| 9,174,741 | B2 | 11/2015 | Suntharalingam |
| 9,193,451 | B2 | 11/2015 | Salyer |
| 9,493,245 | B2 | 11/2016 | Salyer |
| 9,638,199 | B2* | 5/2017 | Beers ...................... F04D 19/00 |
| 9,828,110 | B2 | 11/2017 | Roques |
| 9,878,796 | B2 | 1/2018 | Sheridan |
| 10,173,784 | B2 | 1/2019 | Stewart |
| 10,384,774 | B2 | 8/2019 | Vondrell |
| 10,392,120 | B2 | 8/2019 | Niergarth |
| 10,435,169 | B2 | 10/2019 | Steinwandel |
| 10,633,104 | B2 | 4/2020 | Miller |
| 10,822,101 | B2 | 11/2020 | Murrow |
| 11,053,019 | B2 | 7/2021 | Mackin |
| 12,095,125 | B2 | 9/2024 | Holland |
| 2004/0104578 | A1 | 6/2004 | Wurtele |
| 2007/0089411 | A1 | 4/2007 | Leistner |
| 2008/0184906 | A1 | 8/2008 | Kejha |
| 2009/0023494 | A1 | 1/2009 | Colletti |
| 2009/0133666 | A1 | 5/2009 | Thomas |
| 2009/0293494 | A1 | 12/2009 | Hoffjann |
| 2010/0000226 | A1 | 1/2010 | Rensch |
| 2010/0219779 | A1 | 9/2010 | Bradbrook |
| 2012/0122631 | A1* | 5/2012 | Galivel ................... F02C 7/268 |
| | | | 477/15 |
| 2012/0227389 | A1 | 9/2012 | Hinderks |
| 2013/0022443 | A1* | 1/2013 | Beers ...................... F04D 25/06 |
| | | | 415/143 |
| 2013/0028751 | A1 | 1/2013 | Rai |
| 2013/0113219 | A1 | 5/2013 | Honkanen |
| 2014/0010652 | A1 | 1/2014 | Suntharalingam |
| 2016/0031564 | A1 | 2/2016 | Yates |
| 2016/0176533 | A1 | 6/2016 | Cazals |
| 2016/0245163 | A1 | 8/2016 | Lamarre |
| 2017/0203839 | A1 | 7/2017 | Giannini |
| 2017/0226934 | A1 | 8/2017 | Robic |
| 2017/0297679 | A1 | 10/2017 | Elliott |
| 2017/0297743 | A1 | 10/2017 | Tindall |
| 2018/0003072 | A1 | 1/2018 | Lents |
| 2018/0050807 | A1 | 2/2018 | Kupiszewski |
| 2018/0051702 | A1 | 2/2018 | Kupiszewski |
| 2018/0051716 | A1 | 2/2018 | Cheung |
| 2018/0163558 | A1 | 6/2018 | Vondrell |
| 2018/0257776 | A1 | 9/2018 | Phan |
| 2018/0291807 | A1 | 10/2018 | Dalal |
| 2019/0034898 | A1 | 1/2019 | Berkowitz |
| 2019/0135408 | A1 | 5/2019 | Moore |
| 2019/0264617 | A1 | 8/2019 | Barmichev |
| 2019/0276142 | A1 | 9/2019 | Przybyla |
| 2019/0322382 | A1 | 10/2019 | Mackin |
| 2019/0323427 | A1 | 10/2019 | Mackin |
| 2019/0344898 | A1 | 11/2019 | Scothern |
| 2020/0010208 | A1 | 1/2020 | Peace |
| 2020/0017229 | A1 | 1/2020 | Steinert |
| 2020/0130534 | A1 | 4/2020 | Julien |
| 2020/0140079 | A1 | 5/2020 | Campbell |
| 2020/0164992 | A1 | 5/2020 | Tamada |
| 2020/0290742 | A1 | 9/2020 | Kumar |
| 2020/0340406 | A1 | 10/2020 | Maljean |
| 2020/0385139 | A1* | 12/2020 | Verna ..................... H02K 11/33 |
| 2021/0078700 | A1 | 3/2021 | Klemen |
| 2021/0310412 | A1 | 10/2021 | Williams |
| 2021/0387723 | A1 | 12/2021 | Moon |
| 2022/0093948 | A1 | 3/2022 | Holland |

FOREIGN PATENT DOCUMENTS

| | | |
|---|---|---|
| CN | 107701318 B | 6/2020 |
| EP | 3199791 A1 | 8/2017 |
| EP | 2226487 B1 | 12/2018 |
| GB | 2587669 A | 4/2021 |
| KR | 101797011 B1 | 11/2017 |
| WO | 2018041876 A1 | 3/2018 |
| WO | 2020079369 A1 | 4/2020 |
| WO | 2020240134 A1 | 12/2020 |
| WO | 2021058329 A1 | 4/2021 |

OTHER PUBLICATIONS

International Search Report and Written Opinion of international application No. PCT/US2023/010956, dated Jun. 23, 2023, 14 pp.

Enstrom 280-280C Maintenance Manual, Copyright 1977, Enstrom Helicopter Corporation, Menominee, MI 49858, 451 pgs. (Uploaded in two parts).

Enstrom F-28A Maintenance Manual, Copyright 1972, Enstrom Corporation, Menominee, MI U.S.A., 373 pgs. (Uploaded in three parts).

International Search Report and Written Opinion from international application No. PCT/US22/20602, mailed Jun. 15, 2022, 22 pp.

Robinson Helicopter Company, R22 Maintenance Manual and Instructions for Continued Airworthiness, RTR 060 vol. 1, 706 pgs. (Uploaded in ten parts).

International Search Report and Written Opinion of international application No. PCT/US23/66329, dated Jan. 12, 2024, 15 pp.

"Classifications of Aircraft Engines" (Mutib) Mar. 2020 (Mar. 2020) (online] retrieved from <URL: https://enj.atu.edu.iqlwp-contentluploads/2020/03/Classifications of-Aircralt-Engines-Copy.pdf> entire document, 20 pp.

International Search Report and Written Opinion issued in appl. No. PCT/US22/17379, dated May 18, 2022, 14 pgs.

International Search Report and Written Opinion issued in appl. No. PCT/US22/17383, dated Sep. 23, 2022, 13 pgs.

White, Warren N. et al., Active Control of Wind Turbine Rotor Torsional Vibration, Proceedings of the ASME 2013 Dynamic Systems and Control Conference, DSCC2013, Oct. 21-23, 2013, Palo Alto, CA, USA, 9 pgs.

Youtube video: TEDxDirigo—Richard Lugg—Hybrid Engines in Aerospace—YouTube available at https://www.youtube.com/watch?v=eEyvpYppF_ c, 2 pp.

Non-final Office Action from U.S. Appl. No. 18/236,349, dated Jul. 24, 2024, 17 pp.

International Preliminary Report on Patentability from application No. PCT/NL2023/050229, dated Nov. 7, 2024, 10 pp.

Extended European Search Report from application No. 22763777. 4, dated Jan. 15, 2025, 11 pp.

Extended European Search Report from application No. 22757136. 1, dated Jan. 15, 2025, 12 pp.

Extended Search Report from European application No. 22772153. 7, dated Jan. 29, 2025, 15 pp.

Non-final Office Action from U.S. Appl. No. 18/236,363, dated Dec. 4, 2024, 10 pp.

Final Office Action from U.S. Appl. No. 18/236,949, dated Jan. 6, 2025, 24 pp.

Final Office Action from U.S. Appl. No. 18/236,363, dated Jul. 29, 2025, 10 pp.

(56)         References Cited

OTHER PUBLICATIONS

Non-final Office Action from U.S. Appl. No. 18/236,349, dated Jul. 17, 2025, 24 pp.
Final Office Action in U.S. Appl. No. 18/771,463, dated Aug. 3, 2025, 25 pp.
Final Office Action from U.S. Appl. No. 18/927,784, dated Sep. 17, 2025, 13 pp.

* cited by examiner

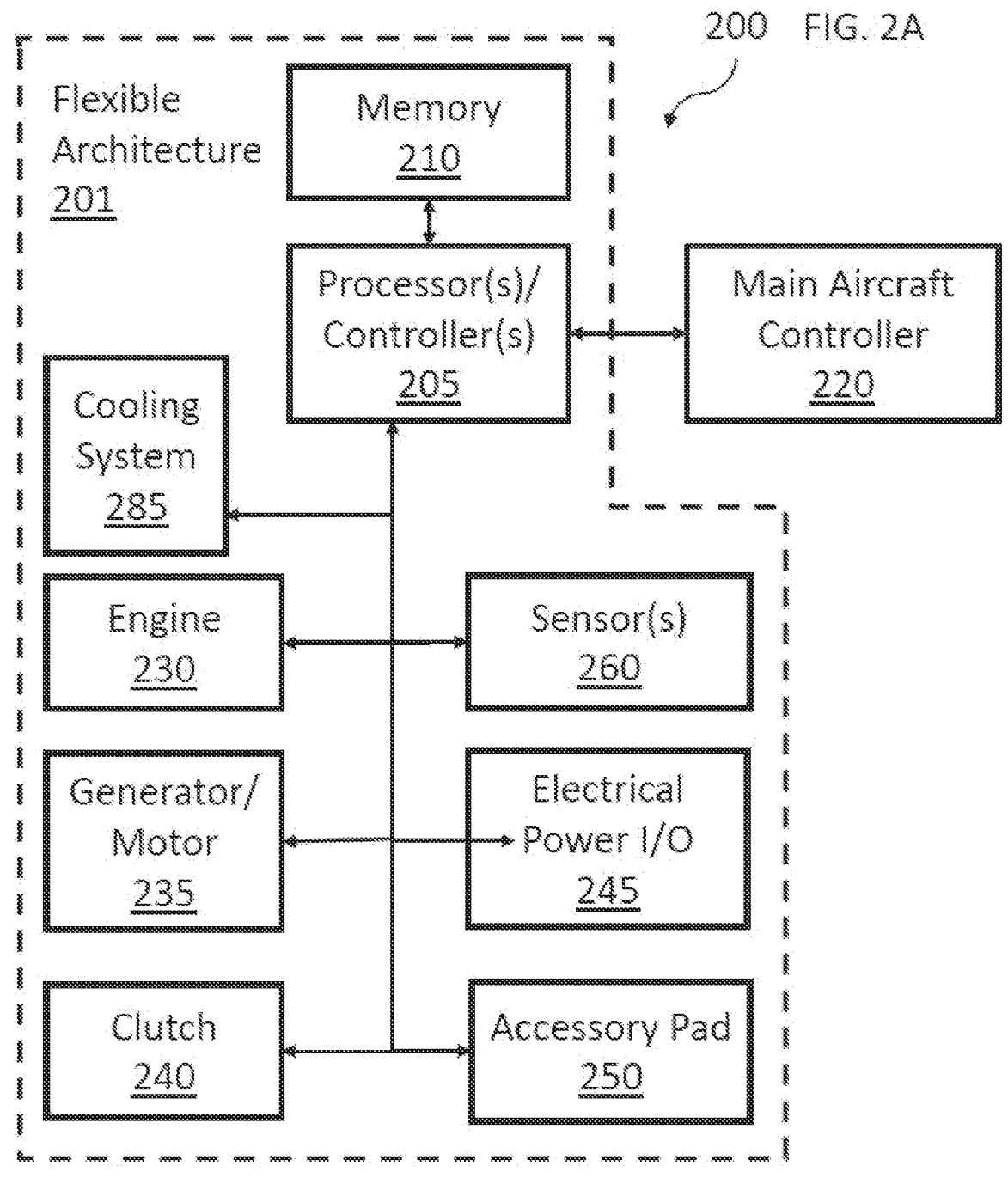
200   FIG. 2A

275

600 —⬎

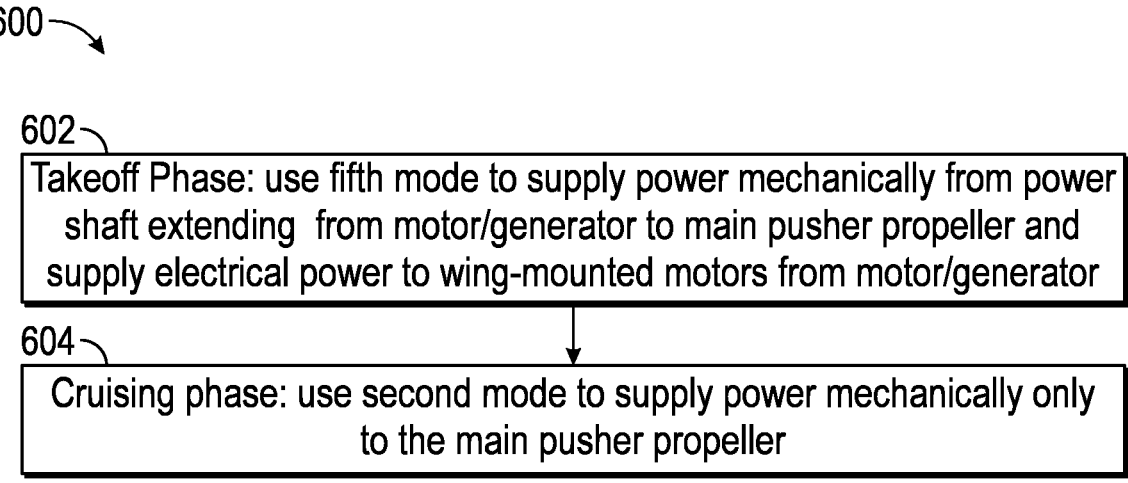

602 —⬎

Takeoff Phase: use fifth mode to supply power mechanically from power shaft extending  from motor/generator to main pusher propeller and supply electrical power to wing-mounted motors from motor/generator

604 —⬎

Cruising phase: use second mode to supply power mechanically only to the main pusher propeller

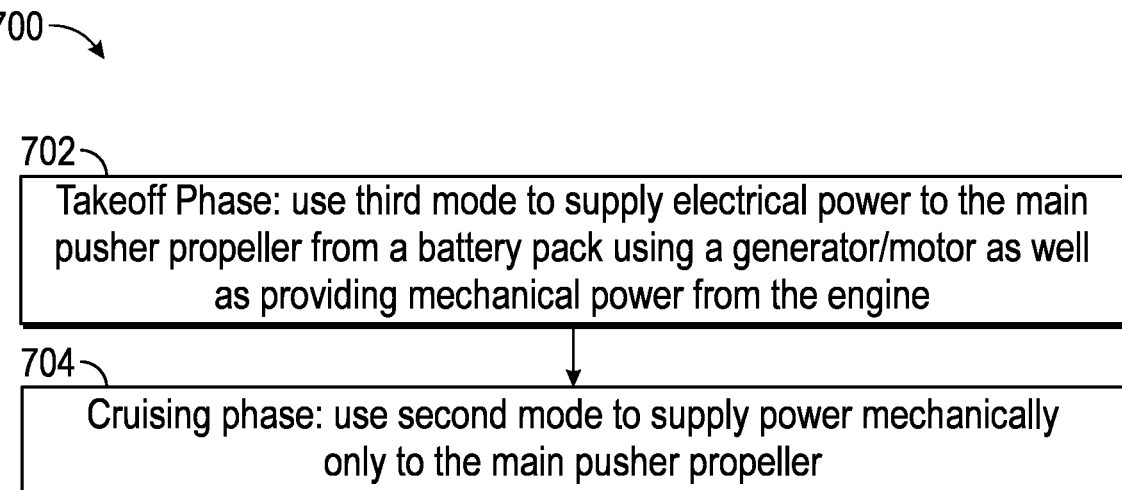

702 —⬎

Takeoff Phase: use third mode to supply electrical power to the main pusher propeller from a battery pack using a generator/motor as well as providing mechanical power from the engine

704 —⬎

Cruising phase: use second mode to supply power mechanically only to the main pusher propeller

FIG. 7

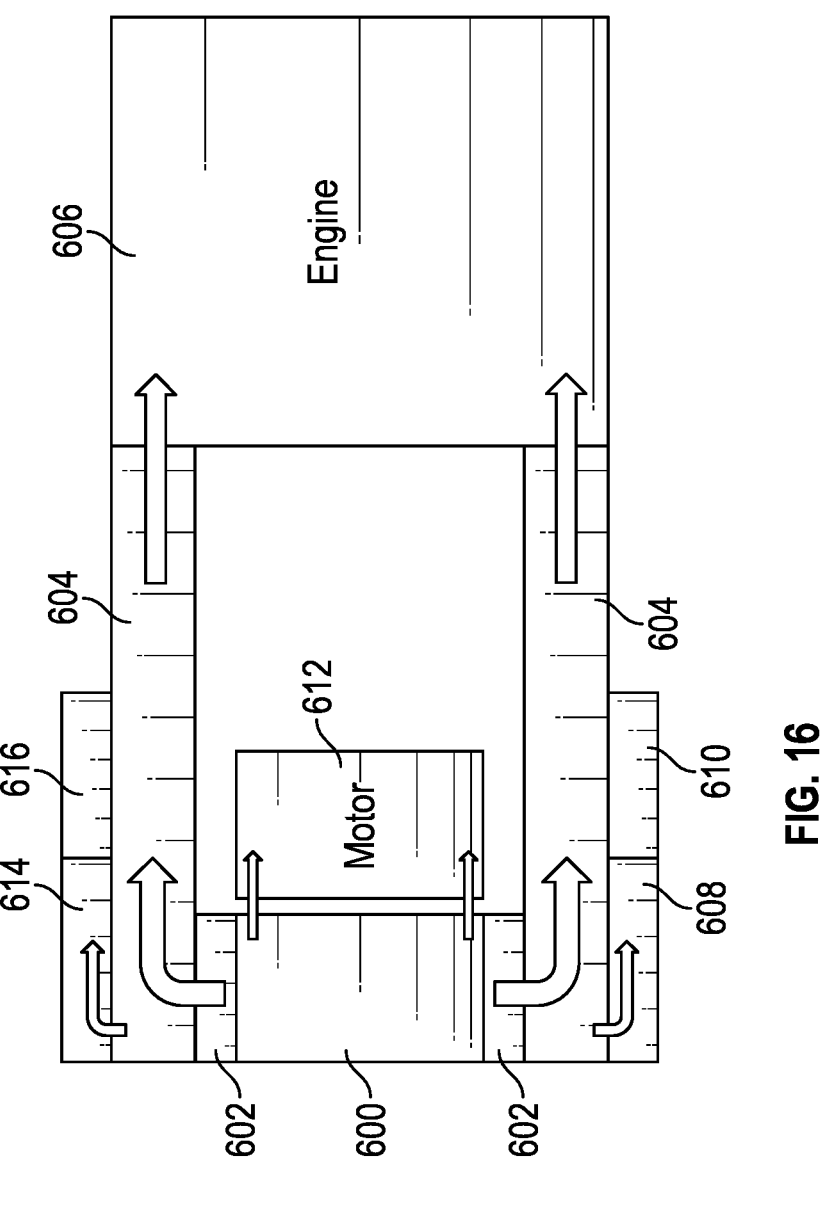
FIG. 16
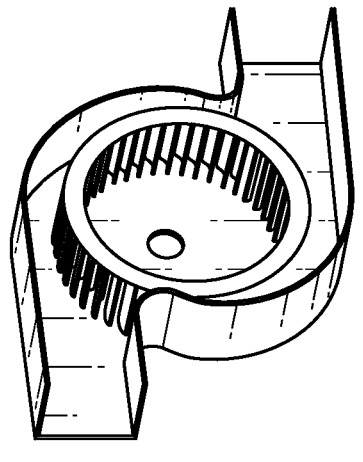

Section A-A

2200 —

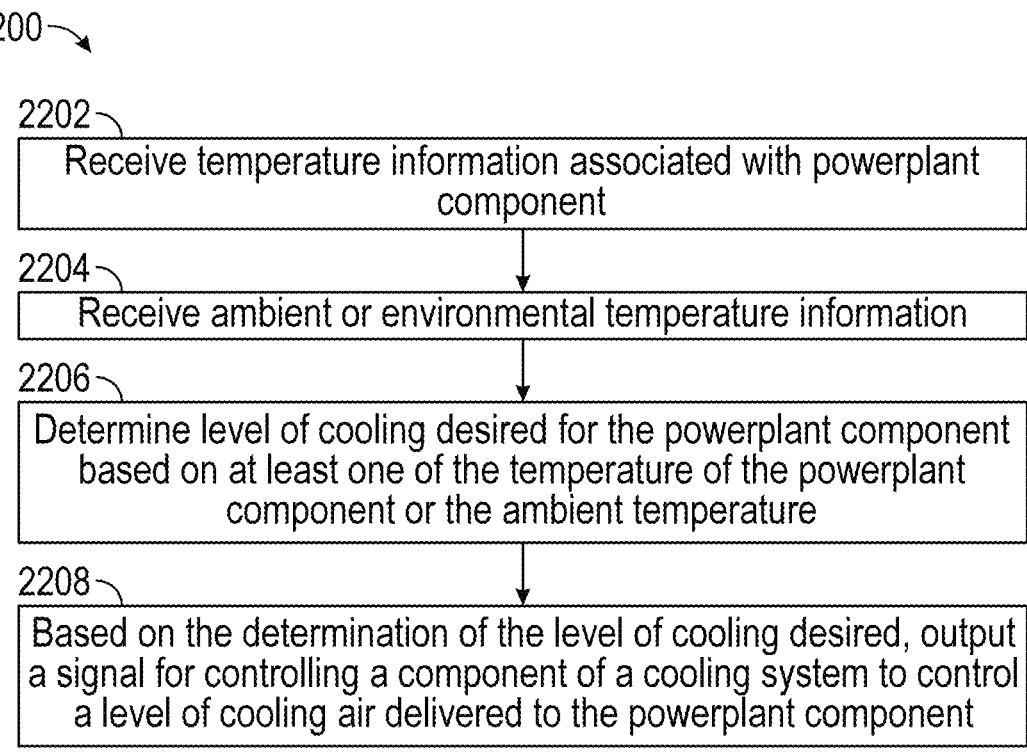

2202 —
Receive temperature information associated with powerplant component

2204 —
Receive ambient or environmental temperature information

2206 —
Determine level of cooling desired for the powerplant component based on at least one of the temperature of the powerplant component or the ambient temperature 2208 —
Based on the determination of the level of cooling desired, output a signal for controlling a component of a cooling system to control a level of cooling air delivered to the powerplant component

FIG. 22A

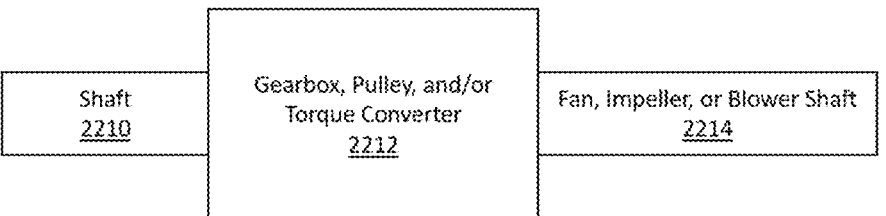

| Shaft 2210 | Gearbox, Pulley, and/or Torque Converter 2212 | Fan, Impeller, or Blower Shaft 2214 |

FIG. 22B

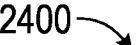
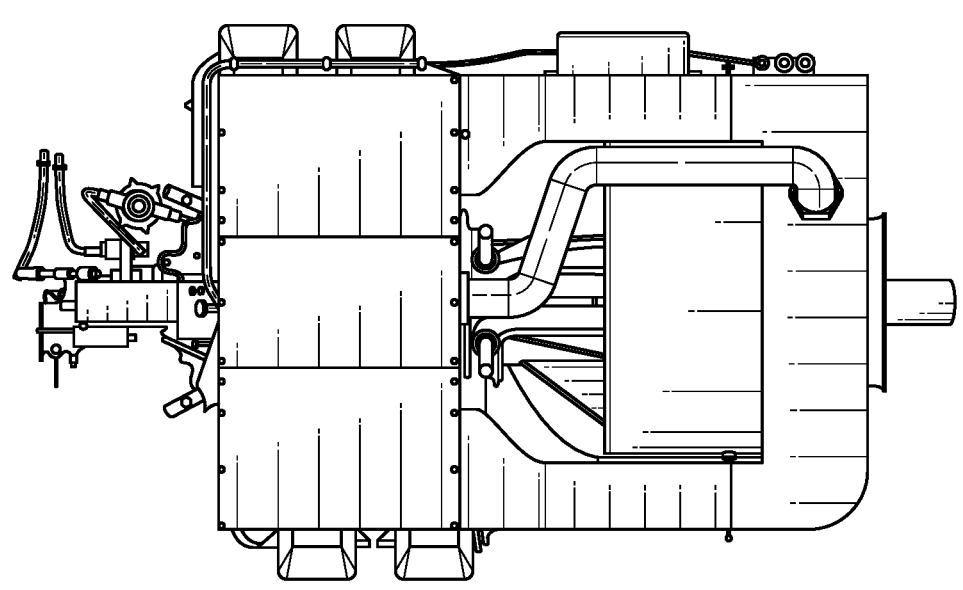
FIG. 24
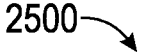
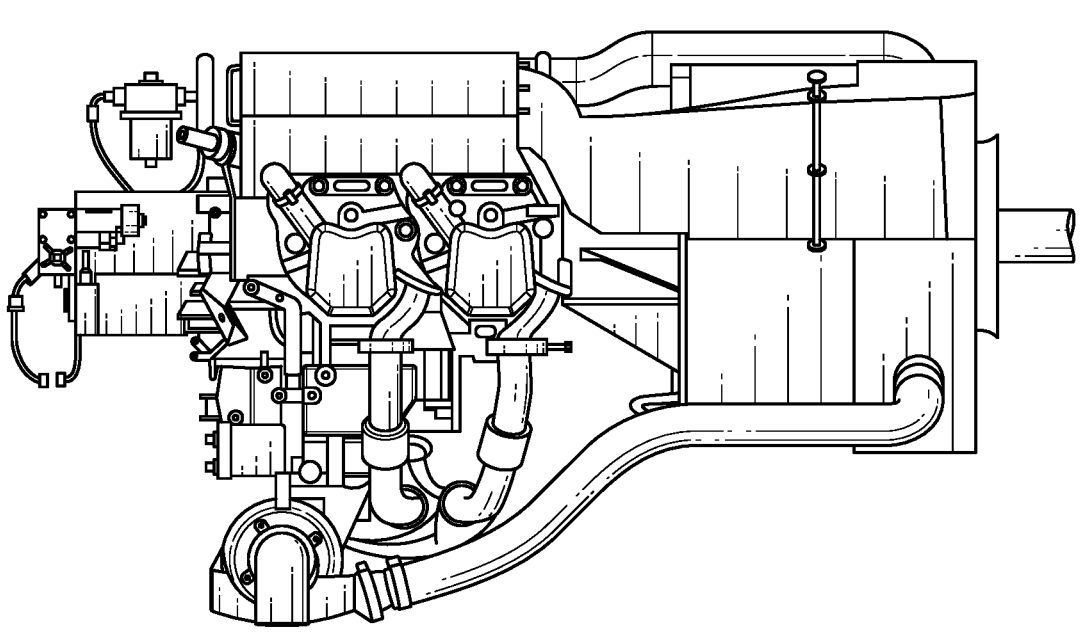
FIG. 25

SIMULTANEOUS AIR COOLING OF MULTIPLE ELEMENTS OF A HYBRID POWERPLANT

CROSS-REFERENCE TO RELATED PATENT APPLICATION

This application is a continuation of PCT/US2022/020602, filed Mar. 16, 2022, claims the benefit of U.S. Provisional Patent Application No. 63/280,568, filed Nov. 17, 2021 and U.S. Provisional Patent Application No. 63/163,165, filed Mar. 19, 2021, the entire contents of each of which are hereby incorporated by reference in their entirety.

BACKGROUND

There are varying types of aircraft that are propelled using different types of propulsion mechanisms, such as propellers, turbine or jet engines, rockets, or ramjets. Different types of propulsion mechanisms may be powered in different ways. For example, some propulsion mechanisms like a propeller may be powered by an internal combustion engine or an electric motor. As such, the combination of propulsion mechanisms and methods for providing power to those propulsion mechanisms are often designed specifically for particular aircraft, so that the propulsion mechanisms and methods for providing power to those propulsion mechanisms meet the specifications required to properly and safely propel an aircraft.

SUMMARY

In an embodiment, an aerospace hybrid powertrain system includes an engine, a power shaft, and an electric machine having the power shaft therein or passing therethrough. The aerospace hybrid powertrain system further includes a fan, impeller, or blower connected to the power shaft and may be configured to direct air toward components of at least one of the engine or the electric machine. The fan, impeller, or blower may further be configured to direct air toward cooling elements such as heat exchangers or finned heat sinks arranged to cool the components of at least one of the engine or the electric machine.

In an embodiment, an aerospace hybrid powertrain system includes an engine, a power shaft, and an electric machine having the power shaft therein or passing therethrough. The electric machine is configured to output power to a direct current (DC) bus, and wherein power on the DC bus is configured for use to propel an aircraft. The aerospace hybrid powertrain system further includes a fan, impeller, or blower connected to a fan, impeller, or blower shaft. The fan, impeller, or blower is configured to direct air toward components of at least one of the engine, the electric machine, or cooling elements comprising at least one of a heat exchanger or a finned heat sink configured to cool the components of at least one of the engine or the electric machine. The fan, impeller, or blower shaft is indirectly provided with mechanical power from the power shaft.

In an embodiment, a method for controlling cooling of an aerospace hybrid powertrain system includes receiving, at a processor of a computing device, data indicative of at least one of a temperature associated with a component of the aerospace hybrid powertrain system or an ambient or environmental temperature. The method further includes determining, by the processor, a level of cooling desired for the component based on the temperature associated with the component of the aerospace hybrid powertrain system or the ambient or environmental temperature. The method further includes outputting, by the processor, based on the determining of the level of cooling desired, a control signal configured to change a state of an air flow control device to adjust airflow to the component of the aerospace hybrid powertrain system.

BRIEF DESCRIPTION OF THE DRAWINGS

FIG. 2A illustrates a block diagram representative of a first aircraft control system for use with a flexible architecture for an aerospace hybrid system in accordance with an illustrative embodiment.

FIG. 6 is a flow chart illustrating a first example method for using a flexible architecture for an aerospace hybrid system in different flight phases of an aircraft with a main pusher propeller in accordance with an illustrative embodiment.

FIG. 7 is a flow chart illustrating a second example method for using a flexible architecture for an aerospace hybrid system in different flight phases of an aircraft with a main pusher propeller in accordance with an illustrative embodiment.

FIG. 16 illustrates a fifth example schematic of a cooling system for a hybrid powerplant in accordance with an illustrative embodiment.

FIG. 22A is a flow chart illustrating an example method for controlling a cooling system in accordance with an illustrative embodiment.

FIG. 22B is a diagram illustrating an example shaft indirectly connected to a fan, impeller, or blower shaft in accordance with an illustrative embodiment.

FIG. 24 illustrates a top view of the example flexible architecture of FIG. 23 in accordance with an illustrative embodiment.

FIG. 25 illustrates a side view of the example flexible architecture of FIG. 23 in accordance with an illustrative embodiment.

DETAILED DESCRIPTION

Figure 1A:
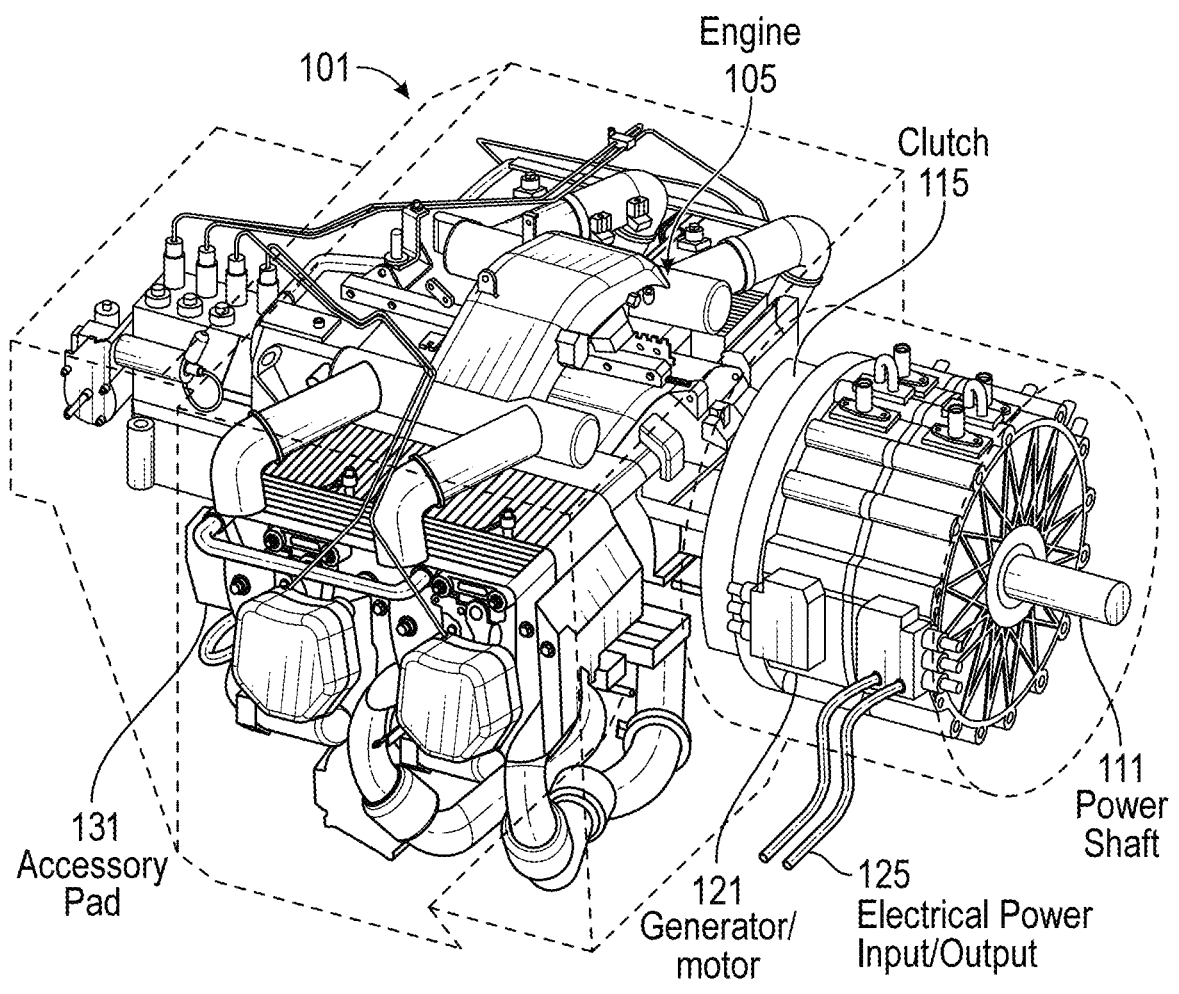
FIG. 1A illustrates an example flexible architecture for an aerospace hybrid system in accordance with an illustrative embodiment.

Aircraft typically have custom designed propulsion mechanisms and methods for powering those propulsion mechanisms. In this way, the propulsion mechanisms and power supplied to those propulsion mechanisms can be optimized to provide the amount of propulsion needed for a particular type and size of aircraft, while minimizing weight of the components in the aircraft. In other words, the propulsion mechanisms and power for those propulsion mechanisms are often optimized for a particular type and size of aircrafts such that components of one aircraft could not be easily used in a different types of aircraft drive architectures, such as direct drive aircraft, parallel drive aircraft, and serial drive aircraft.

Described herein are various embodiments for a flexible architecture for an aerospace hybrid system and optimized components thereof. A hybrid system may be or may include a system where fuel is burned in a piston, turbine, rotary, or other engine, and an output of the engine may be operatively connected to an electric generator for outputting electric power. The embodiments described herein may include flexible systems that can provide power for many different types of aircraft and propulsion mechanisms. Such systems may advantageously reduce the complexity of designing different types of aircraft, may reduce the costs of manufacturing such systems as less customization allows for economies of scale in mass producing the systems, and ultimately may reduce the complexity of aircraft that use the systems described herein.

The flexible architectures described herein may further be used to provide power to propulsion mechanisms in different ways, either in a same aircraft or in different aircraft. For example, a flexible architecture for providing power to propulsion mechanisms may be able to operate in multiple different modes to provide power to different types of propulsion mechanisms. A first aircraft may utilize one, some, or all of the multiple different modes in which the flexible architecture may operate. A second aircraft may utilize one, some, or all of the multiple different modes, and the modes utilized by the second aircraft may be different than those utilized by the first aircraft.

Therefore, different aircraft may take advantage of different modes of providing power to propulsion mechanisms provided by the flexible architectures described herein. While use of the flexible architectures may be customized in this way, the physical hardware of the flexible architectures may be adapted to use by different aircraft with minimal or no changes to the physical components of the flexible architectures described herein. Instead, the use of different modes in different aircraft may be accomplished largely based on how the components of the flexible architectures are controlled using a processor or controller. As such, computer readable instructions may therefore also be stored on a memory operably coupled to a processor or controller, such that when the instructions are executed by the processor or controller, a computing device that includes the processor or controller may control the various components of the flexible architectures described herein to utilize any possible mode of use desired for a particular implementation, aircraft, flight phase, etc.

Power generation and propulsion systems for aircraft may also utilize various cooling systems to ensure that the various components of an aircraft remain at safe temperatures for operation, as well as maintaining components within temperature ranges where they may operate more efficiently. Further described herein are advantageous cooling systems that leverage various aspects of the hybrid architecture described herein to efficiently cool components of a flexible architecture for providing power to propulsion mechanisms of an aircraft.

Aircraft that have hardware for providing different modes of power to its propulsion mechanisms, may have a variety of components for which it may be desirable to provide cooling. Thus, a single cooling system that efficiently moves air to the different components that enable different modes of power may cut down on weight of the aircraft, as well as power consumption of the cooling systems. FIGS. 1-8 and their accompanying description below specifically relate to example flexible architectures for providing power to propulsion systems of an aircraft, and FIGS. 9-21 and their accompanying description below relate to various embodiments of cooling systems for the example flexible architectures.

FIG. 1A illustrates an example flexible architecture 100 for an aerospace hybrid system in accordance with an illustrative embodiment. As discussed herein, the flexible architecture 100 may be efficiently used in a wide array of applications with a single hybrid generator system that can be applied in multiple ways depending on the aircraft requirements and phase of flight (e.g., used in different modes).

The flexible architecture 100 of FIG. 1A is a hybrid generator that includes an engine 105, a clutch 115, a generator/motor 121, and a power shaft 111. As described further below, the flexible architecture 100 may be used to implement various different modes depending on requirements of a specific aircraft installation or a specific phase of flight as desired. The engine 105 may be a combustion engine, such as an internal combustion engine. The engine 105 may further specifically be one of a piston internal combustion engine, a rotary engine, or a turbine engine. Such engines may use standard gasoline, jet fuel (e.g., Jet A, Jet A-1, Jet B fuels), diesel fuel, kerosene, gasoline, hydrogen, biofuel, a synthetic fuel substitute (e.g., biofuel substitutes), etc. In various embodiments, other types of engines may also be used, such as a smaller engine for drone implementations (e.g., a Rotax gasoline engine).

As described above, the engine 105 may be a piston, rotary, or turbine combustion engine. A piston combustion engine may advantageously spin an output rotor or shaft at rotations per minute (RPMs) that may be more desirable for direct output to power a generator and/or a propulsion mechanisms (e.g., a propeller) than other engines. For example, a piston combustion engine may have an output on the order of thousands of RPMs. For example, a piston combustion engine may have an output anywhere from 2200 to 2500 RPM, which may be a desirable RPM for a propeller. In particular, a propeller may be designed to have a size that yields a desired tip speed of the propeller based on the RPM output of the piston combustion engine (e.g., of 2200 to 2500 RPM). Other types of engines, such as a turbine engine, may output rotational power on the order of tens of thousands of RPMs, much higher than a piston combustion engine. For example, turbojet, turboprop, and/or turbofan engines may deliver shaft power at similar RPMs, which may be at higher RPMs than a piston engine, such as anywhere from 5000 to 30,000 RPM. In another example, a turbine engine with a gearbox, such as a turboshaft engine, may operate at similar RPMs to a piston engine or any other RPM range desired due to the flexibility of a gearbox for stepping down or up the output RPM of an engine. Other embodiments may drive the motor/generator at the higher RPM of a turbine or rotary engine to benefit the efficiency, power output, or other important factors. In some embodiments, a gearbox could be added between the output of a high RPM engine and the other components of FIG. 1A to step down the output RPM of the engine 105. However, the addition of a gearbox may also add weight to the system. A piston combustion engine may generate less noise as compared to turbine engines. Turbine engines may be louder than piston combustion engines and/or may produce noise of a different (e.g., higher) frequency than piston combustion engines, and such noise perceived by humans from a turbine engine may be more offensive to a listener than the noise produced by a piston combustion engine. Quieter engines may be more valuable in urban or more dense settings where reduced noise is desirable. Piston engines may also be more fuel efficient than turbine engines, so if fuel efficiency is desirable in a given embodiment, that may be taken into consideration in determining which type of engine to use.

The engine 105 may output rotational power to the clutch 115, which may be controlled to engage or disengage the power shaft 111. In other words, the power shaft 111 may be engaged with the rotational output of the engine 105 by the clutch 115, so that torque/rotational force may be transferred between the engine 105 output and the power shaft 111. When the clutch 115 disengages the output of the engine 105 and the power shaft 111, the power shaft 111 may rotate independently of the output of the engine 105. The clutch 115 may be physically located between the engine 105 and the generator/motor 121, and may even contact the engine 105 and the generator/motor 121 on opposing sides in order to reduce the overall footprint of the flexible architecture. In FIG. 1A and further described herein and shown in other figures is the clutch 115. However, in various embodiments, any mechanism that is capable of releasably decoupling the engine 105 and the power shaft 111 may be used additionally or alternatively to a clutch. For example, this decoupling may be based on absolute rotations per minute (RPM) or relative RPM between the engine 105 output and the power shaft 111, such as in an overrunning clutch. In various embodiments, as described herein (e.g., with respect to FIG. 8B), a clutch may not be used. Instead, a solid shaft may be used, and such embodiments may use a spring coupling, a flywheel, and/or torque converter (e.g., fluid torque converter) to transfer power from the output of the engine 105 to the power shaft 111.

The generator/motor 121 may also be engaged or disengaged with the power shaft 111. In other words, the generator/motor 121 may be controlled to switch off such that rotation of the power shaft 111 does not cause the generator/motor 121 to generate electrical power. Similarly, the generator/motor 121 may also be controlled to switch on such that the rotation of the power shaft causes the generator/motor 121 to generate electrical power. The generator/motor 121 is referred to as a generator/motor because it may function as either a generator or a motor. In various embodiments, the generator/motor 121 may be referred to as an electric machine, where an electric machine may be an electric generator, an electric motor, or both.

The flexible architecture further includes an electrical power input and output (I/O) 125 connected to the generator/motor 121. As described further herein, the generator/motor 121 may generate electrical power based on rotation of the power shaft 111 that is output via the electrical power I/O 125 or may receive electrical power via the electrical power I/O 125 that may be used to drive the power shaft 111. Wiring for the electrical power I/O 125 may include more than one wire. In various embodiments, the wiring for inputting electric power into the generator/motor 121 may be the same wiring that is used for outputting electric power out of the generator/motor 121. In various other embodiments, first wiring may be used for input of electric power and different second wiring may be used for output of electric power (so that different wires are used for input and output). In various embodiments, the generator/motor 121 may also have wiring connected thereto that is used for control of the generator/motor 121, to relay sensor or other data about the operation of the generator/motor 121 to a controller, etc.

The generator/motor 121 may also act as a driver for the power shaft 111. Upon receiving electrical power via the electrical power I/O 125 from batteries or some other form of electrical energy storage elsewhere in the system, the generator/motor 121 may impart a rotational force on the power shaft 111 to drive the power shaft 111. This may occur as long as the generator/motor 121 is controlled to be switched on to engage with the power shaft 111. If the generator/motor 121 is controlled to be switched off such that it does not engage with the power shaft 111, the power shaft 111 may not be rotated by the generator/motor 121.

Electrical power output from the electrical power I/O 125 may be used to drive an electric motor for an electric propulsion mechanism (e.g., a propeller). Electrical power output from the electrical power I/O 125 may also be used to power and/or charge other devices on an aircraft or aerospace vehicle. For example, electrical power output from the electrical power I/O 125 may be used to charge one or more batteries. The electrical power output from the electrical power I/O 125 may also be used to power other devices or accessories on an aircraft or aerospace vehicle. Because the electrical power I/O 125 also has an input, the power shaft 111 may be driven by any electrical power received via the electrical power I/O 125, such as power from one or more batteries. The power generated by the generator/motor 121 may be an alternating current (AC) power. That AC power may be converted by power electronics (e.g., a rectifier or inverter) into direct current (DC) power and output to a DC bus. That DC bus may be connected to batteries and/or an electric propulsion mechanism. In this way, the electric propulsion mechanism may be supplied with power via a DC bus. In various embodiments, a motor of the electric propulsion mechanism may use AC power, and the DC power from the DC bus may therefore be converted from DC power to AC power before it is used by the electric propulsion mechanism (e.g., by an inverter).

Any rotation of the power shaft 111 itself, whether driven by the engine 105 or the generator/motor 121, may also be used to drive one or more propulsion mechanisms. For example, rotation of the power shaft 111 may be used to direct drive a propeller or may be used to power an electric motor that drives a propulsion mechanism. The rotation of the power shaft 111 may also drive a gearbox operably connected to another component, such as one or more propellers, one or more rotors, or other rotating devices for various uses on an aircraft.

An accessory pad 131 may also be coupled to the engine 105, and may include a lower voltage direct current (DC) generator for electrical power that is separate from the generator/motor 121 and the electrical power I/O 125, which may be configured for high voltage and high power I/O. In some embodiments, the generator/motor 121 may also have two different windings and the electrical power I/O 125 may have two different outputs (e.g., high voltage and low voltage). Accessory power may be associated with one of the electrical power I/O 125 outputs in addition to or instead of the accessory pad 131 output. The accessory pad 131 may be used to provide power to devices or accessories on an aircraft or aerospace vehicle that does not require high voltage or current outputs that may be output by the generator/motor 121 at the electrical power I/O 125. A high voltage (HV) of an aircraft may be, for example, 400 volts (V), 800 V, 1200 V, or 3000 V, but may also be anywhere between 50 V to 3000 V in various embodiments. A low voltage (LV) of an aircraft may be 12 V, 14 V, 28 V, or any other voltage below 50 V.

Figure 1B:
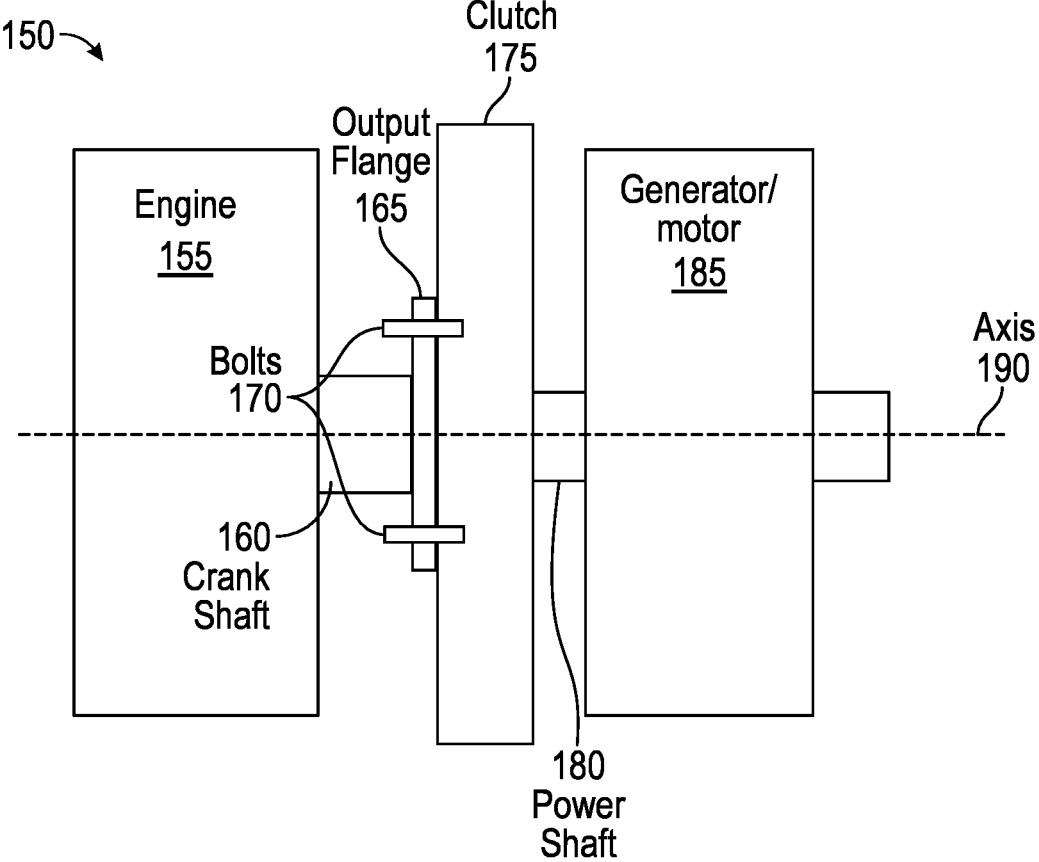
FIG. 1B illustrates an additional example flexible architecture for an aerospace hybrid system in accordance with an illustrative embodiment.

FIG. 1B illustrates an additional example flexible architecture 150 for an aerospace hybrid system in accordance with an illustrative embodiment. In particular, the flexible architecture 150 of FIG. 1B includes some components that may be the same as or similar to the components described above with respect to FIG. 1A, including an engine 155, a clutch 175, a power shaft 180, and/or a generator/motor 185. The flexible architecture 150 further illustrates the output of the engine 155 in the form of a crankshaft 160, which is rigidly connected to an output flange 165. The output flange 165 is rigidly connected to one side of the clutch 175 with bolts 170.

The clutch 175 may be configured to engage the power shaft 180 to translate rotational motion from the crankshaft 160 and the output flange 165 to the power shaft 180. The clutch 175 may be further configured to disengage the power shaft 180 such that the power shaft 180 may rotate independently with respect the crankshaft 160 and the output flange 165. In addition, FIG. 1B demonstrates how the rotatable components of the flexible architecture 150 may be all be aligned along a single axis 190. The rotatable components of FIG. 1A may similarly be aligned along a single axis as shown in FIG. 1B. In addition, the power shaft 180 may be a splined shaft that fits into an inner diameter opening of the clutch 175 and the generator/motor 185. Other features than a spline may also be used, such as a taper. In any case, the generator/motor 185 and/or the clutch 175 may be configured to accommodate and connect to a spline, taper, or other feature on the power shaft 180 so that the components may properly engage with one another.

In various embodiments, the clutch 175 may be different types of clutches or other mechanisms capable of decoupling the power shaft 180 from the output of the engine 155. For example, the clutch 175 may be a plate style clutch, and may be a dry or wet clutch. Such a plate style clutch may be engaged/disengaged or otherwise controlled mechanically, hydraulically, and/or electrically (e.g., by controllers 205, 220, and/or 280 of FIGS. 2A and 2B). Plate style clutches may also have different numbers of plates, such as 3, 5, or 10 plates. In various embodiments, the clutch 175 or any other clutch described herein may be a one-way clutch, overrunning, or sprag clutch. The one-way or sprag clutch may be configured to disengage the output of the engine from the power shaft while the electric machine is rotating the power shaft faster than the output of the engine. In other words, if the engine 155 is outputting less power than the generator/motor 185 onto the power shaft 180, the clutch 175 may automatically mechanically disengage the output of the engine 155 from the power shaft 180, for example without any electrical control input used to accomplish said disengagement. Upon the engine 155 having a higher RPM or outputting more power than the generator/motor 185, the one-way or sprag clutch may then engage so that power is applied from the output of the engine 155 to the power shaft 180. Another type of clutch that may be used is a centrifugal clutch, where weights in the plates of a clutch trigger one or more levers progressively as the RPM increases to squeeze the plates of the centrifugal clutch and engage the plates to connect, for example, the output of the engine 155 and the power shaft 180.

Advantageously, the generator/motor 121 of FIG. 1A and/or the generator/motor 185 may be used as a starter for the engine 105 or the engine 155, respectively. In other words, the generator/motor 185 may be used to turn the crankshaft 160 while the clutch 175 is engaged in order to start up the engine 155. Such a system may be advantageous where, for example the generator/motor 185 may be powered by a battery or other electrical power source. The engine 155, which may be a piston, rotary, or turbine combustion engine as described herein, therefore may not require separate starter components, reducing the weight and complexity of the flexible architectures described herein.

FIG. 2A illustrates a block diagram representative of an aircraft control system 200 for use with a flexible architecture 201 for an aerospace hybrid system in accordance with an illustrative embodiment. The aircraft control system 200 may be used, for example, to implement one or more of the various modes discussed below in which the flexible architectures described herein may be used. The flexible architecture 201 may be the same as, similar as, or may have some or all of the components of the flexible architectures 100 and/or 150 of FIGS. 1A and/or 1B. The aircraft control system 200 may include one or more processors or controllers 205 (hereinafter referred to as the controller 205), memory 210, a main aircraft controller 220, an engine 230, a generator/motor 235, a clutch 240, an electrical power I/O 245, an accessory pad 250, and one or more sensor(s) 260. The connections in FIG. 2A indicate control signal related connections between components of the aircraft control system 200. Other connections not shown in FIG. 2A may exist between different aspects of the aircraft and/or aircraft control system 200 for providing electrical power, such as a high voltage (HV) or low voltage (LV) power for an aircraft.

The memory 210 may be a computer readable media configured for instructions to be stored thereon. Such instructions may be computer executable code that is executed by the controller 205 to implement the various methods and systems described herein, including the various modes of using the flexible architectures herein and combinations of those modes. The computer code may be written such that the various methods of implementing different modes of the flexible architectures herein are automatically implemented based on various inputs that indicate, for example, a particular flight phase (e.g., landing, takeoff, cruising, etc.). In various embodiments the computer code may be written to implement the various modes herein based on input from a user or pilot of the aircraft or aerospace vehicle, or may be implemented based on a combination of user input and automatic implementation based on non-human inputs (e.g., from sensors on or off the aircraft, based on planned flight plans, etc.) The controller 205 may be powered by a power source on the aircraft or aerospace vehicle, such as the accessory pad 131, one or more batteries, an output of the electrical power I/O 125, a power bus of the aircraft powered by any power source, and/or any other power source available.

The controller 205 may also be in communication with each of the engine 230, the generator/motor 235, the clutch 240, the electrical power I/O 245, the accessory pad 250, and/or the sensor(s) 260. In this way, the components of flexible architectures may be controlled to implement various modes as described herein. In various embodiments, engine 230, the generator/motor 235, the clutch 240, the electrical power I/O 245, and the accessory pad 250 may be similar to or may be the similarly named components shown in and described above with respect to FIG. 1A. The electrical power I/O 245 may also include pre-charge electronic components, for example, for protecting the electrical components of the flexible architectures, including a direct current (DC) bus, as described herein from excessive in rush current on startup. For example, if a high-voltage (HV) bus is at 400V and a new component is connected to the HV bus at 0 V, the instantaneous current rush may be extremely high and may be damaging to the HV bus and/or the component. As a result, the pre-charge electronic components may provide for slowly bringing up a component voltage before making a full connection to the HV bus or other power supply. In various embodiments, the HV bus may be a DC bus or an AC bus, or there may be multiple busses that are any of DC or AC busses. In instances where an AC bus is used, AC power may be output from a motor/generator to the AC bus directly. In instances where a DC bus is used, an inverter may be used to convert AC power from the motor/generator to DC power for output to the DC bus.

The sensor(s) 260 may include various sensors for monitoring the different components of the flexible architecture 201. Such sensors may include temperature sensors, tachometers, fluid pressure sensors, voltage sensors, current sensors, state sensors to determine, for example, a current state of the clutch 250, or any other type of sensor. For example, voltage and/or current sensors may be used to inform function and settings of a motor/generator, a state chosen for the clutch, or for adjusting any other component of a system. A state sensor could also indicate a specific mode the flexible architecture is being used in, and the system may receive inputs (e.g., from a pilot, from an automated flight controller), to change the system to a different state or mode for a certain phase of flight that may be upcoming. Other sensors may include a pitot tube for measuring aircraft airspeed, an altimeter for measuring aircraft altitude, and/or a global positioning system (GPS) or similar geographic location sensor for determining a location relative to the ground and/or known/mapped structures.

The components of FIG. 2A inside the flexible architecture 201 dashed line may be associated with the flexible architecture as described herein, while the main aircraft controller 220 may be associated with the broader aircraft systems. In other words, the main aircraft controller 220 may control aspects of the aircraft other than the flexible architecture 201, while the controller 205 controls aspects of the aircraft related to the flexible architecture 201. The main aircraft controller 220 and the controller 205 may communicate with one another to coordinate providing power to the various propulsion mechanisms of the aircraft. For example, the main aircraft controller 220 may transmit signals to the controller 205 requesting particular power output levels for one or more particular propulsion mechanisms. The controller 205 may receive such control signals and determine how to adjust the flexible architecture 201 (e.g., what modes to enter and how to control the elements of the flexible architecture 201) to output the desired power levels based on the control signals from the main aircraft controller 220. In various embodiments, the main aircraft controller 220 may transmit signals that are related to controlling specific aspects of the flexible architecture 201. In other words, the controller 205 may act as a relay to retransmit control signals from the main aircraft controller 220 to the components of the flexible architecture 201, in addition to or instead of transmitting desired power output signals to the controller 205 from which the controller 205 determines how to control the individual components of the flexible architecture 201.

In various embodiments, the main aircraft controller 220 may also transmit control signals related to future desired power outputs, future flight phase or flight plan information, etc. In this way, the controller 205 may receive and use information about the expected power demands of the aircraft to determine how to control the aspects of the flexible architecture 201 at both a present moment and in the future. For example, flight plan information may be used to determine when battery power should be used, when batteries should be charged, etc. In another example, if a big demand for power is expected, the controller 205 may ensure that the engine 230 is running at a desired RPM to begin delivering a desired level of power by controlling engine output through the control of how much fuel is used by the engine (e.g., if a diesel piston, diesel rotary, or turbine engine is used) and/or through the control of how much air is used by the engine (e.g., if a gasoline piston engine is used).

In various embodiments, the controller 205 may also be in communication with one or more batteries to monitor their charge levels, control when the batteries are charged or discharged, control when the batteries are used to power the generator/motor 235, control when the batteries are used to directly power another aspect of the aircraft. However, in other embodiments, the main aircraft controller 220 may be in communication with batteries of the aircraft, and/or may relay information related to the batteries and control thereof to the controller 205. Similarly, if the batteries of the aircraft are controlled with the main aircraft controller 220 rather than the controller 205, the controller 205 may transmit control signals related to the batteries to the main aircraft controller so that the batteries may be controlled as needed or desired with respect to the functioning of the flexible architecture 201. Control of the batteries may be accomplished through communication with a battery controller. Control of the batteries may additionally or alternatively be accomplished by monitoring a voltage of a bus to which the batteries are connected, as well as current into and/or out of a battery energy storage system (e.g., bank of batteries and/or a battery controller). Based on a measured bus voltage and/or current into and/or out of the batteries, for example, a control system (e.g., a controller/processor) may make advantageous decisions for engine control, motor/generator control, and/or other features necessary for safe, reliable, and energy efficient operation.

In various embodiments, the electrical power I/O 245 may include two different outputs (e.g., a high voltage (HV) output and low voltage (LV) output) that are associated with two different windings of the generator/motor 235. As such, two different voltages (e.g., HV and LV) may be output and controlled by the controller 205 and/or the main aircraft controller 220. The electrical power I/O 245 may additionally or alternatively have voltage conversion components (e.g., a DC to DC converter) such that two or more different voltages may be output. In such an embodiment, two different outputs may be achieved without the use of two separate windings. The two different outputs may, for example, be output to different power busses on the aircraft, such as a HV bus and a LV bus. The two outputs of the electrical power I/O 245 may also be separately controlled by the controller 205. As such, the outputs may be turned off (e.g., by letting the power shaft and rotor of the generator spin or freewheel with respect to the rest of the motor/generator by turning off field current of the motor/generator). In various embodiments, the power shaft may not actually be freewheeling within the generator/motor 235. Instead, the power shaft may still rotate the rotor of the motor/generator 235 while the stator remains static, but the controller 205 may be used to control the output such that little or no electrical power is actually output by the motor/generator 235. In various embodiments, the controller 205 may control the motor/generator 235 to output a desired level or threshold level of electrical power from the motor/generator 235 while letting the remaining power be output by the power shaft (e.g., to a propulsion mechanism). For example, the controller 205 may control the motor/generator 235 to generate anywhere from 0% to 100% of the power output from the engine to the power shaft into electric power. For example, the controller 205 may cause the motor/generator 235 to generate 0%, 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, 98%, 99%, or 100% of the power from the power shaft into electrical power.

In some embodiments, the accessory pad may not be controlled by the controller 205 and/or the main aircraft controller 220. The accessory pad may be on when the engine 230 is operating to supply power to accessories on the aircraft.

In some embodiments, the controller 205 may be in communication with a wireless transceiver that may be on-board an aircraft or aerospace vehicle, so that the controller 205 may communicate with other computing devices not hard-wire connected to the system 200. In this way, instructions or inputs for implementing the various modes for the flexible architectures described herein may also be received from a remote device computing device wirelessly. In other embodiments, the system 200 may only communicate with components on-board the aircraft.

The controller 205 may further be connected to one or more aspects of a cooling system 285 of the flexible architecture 201. For example, the cooling system 285 may include one or more valves or other components to limit or otherwise control how much air flow is being directed toward various components of the flexible architecture 201 based on which components do or do not need cooling. The cooling system 285 may also include a gearbox or other component for adjusting how fast a blower or fan of a cooling system rotates, thereby further allowing for control of a cooling system. As such, the controller 205 and/or the controller 220 may control one or more aspects of the cooling system 285 to control cooling of various components of the flexible architecture 201. The cooling system 285 may be and/or may include various components of the cooling systems described herein, including with respect to any of FIGS. 9-21. FIG. 22 further includes an example method for how an aspect of the cooling system may be controlled to adjust the cooling airflow for a component of the cooling system (e.g., the cooling system 285).

Figure 2B:
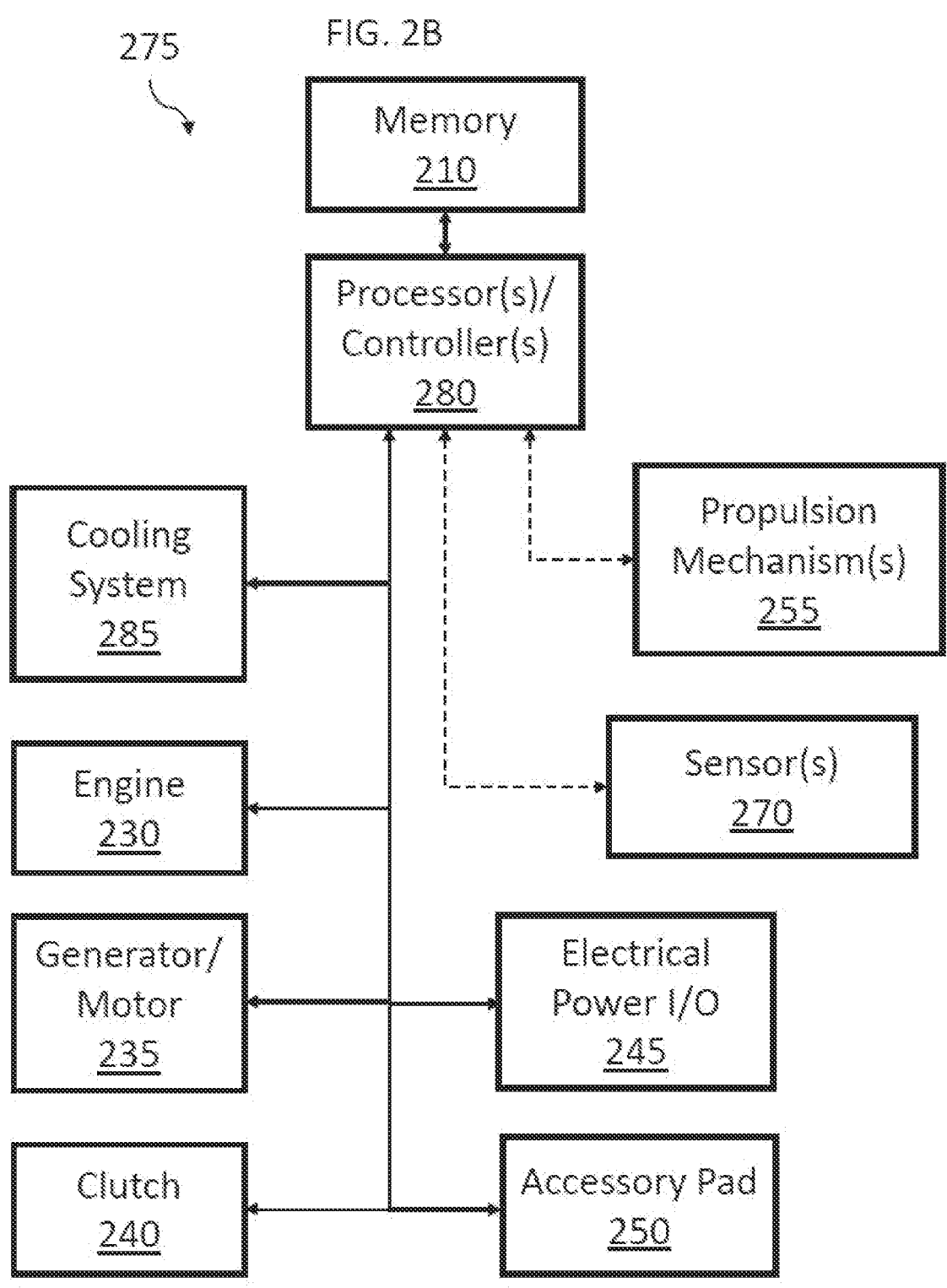
FIG. 2B illustrates a block diagram representative of a second aircraft control system for use with a flexible architecture for an aerospace hybrid system in accordance with an illustrative embodiment.

FIG. 2B illustrates a block diagram representative of a second aircraft control system 275 for use with a flexible architecture for an aerospace hybrid system in accordance with an illustrative embodiment. In the example of FIG. 2B, the system 275 does not have a separate main aircraft controller as in FIG. 2A. Instead, the entire aircraft has a single main controller 280 that controls all aspects of the flexible architecture and the aircraft (including, e.g., propulsion mechanisms 255 of the aircraft).

The controller 280 may be in communication with one or more of the propulsion mechanism(s) 255 on the aircraft to control them. The controller 208 may also be in communication with one or more sensor(s) 270 on an aircraft or aerospace vehicle, which may be sensors of the aircraft and sensors of the flexible architecture. In particular, the sensor(s) 260 may also be embedded in any of the components of FIGS. 1A and/or 1B described above, and therefore may be used to inform how the devices of FIGS. 1A and/or 1B are controlled and/or how the modes described herein are implemented as described herein.

In either of FIG. 2A or 2B, the controller 205, the controller 280, and/or the main aircraft controller 220 may also be in communication with a cooling system configured to cool and/or heat any components of the flexible architecture, one or more batteries, or any other aspect of an aircraft. As such, a cooling system may also be controlled in concert with the other systems and methods described herein.

Described below are five specific modes that may be implemented using various embodiments of the flexible architecture described herein (including, e.g., the flexible architectures shown in and described with respect to FIGS. 1A, 1B, 2A, and 2B).

In a first mode, which may be referred to herein as a hybrid generator mode, a clutch (e.g., the clutch 115 of FIG. 1A and/or the clutch 175 of FIG. 1B) may be controlled to engage an engine (e.g., the engine 105 of FIG. 1A and/or the engine 155 of FIG. 1B) to a power shaft (e.g., the power shaft 111 of FIG. 1A and/or the clutch output/power shaft 180) that runs between the clutch to a generator/motor (e.g., the generator/motor 121 of FIG. 1A and/or the generator motor 185 of FIG. 1B) such that the engine spins the power shaft within the generator/motor to generate electrical power to be supplied via an electrical power I/O (e.g., the electrical power I/O 125 of FIG. 1A) to other systems on an aircraft such as propulsion mechanisms/systems. For example, such propulsion mechanisms/systems may be powered using electric motors, and the electrical power output by the generator/motor in the first mode may be used to drive such propulsion mechanisms/systems. In short, in the first mode, the engine may be engaged with the power shaft using the clutch to drive the generator/motor and output electrical power from the generator/motor. In various embodiments, the first mode may be implemented with a system that does not have a clutch (e.g., the system of FIG. 8B).

In a second mode, which may be referred to herein as a direct drive engine mode, a clutch (e.g., the clutch 115 of FIG. 1 and/or the clutch 175 of FIG. 1B) may engage an engine (e.g., the engine 105 of FIG. 1A and/or the engine 155 of FIG. 1B) output to a power shaft (e.g., the power shaft 111 of FIG. 1A and/or the clutch output/power shaft 180) that runs through a generator/motor (e.g., the generator/motor 121 of FIG. 1A and/or the generator motor 185 of FIG. 1B) to provide mechanical power to a propulsion mechanism like a propeller on an aircraft. In such a mode, the field may be removed from the generator/motor (e.g., the generator/motor may be controlled to be off or disengaged) such that a power shaft and rotor of the generator/motor is spinning or freewheeling and an electrical power I/O (e.g., the electrical power I/O 125 of FIG. 1A) of the generator/motor is therefore disengaged and not outputting electrical power. In short, in the second mode, the engine may drive a power shaft to mechanically or otherwise power a propulsion mechanism, while the power shaft spins within the generator/motor without receiving or outputting electrical power at the electrical power I/O. As described herein, a controller may also be used to control how much power is generated and output by a generator/motor at its electrical power I/O, while allowing the rest of the power on the power shaft to be output to a propulsion device as mechanical power. A propulsion device may be, for example, any of rotor, propeller, fan, or other means of providing propulsion. As such, for example, if batteries on an aircraft are at full charge and electric motors on the aircraft are not be used, it may be desirable to only output mechanical power to a propulsion device and not convert any of the power on the power shaft to electric power. In other examples, it may be desirable to convert just a portion of the mechanical power from the power shaft into electric power. For example, the controller may cause the motor/generator to convert a certain percentage of power into electric power from the power shaft, or may monitor the power shaft to ensure that a minimum threshold of mechanical power is output to a propulsion mechanism (e.g., to maintain a certain airspeed or propulsion mechanism RPM) and then convert the rest of the power from the power shaft into electric power (e.g., to charge batteries or other energy storage devices on board the aircraft). As such, the various embodiments described herein may help prevent batteries on board the aircraft from being overcharged, may reduce the overall fuel consumed, etc., since the generator/motor may be controlled to output a certain amount of electrical power or no/little electrical power even while the power shaft and the rotor of the motor/generator is spinning. In various embodiments, this may be controlled by a controller by using the generator to control how much electrical energy is output, or may also be controlled by disengaging or partially disengaging the power shaft from the rotor of the motor/generator (or vice versa by disengaging the rotor from the power shaft). In various embodiments, the second mode may be implemented with a system that does not have a clutch (e.g., the system of FIG. 8B).

In a third mode, which may be referred to herein as an augmented thrust mode, a clutch (e.g., the clutch 115 of FIG. 1 and/or the clutch 175 of FIG. 1B) may engage an engine (e.g., the engine 105 of FIG. 1A and/or the engine 155 of FIG. 1B) to a power shaft (e.g., the power shaft 111 of FIG. 1A and/or the clutch output/power shaft 180) that runs through a generator/motor (e.g., the generator/motor 121 of FIG. 1A and/or the generator motor 185 of FIG. 1B) and the generator/motor is used as a motor to pull power in through an electrical power I/O (e.g., the electrical power I/O 125 of FIG. 1A) from an external source such as a battery pack. This provides a higher mechanical power output on the power shaft than either the engine or the generator/motor may be capable of delivering. In short, in the third mode, both the engine and the generator/motor are used to drive the power shaft simultaneously to send power to a propulsion mechanism. In various embodiments, the third mode may be implemented with a system that does not have a clutch (e.g., the system of FIG. 8B).

In a fourth mode, which may be referred to herein as a direct drive generator/motor mode, a clutch (e.g., the clutch 115 of FIG. 1 and/or the clutch 175 of FIG. 1B) may disengage an engine (e.g., the engine 105 of FIG. 1A and/or the engine 155 of FIG. 1B) from a generator/motor (e.g., the generator/motor 121 of FIG. 1A and/or the generator motor 185 of FIG. 1B) such that power can be fed to the generator/motor via an electrical power I/O (e.g., the electrical power I/O 125 of FIG. 1A) to drive the generator/motor as a motor and provide mechanical power to a power shaft (e.g., the power shaft 111 of FIG. 1A and/or the clutch output/power shaft 180). In short, in the fourth mode, the generator/motor alone may provide power to a propulsion mechanism based electrical power received at the electrical power M.

In a fifth mode, which may be referred to herein as a split engine power mode, a clutch (e.g., the clutch 115 of FIG. 1 and/or the clutch 175 of FIG. 1B) may engage an engine (e.g., the engine 105 of FIG. 1A and/or the engine 155 of FIG. 1B) to a generator/motor (e.g., the generator/motor 121 of FIG. 1A and/or the generator motor 185 of FIG. 1B) such that the engine may cause the generator/motor to spin as a generator and provide both electrical power to other systems on the aircraft via an electrical power I/O (e.g., the electrical power I/O 125 of FIG. 1A) as well as providing mechanical power to a power shaft (e.g., the power shaft 111 of FIG. 1A and/or the clutch output/power shaft 180) to drive systems like a propeller. In short, in the fifth mode, the engine may be used to drive the power shaft and the generator/motor to output power via the electrical power I/O and the power shaft. In various embodiments, the fifth mode may be implemented with a system that does not have a clutch (e.g., the system of FIG. 8B).

As described herein, any of these five modes (or variations thereof) may be used with the single flexible architecture described herein. In addition, certain modes and or combinations of modes may be beneficial for certain aircraft or aerospace vehicle types, certain propulsion mechanism types, certain flight phases of an aircraft or aerospace vehicle, etc. In any of these modes where the electric machine (e.g., generator/motor) is used to generate a significant amount of electrical power, the electric machine may generate a significant amount of heat. For example, if the electric machine is generating anywhere from 10 to 100 percent (%) of the power output from the engine into electrical power, the electric machine may also generate significant heat. This would include examples where the electric machine is generating any of 10, 15, 20, 25, 30, 35, 40, 45, 50, 55, 60, 65, 70, 75, 85, 90, 95, or 100 percent of the energy from the engine into electric energy, including any instance where the electric machine is generating half or more (e.g., a majority, 50 to 100 percent) of the energy from the engine into electric power. In any such instances where the electric machine generates significant heat, it may be valuable to use a cooling system, such as those described herein to cool the electric machine.

For example, in a hybrid electric vertical takeoff and landing (VTOL) aircraft with electric motor driven propellers, the flexible architecture herein may be used solely as a source of electrical power. As such, the flexible architecture may drive the aircraft in the first mode (e.g., the hybrid generator mode) during any portion of a phase of flight in which power must be provided to a power bus of the aircraft or one or more motors of the aircraft.

Figure 3:
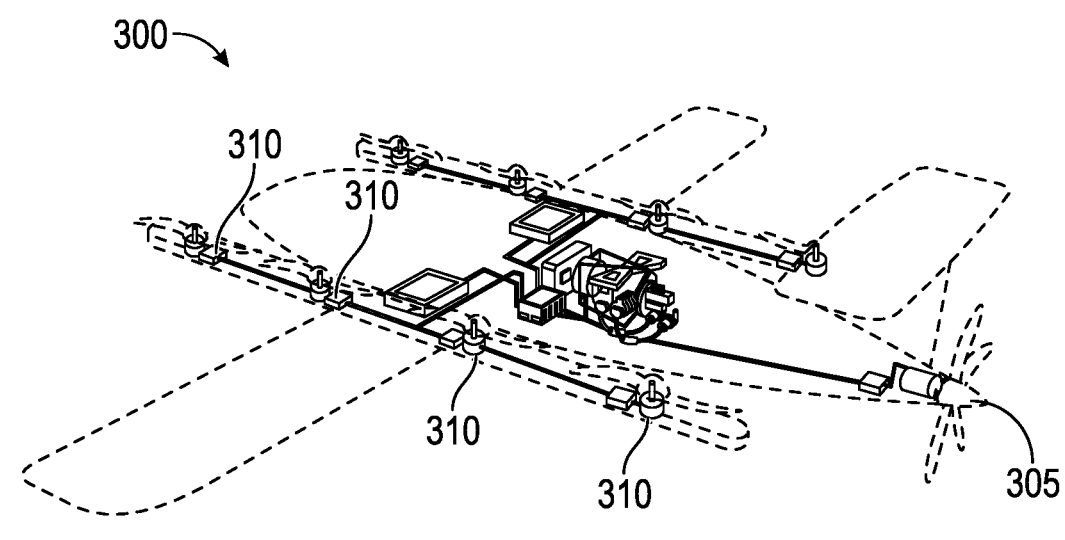
FIG. 3 illustrates a first example aircraft with which a flexible architecture for an aerospace hybrid system may be used in accordance with an illustrative embodiment.
Figure 4:
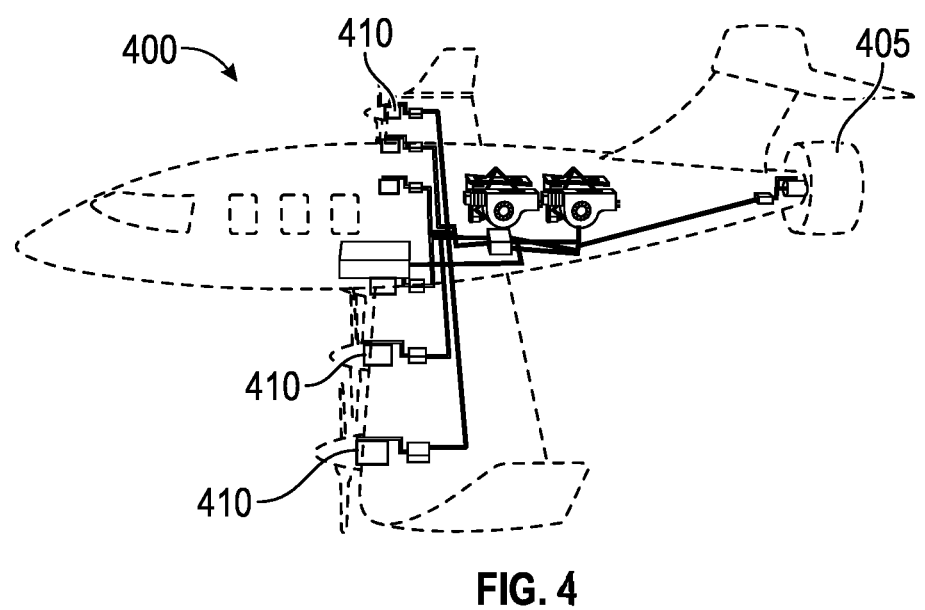
FIG. 4 illustrates a second example aircraft with which a flexible architecture for an aerospace hybrid system may be used in accordance with an illustrative embodiment.

In another example, in an aircraft with a single, large main pusher propeller (e.g., at the rear of a fuselage of an aircraft) and array of electric motors/propellers (e.g., on a wing of an aircraft) the flexible architecture may be used in the fifth mode (e.g., split engine power mode) during takeoff to supply power mechanically to the main pusher propeller and electrically to the wing-mounted motors. FIGS. 3 and 4 illustrate two examples of such an aircraft 300 and 400 with which a flexible architecture for an aerospace hybrid system may be used in accordance with an illustrative embodiment. For example, the aircraft 300 has a main pusher propeller 305, and the aircraft 400 has a main pusher propeller 405 in the form of a ducted pusher fan. In both examples the fifth mode described herein may be used to supply power mechanically to the main pusher propellers 305 and 405 from a power shaft. Additionally, wing mounted electric motors/propellers 310 and 410 may be driven with electrical power from a motor/generator as described herein.

Alternatively, the flexible architecture described herein may be used to power configurations like those shown in FIGS. 3 and 4 in the third mode (e.g., augmented thrust mode) on takeoff by having a battery pack supply power to both the wing-mounted motors and to augment the engine power on the power shaft driving the main pusher propeller. In cruising flight, the aircraft may use the second mode (e.g., the direct drive engine mode) to just drive the main pusher propeller. In another example, during cruising flight, the aircraft may be equipped with a clutch between the power shaft and the pusher propeller, and the controller may cause the aircraft to operate in the first mode (e.g., hybrid generator mode) driving the wing mounted motors by disengaging the power shaft from the pusher propeller and outputting power from the generator/motor to the wing mounted motors. In another example (e.g., an emergency situation such where the engine failure), the pusher prop may be driven in the fourth mode (e.g., the direct drive generator/motor mode) using power input to the electrical power I/O such as from one or more batteries.

In another example, an aircraft may be a VTOL aircraft with a gyrocopter style main rotor that may be operated powered or unpowered, and may have forward propulsion motors and propellers mounted on wings. In an embodiment, the flexible architecture may be used entirely in the first mode (e.g., the hybrid generator mode) with electrical power supplied from the electrical power input/output (and the generator/motor) driving a motor coupled to the gyrocopter style main rotor and driving the wing-mounted motors using electrical power. In an embodiment, the aircraft may also be configured with a clutch between the power shaft and the gyrocopter style main rotor such that the flexible architecture may use the second mode (e.g., the direct drive engine mode) or the third mode (e.g., augmented thrust mode) to spin the gyrocopter style main rotor (e.g., to get the gyrocopter style rotor up to speed for takeoff). In such an example, the controller may then cause the flexible architecture to switch to the first mode (e.g., the hybrid generator mode) after the gyrocopter style rotor is up to speed (e.g., switch to the first mode for cruising flight). The fourth mode (e.g., the direct drive generator/motor mode) may again be used in the event of an engine failure to use electrical power to drive the power shaft (and therefore the gyrocopter style rotor) from a power source such as one or more batteries.

Figure 5:
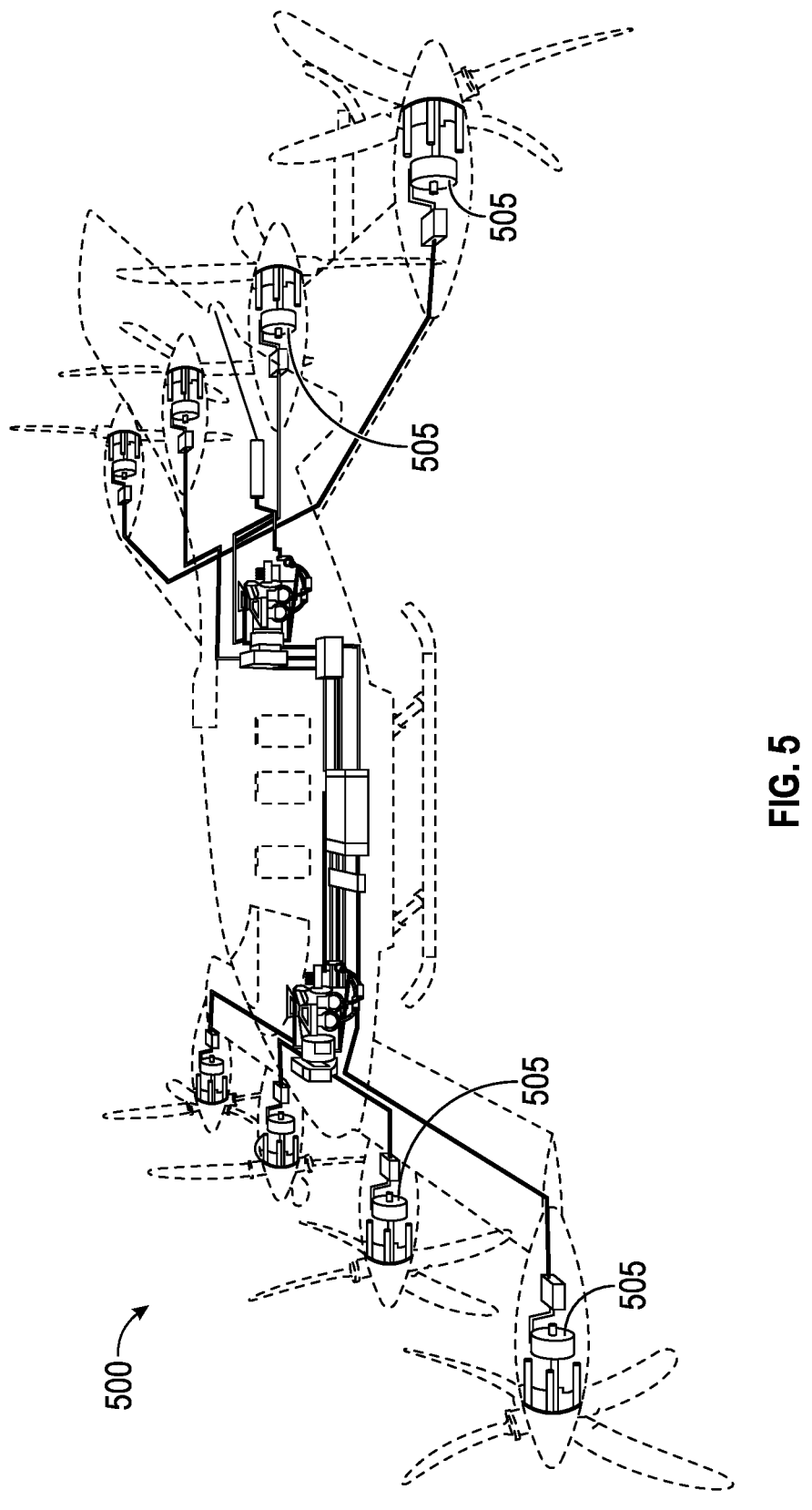
FIG. 5 illustrates a third example aircraft with which a flexible architecture for an aerospace hybrid system may be used in accordance with an illustrative embodiment.

FIG. 5 illustrates another example aircraft 500 with which a flexible architecture for an aerospace hybrid system may be used in accordance with an illustrative embodiment. For example, the aircraft 500 may include multiple (e.g., 8) electric motors/propellers 505 on tilt wings, which may be powered using the first mode described herein (e.g., the hybrid generator mode), where an engine may be engaged with a power shaft using a clutch to drive a generator/motor and output electrical power from the generator/motor to the various electric motors/propellers 505 on the tilt wings.

Accordingly, described herein are advantageous flexible architectures for aircraft through which a variety of modes for supplying power to propulsion mechanisms may be achieved. While particular aircraft and propulsion mechanism configurations may not utilize each mode described herein that a flexible architecture is capable of, the flexible architectures may still be implemented in different aircraft to achieve different modes. Similarly, while an example of a flexible architecture with five different modes for powering propulsion mechanisms is described in detail herein, other flexible architectures with fewer, more, or different modes for powering propulsion mechanisms are also contemplated herein.

For example, a flexible architecture may not have a clutch as described herein and may still be able to implement the various modes described herein where it is desirably to have the engine output coupled to the motor/generator and/or an output power shaft of the system. For example, in the first mode, the engine may rotate a power shaft to cause the generator to generate electricity. In the second mode, the engine may direct drive a mechanical propulsion component, for example, but the engine need not be disengaged from the motor/generator or power shaft because the motor/generator can be turned off or allow the power shaft and rotor of the motor/generator to freewheel within the motor/generator. In the third mode, the engine and motor/generator are used to drive the power shaft, so it would not be desirable to disengage the engine and the motor/generator using a clutch. In the fifth mode, the engine may rotate a power shaft to cause the generator to generate electricity and to cause the power shaft to mechanically power a propulsion mechanism. As such, the power shaft need not be disengaged from the engine output in an aircraft that utilizes any of the first, second, third, and/or fifth modes as described above. As such, for an implementation that uses any combination of the first, second, third, and/or fifth modes (and not the fourth mode), a clutch may not be used as the system may have the output of the engine constantly connected to the power shaft in the motor/generator. Such an embodiment may be valuable because clutches may be heavy and/or unreliable.

FIG. 6 is a flow chart illustrating a first example method 300 for using a flexible architecture for an aerospace hybrid system in different flight phases of an aircraft with a main pusher propeller in accordance with an illustrative embodiment. In particular, the aircraft may be an aircraft with a single larger pusher propeller and an array of electric motors and corresponding smaller propellers on the wings. During a takeoff flight phase at 602, the fifth mode described herein may be used to supply power mechanically to main pusher propeller and electrical power to wing-mounted motors. During a cruising flight phase at 604, the second mode described herein may be used to supply power mechanically only to the main pusher propeller and not supply power to the smaller electric motors/propellers.

FIG. 7 is a flow chart illustrating a second example method 400 for using a flexible architecture for an aerospace hybrid system in different flight phases of an aircraft with a main pusher propeller in accordance with an illustrative embodiment. In particular, the aircraft may be an aircraft with a single larger pusher propeller and an array of electric motors and corresponding smaller propellers on the wings. During a takeoff flight phase at 702, the third mode described herein called augmented thrust may be used to supply electrical power via a generator/motor to the main pusher propeller (drawing power from batteries) and providing power mechanically directly from the engine to the main pusher propeller. In addition, electrical power (generated by the generator/motor and/or directly from the batteries) may also be provided to the electric motors on the wings during takeoff. During a cruising flight phase at 704, the second mode described herein may be used to supply power mechanically only to the main pusher propeller and not supply power to the smaller electric motors/propellers.

Referring back to FIG. 1A, if the clutch 115 is engaged such that the engine 105 applies power to the power shaft 111 and the generator/motor 121 is not active or on, the power shaft 111 may freewheel within the generator/motor 121 (e.g., the second mode described above). Similarly, the power shaft 180 of FIG. 1B may freewheel within the generator/motor 185 in various embodiments. However, the engine 105 and/or the engine 155 may create torque pulses on the power shaft 111 and/or the power shaft 180 that can be dangerous to a generator, such as the generator/motor 121 and/or the generator/motor 185 when the clutch 115 and/or the clutch 175 is engaged with their respective power shafts 111 and/or 180. In other words, large torque pulses on a shaft similar to those that may occur when certain types of engines fire (e.g., diesel piston combustion engines) may cause high angular accelerations that may cause fatigue or damage to components of the generator/motor 121 and/or the generator/motor 185 that are coupled to the power shafts 111 and/or 180. As such, components to mitigate this torque may be used such as a flywheel or other heavy damping or spring coupling system to smooth out torque on the power shafts 111 and/or 180.

Figure 8A:
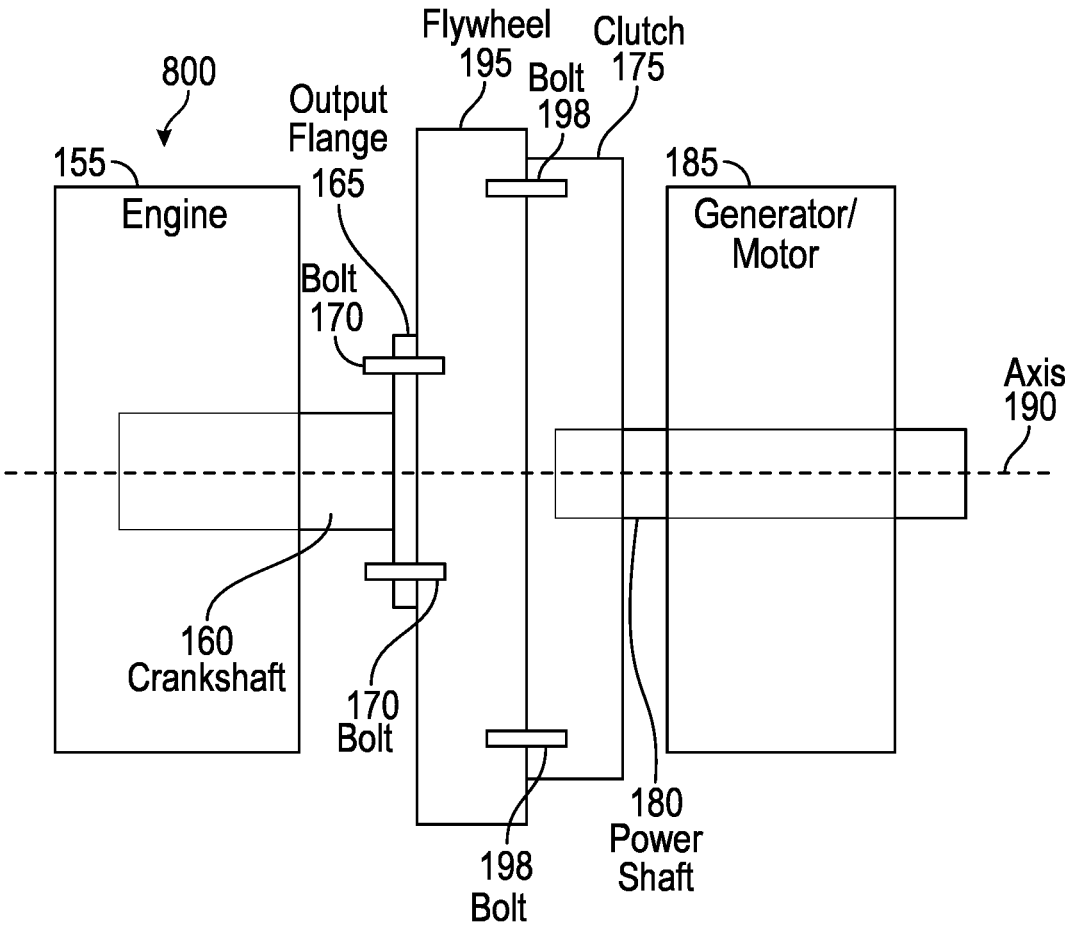
FIG. 8A illustrates an example flexible architecture for an aerospace hybrid system having a flywheel in accordance with an illustrative embodiment.

FIG. 8A illustrates an example flexible architecture 800 for an aerospace hybrid system having a flywheel for absorbing oscillatory torque in accordance with an illustrative embodiment. In particular, the flexible architecture 800 includes similar or the same components to that shown in and described with respect to FIG. 1B, but includes a flywheel 195 rigidly connected to the output flange 165 with the bolts 170. The flywheel 195 is further connected rigidly to one side of the clutch 175 by bolts 198. Rotational motion may therefore be translated from the engine 155 through the crankshaft 160, the output flange 165, and the flywheel 195 to the clutch 175. The clutch 175, may in turn engage or disengage with the power shaft 180 to selectively translate the rotational motion received from the flywheel 195 to the power shaft 180. The flywheel 195 may further be, for example, a dual mass flywheel and/or spring coupling.

In other various embodiments, a flywheel may not be used. For example, further embodiments of damping systems and apparatuses are described herein that can damp torque on a power shaft (e.g., the power shaft 111) but do not include a flywheel. Further, in various embodiments, a flywheel and other damping systems or components may be used in combination to damp or smooth out torque applied to a power shaft.

For example, the power shaft or rotor within the generator/motor itself may be rigidly coupled to a crankshaft of the generator/motor. In this way, the crankshaft and rotor together can damp the torque pulses on the power shaft or rotor, and may reduce tangential acceleration due to the torque pulses from an engine. In such embodiments, a clutch may be omitted. As such, a damping system would be internal to the generator/motor, and the footprint and weight of the damping systems may be less than a flywheel or other damping system that may be external to a generator/motor. In particular, the rigid coupling of the power shaft or rotor with the crankshaft may increase the inertia of the power shaft or rotor, such that the additional inertia helps prevent the power shaft from slowing down or otherwise rotating in a manner that would make it more susceptible to acceleration from torque pulses of an engine. In such embodiments, the power shaft or rotor and the crankshaft may function similarly to a flywheel.

In various embodiments, a generator/motor having a static inner portion and a spinning outer portion may be used. This may increase an inertia of the spinning portion and may allow the magnets in the generator/motor to spin and avoid being dislodged by torque spikes. In other words, the magnets may be already spinning in the outer portion and therefore may have a constant stabilizing radial force applied in addition to any tangential inertial force due to torque spike acceleration.

A torque damping system may also be configured as part of the power shaft or rotor that connects the output of the engine to the generator/motor. For example, a hub between the power shaft or rotor of the generator/motor may include a coupling that has torsional spring and/or damping properties. Torsional damping couplings may include an elastomeric component or spring (e.g., made from steel or another metal) that reduces potentially harmful torque impulses from being passed from an engine output to a power shaft or rotor of a generator. Torsional damping couplings may be similar to or may also be referred to as a resonance damping coupling. For example, such torsional damping couplings may reduce an overall system weight and size as opposed to systems that use a flywheel or other large damping system. One or more torsional damping couplings may be installed at any one or more of, within an engine, between an engine and clutch, in the clutch, between the clutch and the generator, and/or within the generator to achieve damping before the power shaft or rotor damages components of the generator itself.

Other ways of damping torque on a power shaft or rotor of a generator may also be used. For example, a magnetic field on a generator may be controlled to pulse it such that it acts upon the power shaft or rotor of the generator to cancel some or all of the torque pulses imparted on the power shaft or rotor by an engine. Such pulses on the field of the generator may be controlled based on a measurement of the torque pulses applied by the engine, and may result in the generator components not being damaged by the diesel engine. For example, the third mode described above where both an engine and a generator/motor apply power to a power shaft, pulses to the power shaft from the generator may both apply power to the power shaft and protect the components of the generator from being damaged. In the other modes described herein, pulses to the power shaft using the generator may be applied whenever the power shaft is being driven in whole in part by the engine. Thus, in order to properly protect the components of the generator in such a method, the pulses applied by the magnetic field of the generator to the power shaft or rotor may be configured to correlate to the torque pulses of the engine to properly counteract those torque pulses.

Figure 8B:
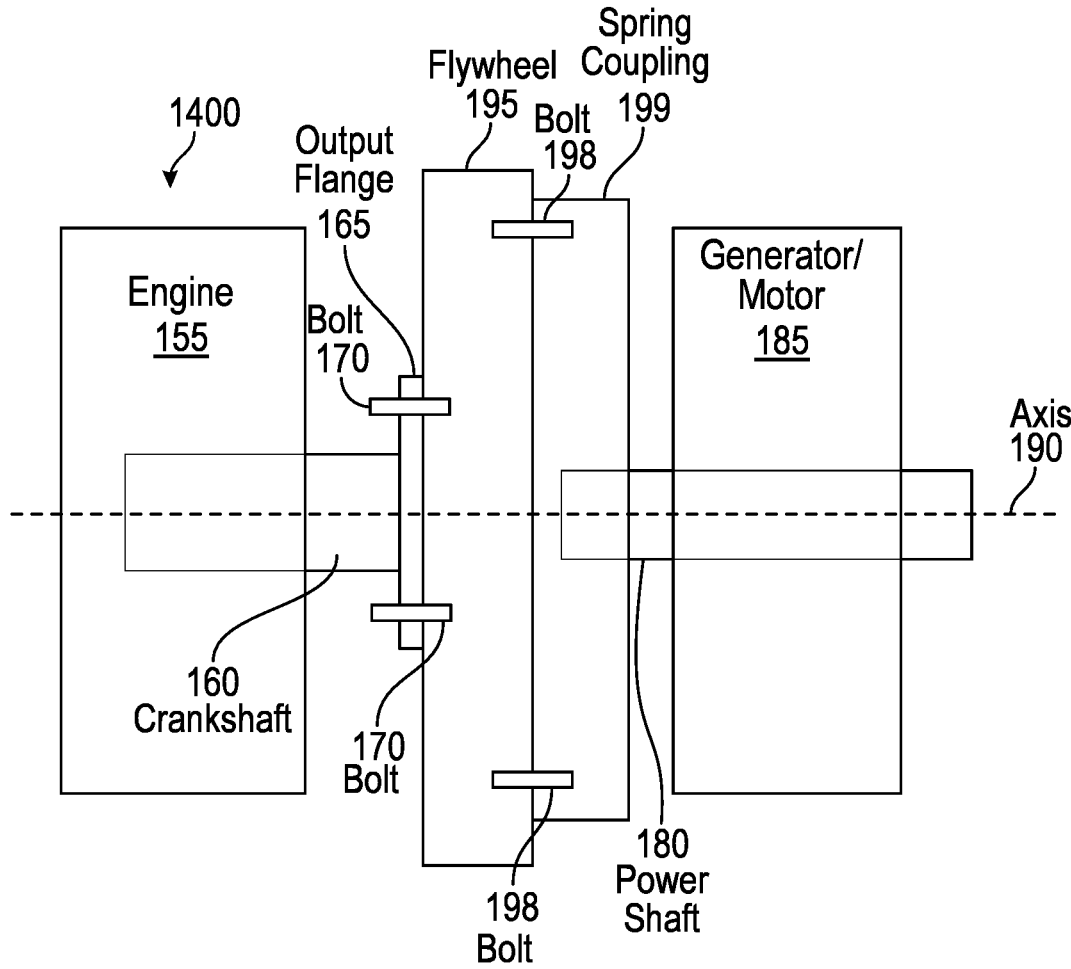
FIG. 8B illustrates an example flexible architecture for an aerospace hybrid system having a flywheel and a spring coupling in accordance with an illustrative embodiment.

FIG. 8B illustrates an example flexible architecture 1400 for an aerospace hybrid system having a flywheel and a spring coupling for absorbing oscillatory torque in accordance with an illustrative embodiment. In particular, the flexible architecture 1400 includes similar or the same components to that shown in and described with respect to FIG. 8A, but includes a spring coupling 199 rigidly connected to the flywheel 195 and the power shaft 180. The size, weight, etc. of the flywheel 195, as well as characteristics of the spring coupling 199, may be tuned according to the output of the engine 155 and the characteristics of one another, so that oscillatory torque may be reduces as much as desired and/or possible. For example, different engines may produce different amounts of oscillatory torque, so the various embodiments herein include flywheels and/or spring couplings having different characteristics to reduce vibration that is passed from the crankshaft 160 to the power shaft 180. In various embodiments, the flexible architecture 1400 may not have a clutch, such that the crankshaft 160 and the power shaft 180 are always coupled to one another. In various embodiments, a flexible architecture similar to that of FIG. 14 may also include a clutch so that the output of the engine 155 can ultimately be releasably decoupled from the power shaft 180. In various embodiments, such a clutch may be connected between the spring coupling 199 and the power shaft 180, or the power shaft may be split into multiple shafts with a clutch connecting the multiple shafts, or the clutch may be located anywhere else between the engine 155 and the generator/motor 185 so that the output of the engine 155 can be selectively decoupled from a portion of the power shaft 180 that passes through the generator/motor 185. In various embodiments, a clutch may additionally or alternatively be positioned after the generator/motor 185 so that the power shaft 180 may be decoupled from a load (e.g., a propulsion mechanism of an aircraft).

Further described below are examples of how the flexible architectures described herein may be packaged and/or used in an actual aircraft. For example, certain aircraft may use electric motors to drive propulsion systems, and therefore must have sufficient on-board electrical energy or ways to generate such on-board electrical energy to drive those propulsion systems. In addition, regulations in a given jurisdiction may also require sufficient reserve energy to comply with operational regulations of an aircraft. The flexible architectures described herein may provide such electrical energy for propulsion systems and/or reserve energy such that they systems described herein may work with a variety of electric aircraft. For example, the embodiments herein provide for efficient conversion of jet fuel (or other liquid or gas fuel) to electricity, such that electric aircraft may be powered using widely available fuel sources.

Figure 23:
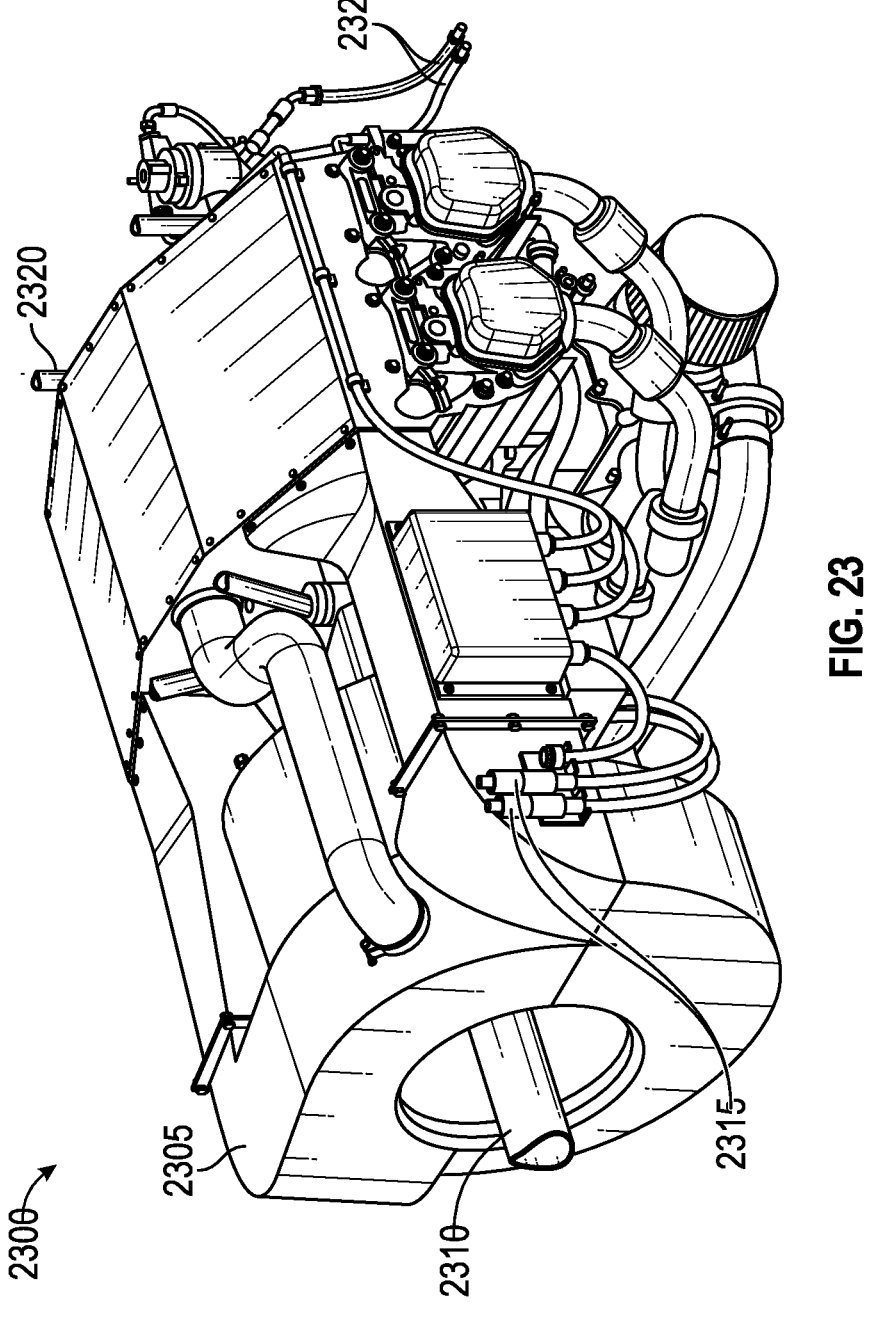
FIG. 23 illustrates a perspective view of an example flexible architecture for an aerospace hybrid system in accordance with an illustrative embodiment.

FIG. 23 illustrates a perspective view 2300 of an example flexible architecture for an aerospace hybrid system in accordance with an illustrative embodiment. This hybrid unit may be used as the core powerplant of a variety of aircraft types and implementations. The hybrid unit of FIG. 23 is a tightly integrated powerplant that may include some, all, and/or additional elements shown in and described with respect to FIGS. 1A, 1B, 2A, 2B, 8A and/or 8B.

In addition, the hybrid unit may include an integrated cooling system 2305 that cools various aspects of the hybrid unit, heat exchangers related to the hybrid unit, or heat sinks such as finned attachments for any aspects of the hybrid unit. A power output 2310 may be a power shaft (e.g., the power shaft 111 of FIG. 1A, the power shaft 180 of FIG. 1B or 8A or 8B) or connected to a power shaft, so that rotational power may be output from the hybrid unit to propulsion systems or other aspects of an aircraft. Electrical connectors 2315 may also be used to output electrical power (or input electrical power) as described herein. The electrical connectors 2315 may be, for example, an Amphenol Surlok Plus™ connector or equivalent, or may be any other type of suitable connector. In this way, a main bus, such as a direct current (DC) bus, of the hybrid unit may be connected to through the electrical connectors 2315 (e.g., the electrical power input/output 125 of FIG. 1, the electrical I/O power 245 of FIG. 2A or 2B). These or other connectors may also facilitate connection to and control of the components of the hybrid unit, such as using a controller area network (CAN) bus, a CAN 2.0 bus, and/or an SAE J1939 bus. Such communications busses may operate at different speeds, such as 250 kilobytes per second (kbps), 500 kbps, 1000 kbps, etc. In various embodiments, the electrical connectors 2315 and/or other connectors may be customized for a given application, such as different types of aircraft and the communications and power systems that those aircraft use.

Figure 9:
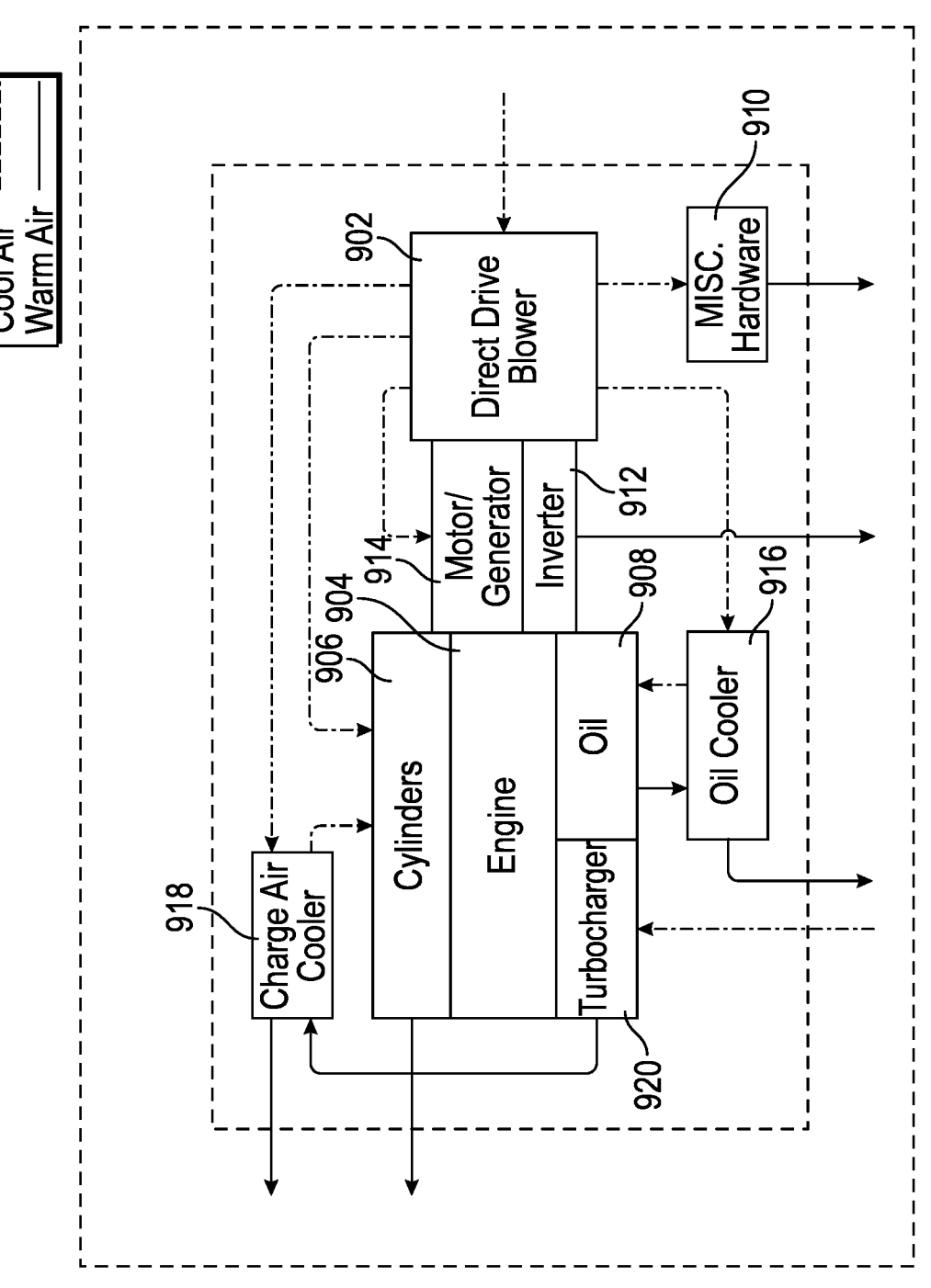
FIG. 9 illustrates an example schematic of a cooling system for a hybrid powerplant in accordance with an illustrative embodiment.

By virtue of the power output 2310 and the electrical connectors 2315, the hybrid unit of FIG. 9 may output either mechanical power via the power output 2310 and/or electric power via the electrical connectors 2315 and the DC bus in the hybrid unit (e.g., the electrical power input/output 125 of FIG. 1, the electrical I/O power 245 of FIG. 2A or 2B). Similarly, electrical power may be received via the electrical connectors 2315 to drive the power output 2310, just as mechanical power may be received via the power output 2310 to generate electricity for output via the electrical connectors 2315. For example, if an aircraft includes one or more batteries, extra power from a battery may be received via the electrical connectors 2315 to boost power applied to the power output 2310, such that the power output 2310 is driven by both an engine and power from the batteries of an aircraft as described herein.

The hybrid unit of FIG. 23 may further include connectors 2325 for connecting the engine to a fuel source. The connectors 2325 may be quick fuel connects, such as AN6 quick fuel connects. In this way, the engine may be supplied with fuel to power the power output 2310 and/or to generate electricity to be output via the electrical connectors 2315.

The hybrid unit of FIG. 23 may additionally include mounting hardware 2320 for mounting the hybrid unit to an aircraft. While the mounting hardware 2320 is shown on the top of the hybrid unit in FIG. 23, mounting hardware in other embodiments may additionally or alternatively be located on any of the top, bottom, sides, etc. of the hybrid unit, so that the hybrid unit may be mounted as desired to an aircraft.

FIG. 24 illustrates a top view 2400 of the example flexible architecture of FIG. 23 in accordance with an illustrative embodiment. FIG. 25 illustrates a side view 2500 of the example flexible architecture of FIG. 23 in accordance with an illustrative embodiment.

Accordingly, the hybrid units described herein may be used to power an electric or hybrid electric aircraft, and may offer better power than a battery pack alone would. For example, a hybrid unit as shown in FIGS. 23-25 may offer better energy density than batteries (e.g., 5 to 7 times better energy density). For example, the hybrid units described herein may have anywhere from 600-1200 or more Watt-hours per kilogram (Wh/kg) equivalent energy density. The hybrid units described herein may also advantageously have better fuel economy than other systems (e.g., 40% better fuel economy than a turbine engine), and may use readily available fuel such as Jet-A, diesel, kerosene, biofuel substitutes, or any other suitable or desired fuel. In other words, the hybrid units herein may include, in a compact package, an engine, a generator, an inverter, and thermal management using air cooling, such that aircraft in which the flexible architecture is installed may advantageously utilize these components as a powerplant. Outputs at various voltages, (e.g., 400 Volts (V), 800V, 1000V, 1200V, etc.) may be supplied from the hybrid architecture, as well as having connections for other accessory or system power (e.g., 28V). The flexible architectures described herein may also be quieter than other systems (e.g., quieter than turbine engine systems). For example, noise may be below 70 decibels (dB) at one hundred feet or less from the current systems.

The flexible architectures described herein may also be scalable. For example, in a larger aircraft, two or more of the flexible architectures described herein may be used. The flexible architectures may also be used in different aircrafts designed for different functions and purposes. For example, the flexible architectures described herein may be useful in urban air mobility (UAM) systems, such as electric vertical takeoff and landing (eVTOL) aircraft, electric short takeoff and landing (eSTOL) aircraft, electric conventional takeoff and landing (eCTOL) aircraft, etc. One example flexible architecture, such as the one shown in FIGS. 23-25, may have the specifications shown in Table 1 below.

TABLE 1

| SPECIFICATIONS | | |
| --- | --- | --- |
| | SI Units | SAE Units |
| Max Continuous E-Power | 185 kW | 248 hp |
| Max Continuous Shaft Power | 185 kW | 248 hp |
| Max Burst Shaft Power* | 370 kW | 496 hp |
| Nominal system bus voltage | 400 or 800 V | 400 or 800 V |
| Specific Fuel Consumption | 250 g/kWh | 0.41 lb/hp · h |
| Ambient temperature range | −40 to 50 C. | −40 to 122 F. |
| Celling for full takeoff power | 3050 m | 10,000 ft |
| Certified celling | 6100 m | 20,000 ft |
| Dimensions (L × W × H) | 140 × 93 × 84 cm | 55 × 37 × 33 in |
| Mass, dry ** | 295 kg | 650 lb |

*Max burst shaft power depends upon battery configuration
**Dry mass includes engine, generator, inverter, and thermal systems As shown above, a 185 kW hybrid unit may be provided. Accordingly, two hybrid units may be provided in a given aircraft to provide 370 kW of power.

Figure 26:
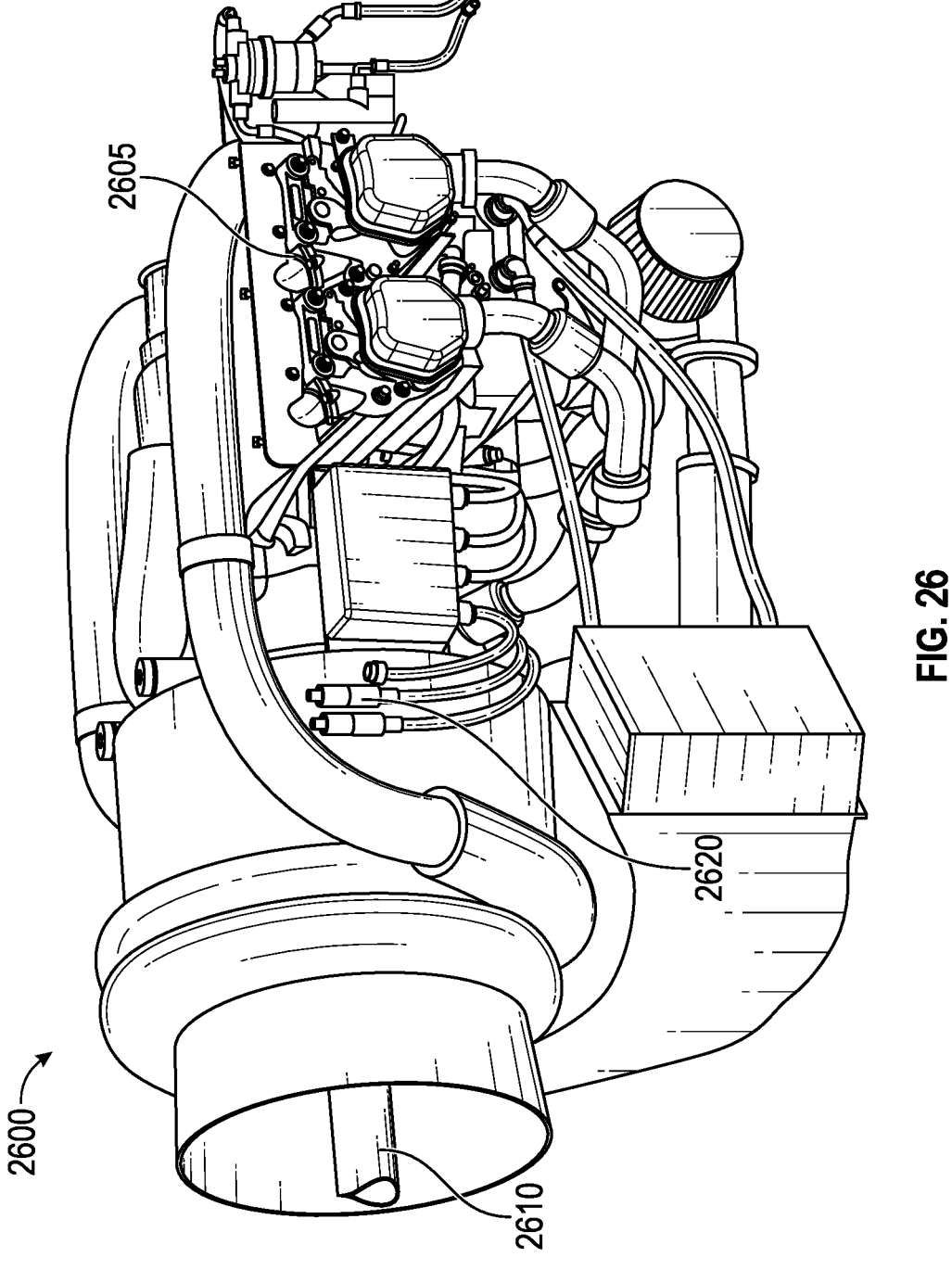
FIG. 26 illustrates a perspective view of another example flexible architecture for an aerospace hybrid system in accordance with an illustrative embodiment.

FIG. 26 illustrates a perspective view 2600 of another example flexible architecture for an aerospace hybrid system in accordance with an illustrative embodiment. The flexible architecture of FIG. 26 includes an engine 2605 and a generator, which is hidden or not visible because of other components such as the cooling ducts of the system. However, like the hybrid unit of FIGS. 23-25 a mechanical output power 2610 and electrical output power 2620 (which are also both optionally capable of receiving power as well) are provided.

As such, the various embodiments herein provide for a hybrid electric powerplants that may be incorporated into various different types of aircraft in the aerospace market. In doing so, aircraft manufacturers may not have to build their own systems that are made up of an engine, a generator, power electronics, cooling systems, and/or control systems to provide power to those aircraft. This may be advantageous, as a development process to create a powerplant system and certify it to aerospace standards may last 4+ years and may cost more than $10 M.

As such, the hybrid powerplants or flexible architectures described herein may be design, manufactured, etc. separably from the design of the aircraft. A few aspects of the flexible architectures may be customized as desired by an aircraft manufacturer, but in a way that does not cause the total system to be redesigned or reconfigured. The embodiments herein therefore provide for an integrated unit that includes the engine, generator, power electronics, cooling systems, and/or control systems in one package to be installed on an aircraft. Combining these elements into a single standalone unit further advantageously allows for that unit to go through the Federal Aviation Administration (FAA) certification process as a system. Then, multiple aircraft manufacturers may use the certified system, removing that certification burden and development burden from the aircraft developer as well as adding efficiencies where multiple aircraft manufacturers will not have to seek certification of many different powerplant systems specifically designed for their aircraft.

By providing a combined unit having an engine, generator, power electronics, cooling systems, and/or control systems, the hybrid flexible architectures described herein may be optimized as a whole system rather than as individual components. entire system rather than optimization of the pieces. Additionally, such a hybrid unit may be used in multiple aircraft designs, whereas systems designed as part of an aircraft design process are configured such that it is difficult to reapply them elsewhere. Having a hybrid unit that may be applied in multiple market segments and aircraft designs with common power requirements leads to faster development of aircraft where a major component (e.g., the hybrid units or flexible architectures) of an aircraft is already certified and in production.

Hybrid electric systems for aviation have historically been designed from scratch for each application/aircraft. Such a process is inefficient and addressed by the embodiments herein. For example, some aircraft have unique powerplants designed specifically for the aircraft. Such a solution may include custom engine, generator, power electronics, control systems, cooling systems, battery pack, propulsion motors, and/or propellers. The embodiment herein provide for a compact hybrid system for an aircraft that may make up one half of two distinct halves within an aircraft power and propulsion system: upstream and downstream ends of a powertrain (such as a hybrid powertrain as described herein).

Figure 27:
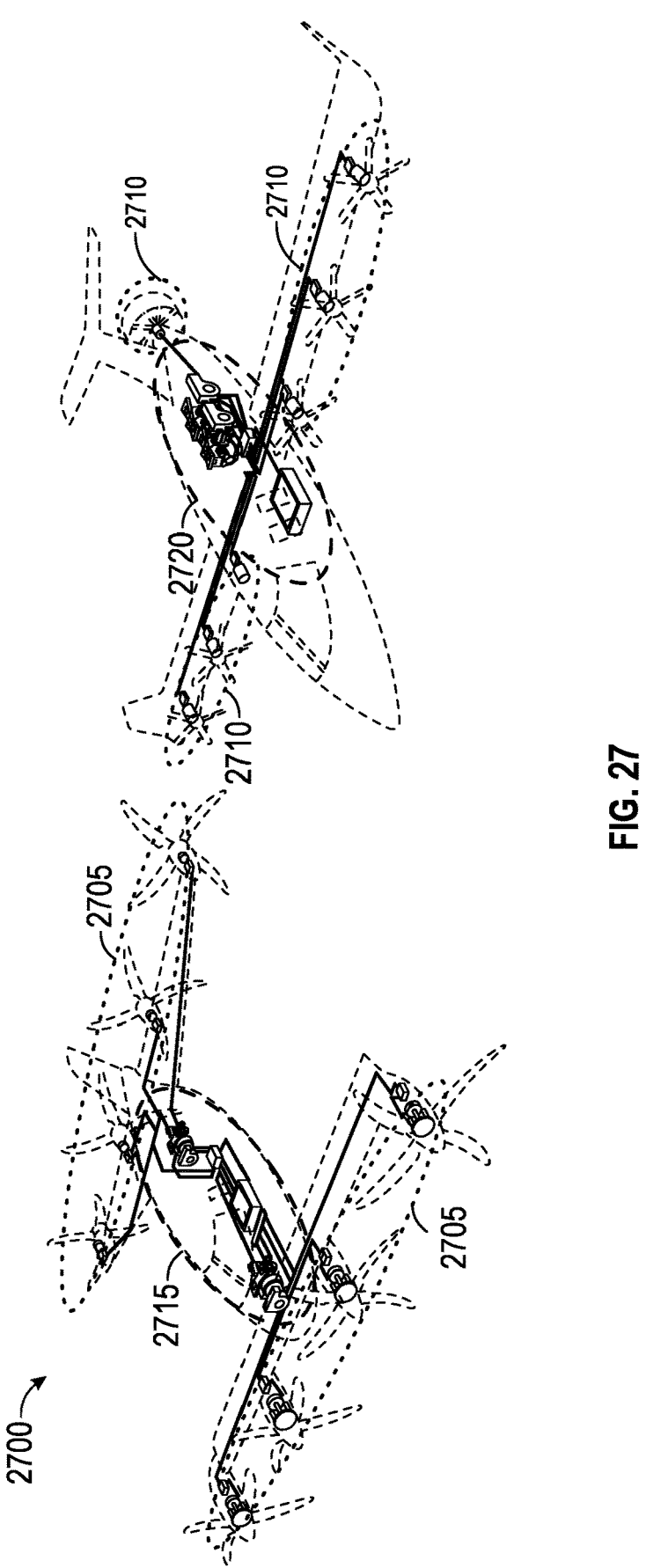
FIG. 27 illustrates example downstream and upstream components for propelling an aircraft in accordance with an illustrative embodiment.

FIG. 27 illustrates example downstream 2705, 2710 and upstream 2715, 2720 components for propelling an aircraft 2700 in accordance with an illustrative embodiment. For example, downstream components 2705, 2710 of an aircraft system may include motors, rotors/propellers, attitude control components, etc., that are more related to the specific design of an aircraft. Upstream components 2715, 2720 of an aircraft that may be repeatable within different aircraft may include any of engines, generators, batteries, power distribution, fuel, generator noise abatement, etc.

Specifically, the upstream end of the powertrain may include hybrid powertrain elements responsible for producing electrical power. Such components may include the engine, generator, power electronics, control systems (for the upstream power generation components), cooling systems (for the upstream components), battery pack, and/or fuel. The downstream end of the powertrain may include hybrid powertrain elements responsible for turning the electrical power into thrust, attitude control, and/or active control of aerodynamics. These downstream components may further include electric motors, propellers, motor controllers, and/or control systems for the propulsion system.

As such, there may be common upstream powertrain needs across very different electric aircraft designs that are of similar sizes and total power requirements. However, the downstream powertrains may have little consistency from one aircraft to the next and therefore these components may not be standardized to work on many aircraft designs the way the upstream components can. Furthermore, the upstream elements that lend themselves to standardization may include the components that are linked to the power requirements but not the total energy requirements. In the case of the engine, generator, power electronics, cooling systems, and/or control systems, these elements of the upstream powertrain may be sized to fit a specific power requirement (kW or hp) of an aircraft. However, the quantity of fuel and the size of the battery pack may be driven by total energy requirements (kWh or hp hr) and these may vary from aircraft to aircraft. In such embodiments, the volume of fuel may be scaled by changing the size of the fuel tank to match the requirements of the aircraft design, and the capacity of the battery pack in kWh may be scaled by adjusting the number of parallel stacks of cells within a battery pack or by adding additional battery packs.

Therefore, provided herein are embodiments for supplying a hybrid powerplant that tightly integrates the engine, generator, power electronics, control systems (for the power generation system), and/or cooling systems in a weight-efficient and space efficient manner that can be certified as a standalone unit designed to provide propulsive power that is separable from the aircraft.

In addition, as described herein, a rotor inside the generator may be optimized to serve multiple purposes in the context of a hybrid powerplant. Conventional combustion engines may have a flywheel mass attached to the rotational shaft to enhance smoothness of operation. However, in the context of an aerospace system it may be unattractive to add extra mass. When an engine is coupled to a generator in a hybrid powerplant as described herein, the rotor in the generator may be designed to withstand any torque impulses from the engine and it may be designed to be the rotating mass that the engine utilizes for smoothness of operation.

Further, while auxiliary power units are known in the prior art, these systems may be designed for different purposes than as a primary source of propulsion power for an aircraft, and therefore may not have control systems capable of being certified to the standards required for use in propulsion. Additionally, such systems may be designed without the cooling systems, leaving that aspect to the airframe designer. As such, these systems are not certified to Part 33 (FAA regulations for aircraft powerplants). Also, these auxiliary power unit systems are designed to be lightweight auxiliary systems that are used intermittently rather than for highly efficient propulsion systems that are used in all phases of flight. Additionally, auxiliary power units may be designed to produce alternating current (AC) power, whereas hybrid electric powerplants as described herein may produce direct current (DC) power so that the hybrid electric powerplants may be coupled to a large propulsive battery pack, as battery packs provide and are charged using DC power.

Turbogenerators are a type of adapted auxiliary power units that have been proposed for hybrid power. Such systems lack cooling system integration that provides an airframe developer with a cooling system that is part of the hybrid powerplant. As such, airframe developers may be left to design their own cooling systems to accompany use of a turbogenerator. Using the embodiments herein, separate cooling systems for cooling the hybrid powerplants described herein may advantageously not need to be designed or developed for particular airframes, as such cooling systems are already included in the flexible architectures described herein.

As such, the flexible architectures and hybrid electric powerplants described herein advantageously provide an engine that converts liquid fuel (or gaseous fuel) into rotational mechanical power, a generator coupled to the engine that is configured to convert the rotational mechanical power to electricity, and/or power electronics coupled to the generator that are configured to convert the direct AC output of the generator to high voltage DC power. The flexible architectures and hybrid electric powerplants described herein further advantageously provide control systems that are configured to vary the power output of the engine to match the power demand on a main propulsive electrical bus of an aircraft to meet the demands of an aircraft for electric power.

Hybrid powerplant control systems, power electronics, generator, and/or engine designs described herein may further comply with regulatory requirements for the reliability of propulsive aerospace systems (e.g., failure should have a probability of less than 10-6 or ten to the power of negative six). Flexible architectures and hybrid electric powerplants may further include a control interface that enables the flexible architecture or hybrid powerplant to communicate with a vehicle-level flight control systems to enable propulsive power commands to be provided from the vehicle-level flight control systems to the hybrid-powerplant control systems, and also advantageously provide for the hybrid-powerplant control systems to send status messages back to the vehicle-level flight control systems (e.g., feedback for use in controlling the flexible architecture or hybrid powerplant). Flexible architectures and hybrid electric powerplants may further include cooling systems that maintain the temperature range of the generator, power electronics, and/or engine over a full range of operating power output of the flexible architectures and hybrid electric powerplants described herein.

Various embodiments of flexible architectures or hybrid electric powerplants described herein may further include control systems that vary power output by varying engine torque and/or maintain rotations per minute (RPM) substantially constant over a significant range of power output. Such embodiments may provide for faster response of the flexible architectures or hybrid electric powerplants by eliminating throttle lag and a longer response time relating to system rotational inertia.

Various embodiments of flexible architectures or hybrid electric powerplants described herein may further include the option to provide a portion of the engine's power output as mechanical shaft power and a portion provided as DC electrical power. Various embodiments of flexible architectures or hybrid electric powerplants described herein may further include that the engine may be a piston engine, diesel piston engine, turbine engine, rotary engine, or other forms of combustion engine. Various embodiments of flexible architectures or hybrid electric powerplants described herein may further include examples where the rotor of the generator is designed to be a flywheel for the engine. Various embodiments of flexible architectures or hybrid electric powerplants described herein may further include a clutch between the engine and generator to enable operation of the generator as a motor that can be operated while the engine is shut down in some types of parallel hybrid installations as described herein.

As described further below with respect to FIGS. 9-21, various embodiments described herein also provide for simultaneous air cooling of multiple elements of a hybrid powerplant, such as the hybrid flexible architectures described herein. For example, an engine (e.g., a piston engine, rotary engine, turbine engine, etc.), an electric machine (e.g., generator, motor, or generator/motor as described herein), power electronics, and/or induction air for an engine of a hybrid system may all advantageously be efficiently and simultaneously cooled with the cooling systems described herein. Thus, disparate components of a hybrid powerplant with separate cooling components may be linked together with a combined air cooling system that may reduce weight of the aircraft, increase reliability of the aircraft, etc.

Various embodiments of the cooling systems described herein utilize air cooling, such that air is provided to different aspects or components of a hybrid powerplant. Air is lighter than other mediums that may be used for cooling, such as water. Thus, the embodiments described herein may have a weight advantage over other systems, such as those that use liquids such as water as a primary medium for cooling. Water cooling systems, in addition to their greater weight than air-based systems, may also encounter problems with icing, particularly in aircraft that may be operated at higher altitudes and therefore experience low temperatures.

An example embodiment advantageously connects a fan, impeller, and/or blower to a power shaft or crankshaft of the flexible architectures described herein (e.g., power shaft 111 of FIG. 1A, crankshaft 160 of FIG. 1B, power shaft 180 of FIG. 1B), such that the fan, impeller, and/or blower is mechanically driven based on power imparted on the power shaft or crankshaft by an engine (e.g., engine 105 of FIG. 1A, engine 155 of FIG. 1B) or a generator/motor (e.g., generator/motor 121 of FIG. 1A, generator/motor 185 of FIG. 1B) of the flexible architectures described herein. As such, the fan, impeller, and/or blower is configured to provide air cooling directly off mechanical power received from the spinning power shaft and/or crankshaft and may provide air to multiple system elements for cooling, which may include providing air directly to components for cooling or providing air to one or more heat exchangers or finned heat sinks that are used to cool other components (e.g., components that have their own liquid cooling systems). It should be understood that unless otherwise stated, the terms fan, blower, and/or impeller may be used individually to refer to any of a fan, blower, impeller, or any other similar component, as well as any combination thereof of such elements. In various embodiments, instead of a single fan, impeller, and/or blower, multiple fans, impellers, and/or blowers may be connected either directly or indirectly to a shaft (if indirectly, through one or more gearboxes, pulleys, torque converters, or any other power transmission method, where there may be a single gearbox or torque converter or may be one of a gearbox or torque converter associated with each of the fans, impellers, and/or blowers) to direct air to different components of a flexible architecture and/or cooling system as described herein.

The embodiments described herein provide for lighter weight systems than those that use separate cooling for individual components of a flexible architecture. In addition, since mechanical power from a power shaft or crankshaft may be provided directly to drive a fan, the embodiments herein may reduce conversion losses that may occur in systems where mechanical power is converted to electric power to drive electric fans. As such, mechanical power from the flexible architecture may be converted directly to air cooling flow. The embodiments described herein further provide for lightweight and efficient systems because the cooling fan and associated ductwork may be closely coupled or placed with respect to the rest of the flexible architecture, thereby yielding an efficient, lightweight, and compact system for powering an aircraft. The embodiments also increase efficiency by reducing distance between a cooling inlet for the air cooling system and the devices or components that are being cooled.

FIG. 9 illustrates an example schematic of a cooling system for a hybrid powerplant in accordance with an illustrative embodiment. The hybrid powerplant may be, for example, any of the flexible architectures described and/or shown in this application, such as those discussed with respect to and shown in FIGS. 1-8.

The cooling system of FIG. 9 includes a blower 902 that is powered via direct mechanical energy from a shaft passing through the generator/motor 914. The shaft may also be connected to the engine 904. In this way, the shaft may be driven by either or both of the generator/motor 914 and the engine 904. The engine 904 may be a piston engine, a turbine engine, a rotary engine, or any other type of combustion or other engine. An inverter 912 may further be attached to the generator/motor 914 so that electrical power may be generated from rotation of the shaft or electrical power may be used to input into the generator/motor 914 to rotate the shaft (e.g., from a battery pack or other source of electrical power). The engine 904 may further include cylinders 906, oil 908 for an oil cooling system, and a turbocharger 920. A charge-air cooler 918 may further be included in the system to work with the turbocharger 920. The system further includes an oil cooler 916 and miscellaneous hardware 910 (e.g., control or other electronics).

The blower 902 is configured to rotate upon the engine 904 and/or the generator/motor 914 turning the shaft to which the blower 902 is connected. The cool air from the blower 902 may be directed through various ductwork to the motor/generator 914, the miscellaneous hardware 910, the cylinders 906 of the engine 904, the oil cooler 916 (e.g., a heat exchanger), the charge-air cooler 918 (e.g., a heat exchanger), or any other components that are desired to be cooled. In various embodiments, some of the components to which air are directed may be or may include a heat exchanger (e.g., an air-air heat exchanger, an aid-fluid heat exchanger), such that air from the blower 902 may be used to indirectly cool a component via a heat exchanger. In various embodiments, any of the components of FIG. 9 or otherwise part of a flexible architecture may include heat sink elements, such as a set of fins configured to sink heat from a component into air from the blower 902. As such, components may also be indirectly cooled through a heat sink feature that is in contact with cool air from the blower 902. In various embodiments, a combination of a heat exchanger and a heat sink (e.g., fins) may be used to cool a component. For example, a heat sink element may release heat into air or fluid on a first side of a heat exchanger, and air from the blower 902 may be directed to a second side of the heat exchanger to remove heat from the air or fluid on the first side of the heat exchanger.

Accordingly, the blower 902 may be used to cool various components of a flexible architecture as further described herein. For example, air from the blower 902 may be directed to the oil cooler 916, which is an air-fluid heat exchanger that is configured to exchange heat between air from the blower 902 and oil in the oil cooler 916. Cooled oil from the oil cooler 916 may then be circulated into the oil cooling system 908 of the engine 904 to cool the engine 904 (e.g., remove heat from the engine 904 by transferring it to the oil). Hot oil from the oil cooling system 908 may then be circulated back to the oil cooler 916 to again be cooled via air from the blower 902.

Cool air may also be provided to the charge-air cooler 918. Ambient air may enter the turbocharger 920, be compressed, and then output to the charge-air cooler 918. The compressed air from the compressor inlet side of the turbocharger 920 may then be cooled at the charge-air cooler 918 using air directed to the charge-air cooler 918 from the blower 902. In other words, the charge-air cooler 918 may act as an air-air heat exchanger. Cool air may then be output from the charge-air cooler 918 to an intake of the engine 904 to be used, for example, in a combustion cycle of the engine 904. The exhaust output from the engine 904 may then be directed to a turbine or hot side of the turbocharger 920, which then outputs the air as exhaust into the environment. In this way, air used by a turbocharger and or engine may ultimately be cooled indirectly using an air-air heat exchanger of a charge-air cooler as part of a turbocharger cycle.

As such, various components of a flexible architecture as described herein may be cooled. Cylinders (or rotors) of diesel aircraft engines (e.g., a piston combustion engine) may be air cooled or liquid cooled. In the example of FIG. 9, the cylinders 906 are air cooled. However, the cylinders may additionally or alternatively be liquid cooled by adding a heat exchanger between the liquid of the cylinder liquid cooling system and cool air provided by the blower 902. If liquid coolant is used, that liquid may be a water-glycol mix, for example. Similarly, cylinder heads of a diesel aircraft engine (e.g., a piston combustion engine) may be air cooled, oil cooled, or water-glycol cooled. As such, air from blower 902 may be used to directly or indirectly (using a heat exchanger or finned heat sinks), similar to the cylinders described herein. In other engines than a piston engine, such as turbine or rotary engines, components of those engines may include liquid or air cooling systems as well, and therefore benefit from the cooling systems described herein as well (e.g., through direct cooling using air from the blower 902 or via a heat exchanger between air from the blower 902 and liquid coolant of a separate cooling system of or associated with the engine).

Engine oil of an engine may also be cooled in a flexible architecture. In the example of FIG. 9, the oil 908 is circulated through the oil cooler 916, which exchanges heat between the oil 908 and the cool air provided by the blower 902. Heat absorbed by the oil 908 in the engine 904 may come from bearing shear within the engine 904, and oil may also be used for other cooling such as cylinder heads and/or pistons (or rotors).

Charge air (induction air) is typically air cooled and this is required due to turbocharging. Turbocharging is very common on aircraft to expand the usable range of altitude with power to meet the mission, plus turbocharging significantly improves overall thermal efficiency of the engine. Compressing the intake air raises its temperature, and this temperature may be reduced before being introduced to the cylinders to avoid problems related to piston cooling, detonation, and others.

An electric motor/generator (also referred to herein as an electric machine), such as the motor/generator 914 of FIG. 9, may also be cooled due to the presence of electrical resistance and current in the electrical and electronic components of the motor/generator 914. This cooling may be accomplished by air cooling, such as from the blower 902, or liquid cooling, such as via a heat exchanger provided with cool air from the blower 902. Liquid cooling may be via water-glycol mix or a dielectric (non-conductive) fluid, for example.

An inverter (with associated power electronics), such as the inverter 912 of FIG. 9, may be cooled, again owing to heat created in electrical circuits such as high-speed switches and other hardware therein. Such cooling may be accomplished via air cooling, such as from the blower 902, or liquid cooling, such as via a heat exchanger provided with cool air from the blower 902. Liquid cooling may be via water-glycol mix or a dielectric (non-conductive) fluid, for example.

Other elements of the hybrid powerplants described herein may achieve passive cooling. In other words, cooling requirements for system elements including but not limited to a clutch (if present), couplers, supervisory or other controller(s), fan bearings/seals, etc. may be satisfied by their normal service environment with no active design feature (fan, pump, radiator) to enhance the cooling provided. In various embodiments, as needed, active cooling via air cooling, such as from the blower 902, or liquid cooling, such as via a heat exchanger provided with cool air from the blower 902 may be provided to any component of an aircraft as described herein.

As discussed above, air or fluid systems may be used to cool various aspects of an aircraft. However, the embodiments herein provide for reducing the number of fluid cooling systems that may be used in an aircraft for cooling various aspects of that aircraft. Fluid cooling systems may use one or more pumps in order to circulate fluid. Such a pump may be mechanical or electrical. If it is a mechanical pump, there is weight and complexity related to the pump. The pump itself may also be located on the aircraft, adding weight and complexity to the aircraft. A pump may also have, bearings, seals, and/or plumbing joints that may leak. If a pump is powered by electricity, such a pump may be rated for heat transfer and therefore require relatively high power (e.g., 5000 Watts (W) or more).

Fluid systems may also be designed to accommodate expansion and contraction of the fluid during service, for bleeding air during system fill, for system draining during service or for other reasons, and/or provision for fluid spills in design and/or operations of the aircraft. All of these factors may represent engineering complexity and certification challenges and there may be advantages in avoiding them and using the air cooling systems as described herein.

Fluid systems may also have issues with ice formation, such as at temperatures below −35 F (−35 C). Thus, systems can fail or be less efficient when ice forms, or additional components to avoid ice may be added, which further adds weight and complexity to a cooling system.

Fluid systems may also use a heat exchanger of some sort. This may be fluid-fluid to transfer the heat of a hotter fluid into a cooler fluid, or it may be fluid-air to transfer the heat to air which is exiting overboard. In any case, each heat exchanger represents weight and volume (which contributes to weight for the flexible architecture/powerplant system and/or the entire aircraft), several potential failure points where leaks can take place (at least two, plus a bleed and a drain), and often includes welding which has specific metal fatigue risks. While some heat exchangers may still be used in the embodiments described herein (e.g., to cool engine oil), reducing the number of heat exchangers and/or fluid cooling systems may be advantageous as described herein.

In some example aircraft where a fluid cooling system uses a fluid-air cooler, depending on the aircraft and the overall system design, such a system may use a dedicated fan to move air and execute the desired heat transfer. Such fans may be electrically driven, which may therefore require high power motors that are rated for heat transfer (e.g., 5000 W or more). As discussed above, pumps for fluid systems may also be used that are rated for high power given their use in a heat transfer application.

The use of high power rated pumps and fans may be particularly disadvantageous for an aircraft cooling system. Numerous pumps, coolers, and/or fans may be heavy, complex, may occupy significant space, and introduce multiple potential points of failure. To the extent electric pumps and/or fans are used, suitable electricity must also be supplied to keep the cooling systems running. If an aircraft, for example, is on an extended mission (e.g., more than a few minutes), stored energy (e.g., batteries) may not be sufficient to provide power to such pumps and fans, and therefore a generator or other power source would be provided. In some cases, such a generator may be an alternator directly attached to an engine, it may be via a separate generator, or via one or more DC-DC converters. In particular, on an aircraft characterized by distributed electric propulsion with high-voltage electrical power intended for one or more lift or propulsion motors, it may be logical to use DC-DC to convert a portion of this high-voltage power to low-voltage for use by pumps and fans. However, such components again add complexity and weight to a cooling system.

Any additional electrical circuitry may have additional connections for power, ground, and control. These connections may be heavy, and necessarily have size and stiffness (e.g., minimum bend radius), therefore taking up additional volume around a given electronic device for safe connection and provision of power to the device. Each powered device may also have short-circuit protection components such as a fuse or breaker, which protects the device but may also be resettable for safety reasons. Various electronic devices may also include components that provide for safe handling of service crew and/or possibly may include a control element to tailor the function of devices for various parameters of a mission. Any such components again add weight and complexity to a cooling system.

If a DC-DC conversion is used, and the direction of voltage is from higher to lower voltage, then significant heat may be generated resulting in lost efficiency and yet another system element which may require active cooling.

In addition, wherever additional electrically powered devices are added, conductors made of copper may be used. Copper is often preferred for carrying of electrical current in aircraft. The gauge of copper (diameter of the wire) is determined by a combination of the current in service and the local heat transfer available. Everything associated with wiring may be heavy: the conductor, the insulation, connectors at each end, physical support of the wire to prevent chafing, and/or additional armor applied to the wiring to prevent physical damage. Since active heat transfer of conductors and connectors may not be practical, size of conductors may be increased to keep temperatures low resulting in higher weight. As such, it is again desirable to reduce the number of electrically powered devices to reduce weight and complexity of a system. Similarly, it is therefore also desirable to reduce the number of components or systems that utilize fluid cooling in an aircraft.

Figure 10:
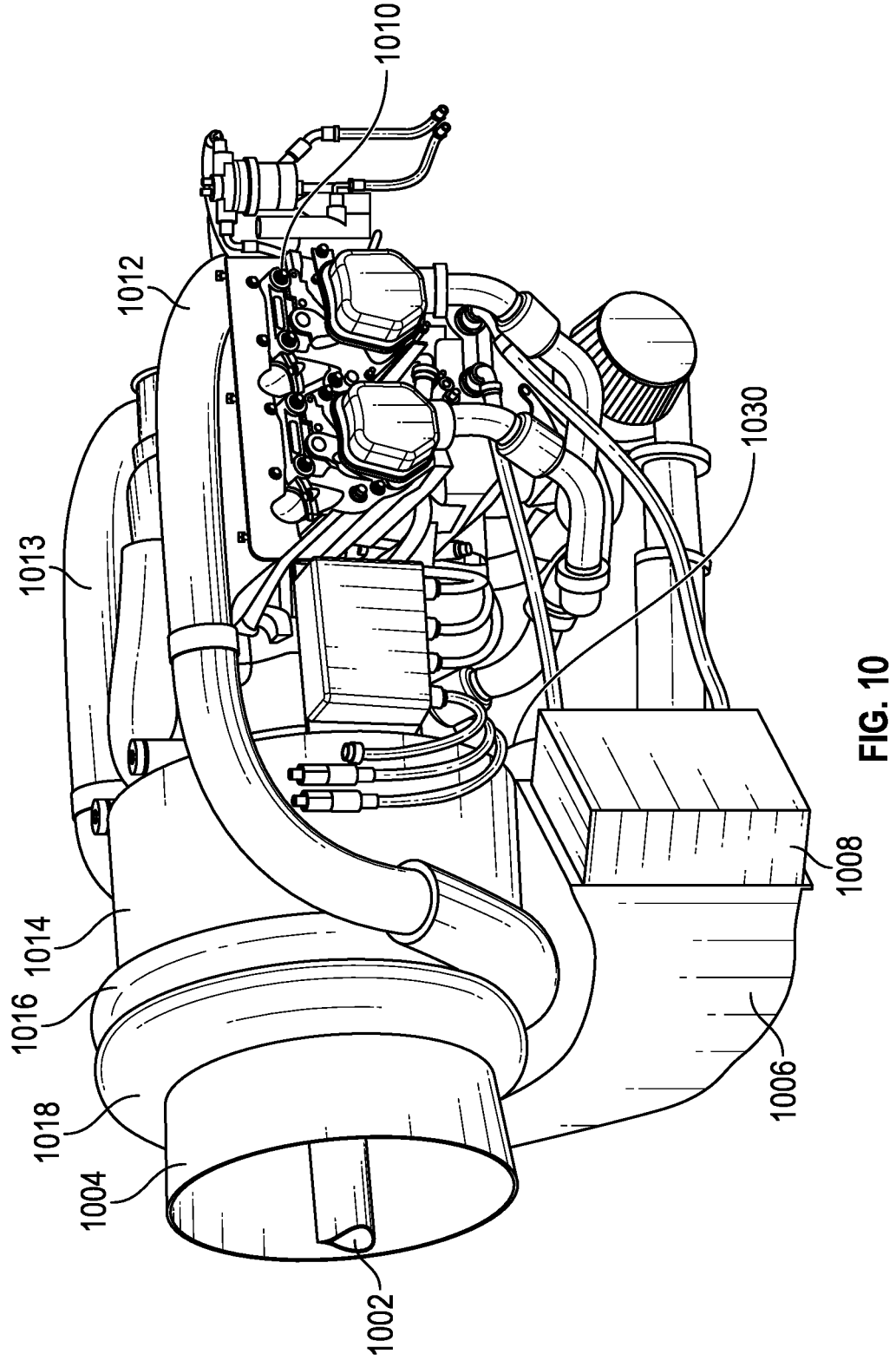
FIG. 10 illustrates an example hybrid powerplant with a cooling system in accordance with an illustrative embodiment
Figure 11:
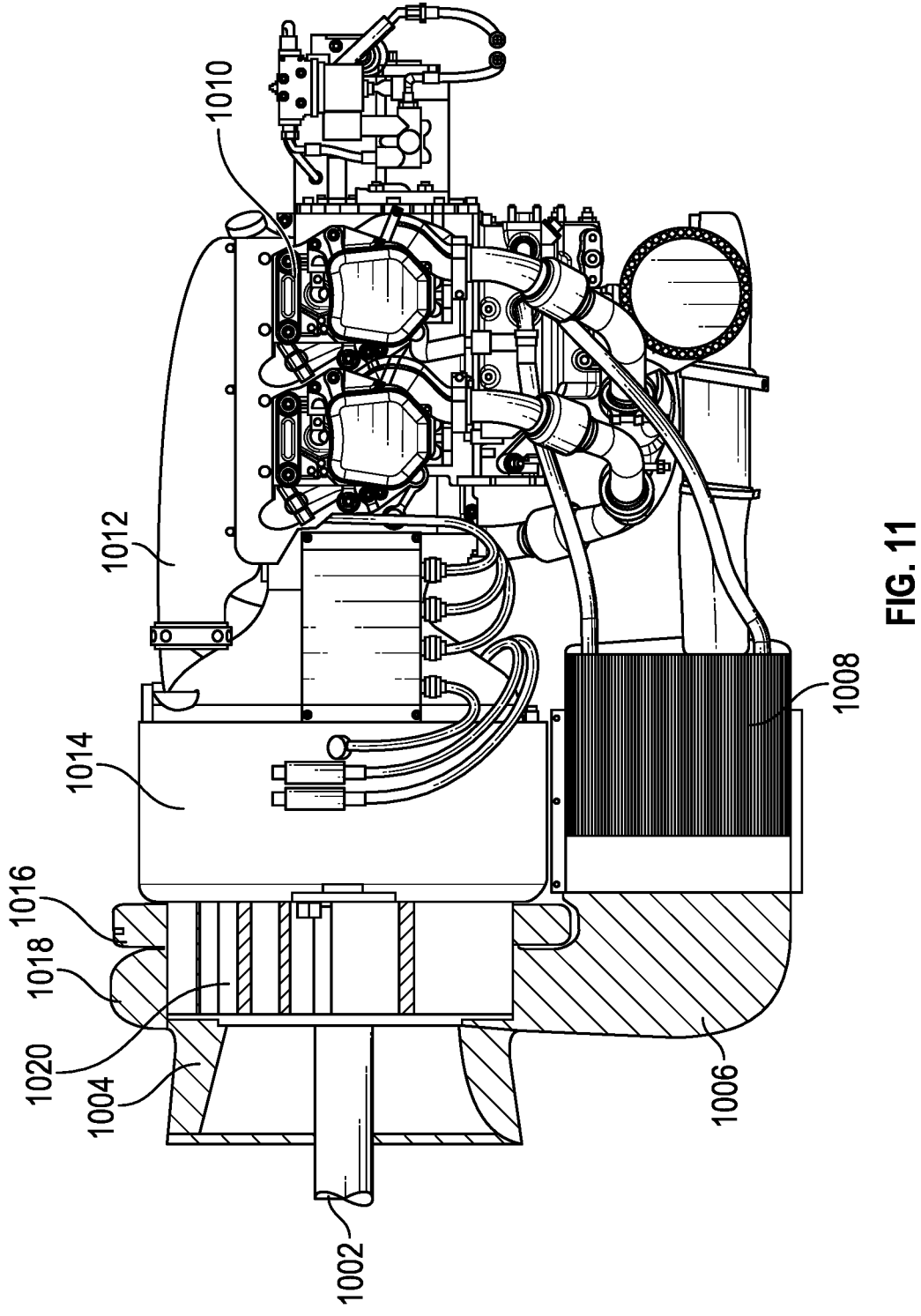
FIG. 11 illustrates a cross-sectional view of the example hybrid powerplant with a cooling system of FIG. 10 in accordance with an illustrative embodiment.
Figure 12:
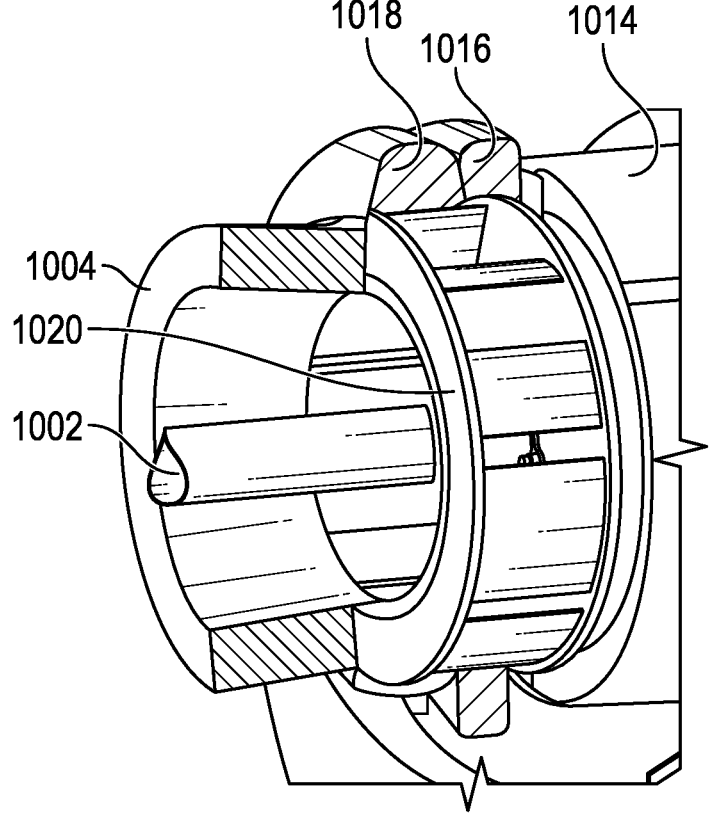
FIG. 12 illustrates a partial cross-sectional perspective view of the example hybrid powerplant with a cooling system of FIG. 10 in accordance with an illustrative embodiment.

FIG. 10 illustrates an example hybrid powerplant with a cooling system in accordance with an illustrative embodiment. FIG. 11 illustrates a cross-sectional view of the example hybrid powerplant with a cooling system of FIG. 10 in accordance with an illustrative embodiment. FIG. 12 illustrates a partial cross-sectional perspective view of the example hybrid powerplant with a cooling system of FIG. 10 in accordance with an illustrative embodiment.

In particular, FIGS. 10-12 together depict a cooling system that may be used with a hybrid powerplant, where the cooling is powered directly by mechanical power and provides cool air for various systems of the hybrid powerplant simultaneously, thereby achieving the various advantages of reducing fluid cooling and electrically powered systems present in an aircraft. A shaft in the generator/motor may provide power from an engine 1010 and/or a generator/motor (not shown, as it is within housing 1014) to a fan blade 1020. The shaft 1002 may provide power to a mechanical component, such as a fan or a propulsion mechanism like a propeller. An inlet 1004 receives ambient air and the fan blade 1020 moves the air into duct work 1006, 1012, 1013, 1016, 1018, and the shroud 1014 (e.g., an annular. In the example of FIGS. 10-12 the fan blade 1020 is a centrifugal blower, such that it directs air that is approximately perpendicular or normal to an axis of the fan blade 1020. In various embodiments, an axial blower and/or a combination blower may be used additionally or alternatively to a centrifugal blower as shown in FIGS. 10-12.

Because such blowers as the fan blade 1020 may be mechanically driven from the shaft 1002, there may be little or no conversion losses and the power consumed may be measurable in cooling air pressure and flow rate provided to cool other components of the system. In contrast, electrical fans may suffer from losses due to conversion of shaft power to electrical power (generation), conversion of voltage (DC-DC), transmission of power ($I^2R$ loss), and possibly other losses.

As such, the cooling system depicted in FIGS. 10-12 provides simultaneous cooling of multiple devices and systems from one shaft, turning at one set rotations per minute (RPM) rate, with an airflow inducing element attached. In various embodiments, more than one airflow inducing elements (fans or blowers) may be attached to the single shaft such as the shaft 1002. In this way, different airflow inducing elements may direct different amounts of air, in different directions, with different pressure levels, etc. as described for a given system or component.

Various embodiments may provide series or parallel cooling (or both) of various combinations of system components. The system shown in FIGS. 10-12 provides for parallel cooling of various components via different ductwork. Air may be introduced to ductwork 1018 (at a point A in FIG. 12) from the fan blade 1020 and travel through ductwork 1006 to a heat exchanger 1008. The heat exchanger 1008 may be used, for example, as the charge-air cooler 918 or the oil cooler 916. In the example of FIGS. 10-12, both a charge-air cooler (or other induction air heat exchanger) and an oil cooler may be present, but only one of those components is visible in the views of FIGS. 10-12, while the other component is blocked from view (though it is partially visible as heat exchanger 1030 in FIG. 10). The heat exchangers 1008 and 1030 may be connected to ductwork 1018 with two separate ducts, only one of which is visible in FIGS. 10 and 11 (e.g., ductwork 1006).

Air may be introduced to ductwork 1016 (at a point B in FIG. 12) from the fan blade 1020 and travel through ductwork 1012 and 1013 to cool cylinders of the engine 1010 (similar to the cylinders 906 of FIG. 9). A shroud 1014 may be placed over or around an electric machine (e.g., a generator motor), and may act as ductwork to provide cool air to cool such an electric machine. Air may be introduced to the shroud 1014 (at a point C in FIG. 12) from the fan blade 1020 and travel through to the shroud 1014 (e.g., to cool motor/generator 914 and/or the inverter 912 of FIG. 9). As such, in FIGS. 10-12, a single centrifugal blower may be shaft driven using power from the engine crankshaft or a power shaft, causing cooling air to enter the blower along and parallel to the axis of rotation. Air then moves radially outward and is collected by three volutes A, B, and C arranged side by side around the blower wheel.

With further reference to FIG. 12, section A of the volute that is most distant from the attachment of the blower wheel to the hybrid powerplant, collects airflow into the enclosed duct 1018. This duct 1018 is then arranged to feed cooling airflow with elevated pressure to two aluminum heat exchangers in a V shape arrangement. One of these coolers may be for engine oil, while the other may be for engine induction air.

Section B of the volute that is between Section A and C (e.g., the middle section) collects airflow into two ducts spaced 180 degrees apart from each other, diametrically opposed. These two ducts are arranged to feed cooling airflow to cylinders of a piston engine. Section C of the volute that is most proximal to where the fan blade 1020 attaches to the hybrid powerplant, is a section dedicated to cooling of an electric motor and inverter. This airflow may be contained in a shroud 1014 and forced to flow parallel through the shroud 1014. The shroud 1014 may include within it machined aluminum fins connected to the electric motor and/or inverter housing for the purpose of permitting flow of cooling air and transfer of heat from the electric motor and/or inverter housing to the cooling flow.

Various embodiments may also include more than one centrifugal or radial blower wheel and/or more than one axial fan blade, and they may spin at different RPMs where a gearbox is used. These blowers or fans may be connected to one or more ducts that feed air to a number of dedicated radiators (e.g., fluid-air or air-air heat exchangers) or directly to components that designed to be cooled by airflow (like our cylinders and our motor/generator).

In various embodiments, a single spinning shaft may be used as described herein with two centrifugal blower elements connected back-to-back to one another both attached to the shaft. In such an embodiment, one side of the hub may drive a larger blower that satisfies multiple cooling requirements with relatively high pressure rise and high mass flow. The other side of the hub may drive a relatively smaller blower with the same or a different radius, a provide a different level of pressure rise and mass flow.

In various embodiments, devices may be mechanically driven off the crankshaft and/or power shaft of the hybrid powerplant, including one or more centrifugal blowers and/or one or more axial fan blade sets. This may achieve different packaging requirements/footprints for the system, and/or may be used to provide different airflows with different pressure rise, mass flow, or other engineering parameters desired for a given aircraft and its respective propulsion system and cooling needs.

In various embodiments, a mechanical drive system may not rotate at only a single RPM, but may include gearing or another style off transmission (e.g., belts, continuously variable transmission (CVT), fluid torque converter) to change the RPM of the fan system relative to the crankshaft or power shaft RPM. With such a feature, all the benefits described of avoiding electrically driven cooling systems would be achieved, and the gearing would add flexibility in aerodynamic fan/blower design.

In various embodiments, the ductwork of such systems may be made from various components, such as aluminum, composite materials, three-dimensional (3D) printed materials, etc., or any combination thereof, to achieve a light weight system, where the ductwork material is also capable of being shaped into complex curved surfaces, provide aerodynamic efficiency, etc. Composites such as carbon fiber and epoxy may also be used to bring about a weight reduction in comparison with materials such as aluminum or other metals. The ducts themselves (e.g., between the shaft-driven blower or fan and the devices that require cooling) may also be carefully designed to help balance the pressure drop and air mass flow rate to multiple devices on the genset. This may include shape and size of ducts, constriction along an otherwise straight or simple duct section for engineering purposes.

In various embodiments, thermostatic control may also be added to prevent overcooling (e.g., when ambient air temperature is low). Various embodiments may also include active dampers in ducts to change ratio of air flowing in each duct (e.g., to each component to be cooled). Temperature of those components that are cooled may also be monitored by a controller so that if a component gets too hot the controller can adjust air flow to that component to provide a greater volume and/or pressure of cooling air.

Figure 13:
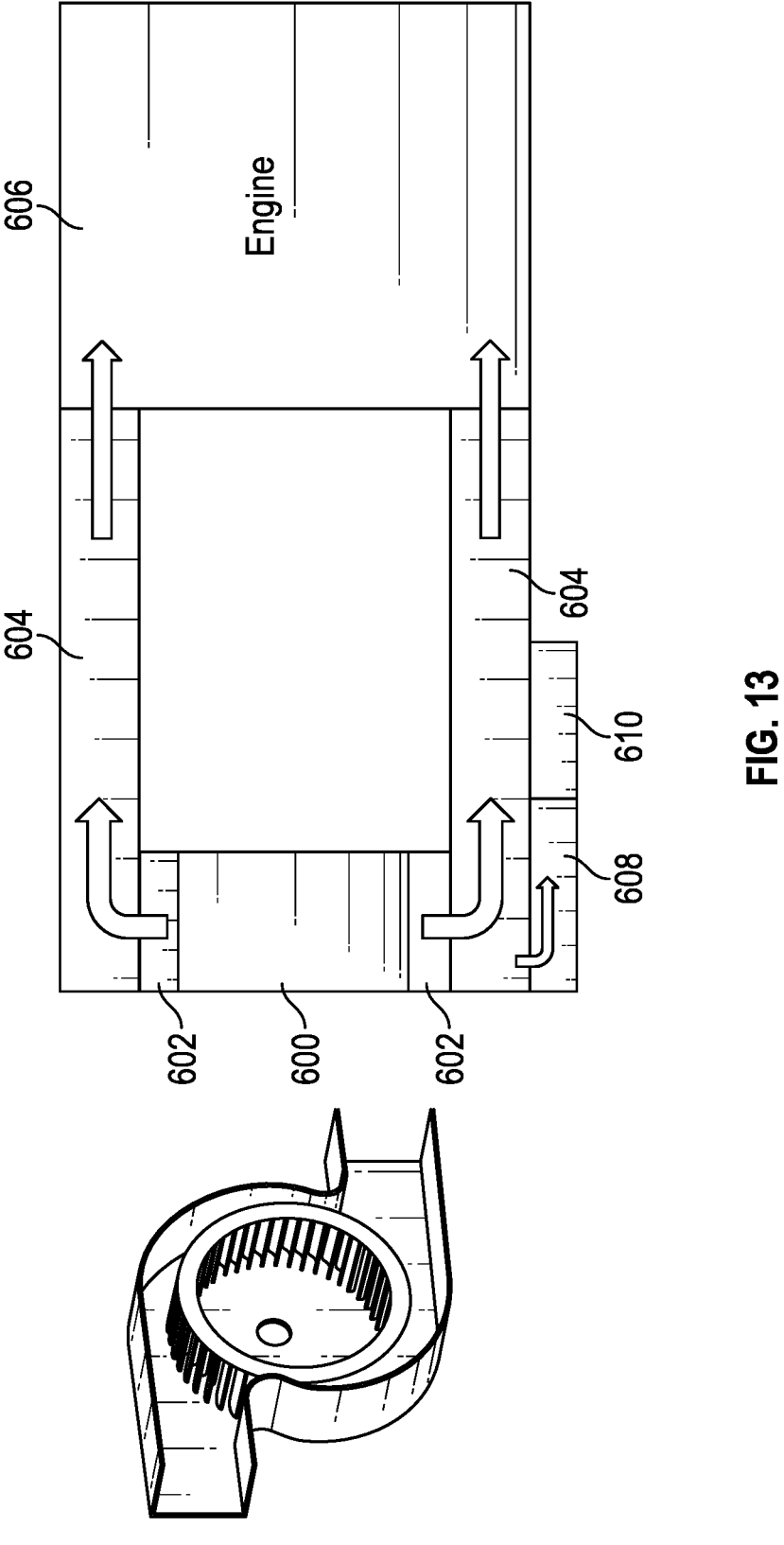
FIG. 13 illustrates a second example schematic of a cooling system for a hybrid powerplant in accordance with an illustrative embodiment.

FIG. 13 illustrates a second example schematic of a cooling system for a hybrid powerplant in accordance with an illustrative embodiment. A blower 600 may intake air and provide it to a charge-air cooler (e.g., engine intercooler), where the air then passes to ducts 602 and onto the engine 606 to cool cylinders of the engine. Other air may pass through duct 608 an engine oil cooler 610.

Figure 14:
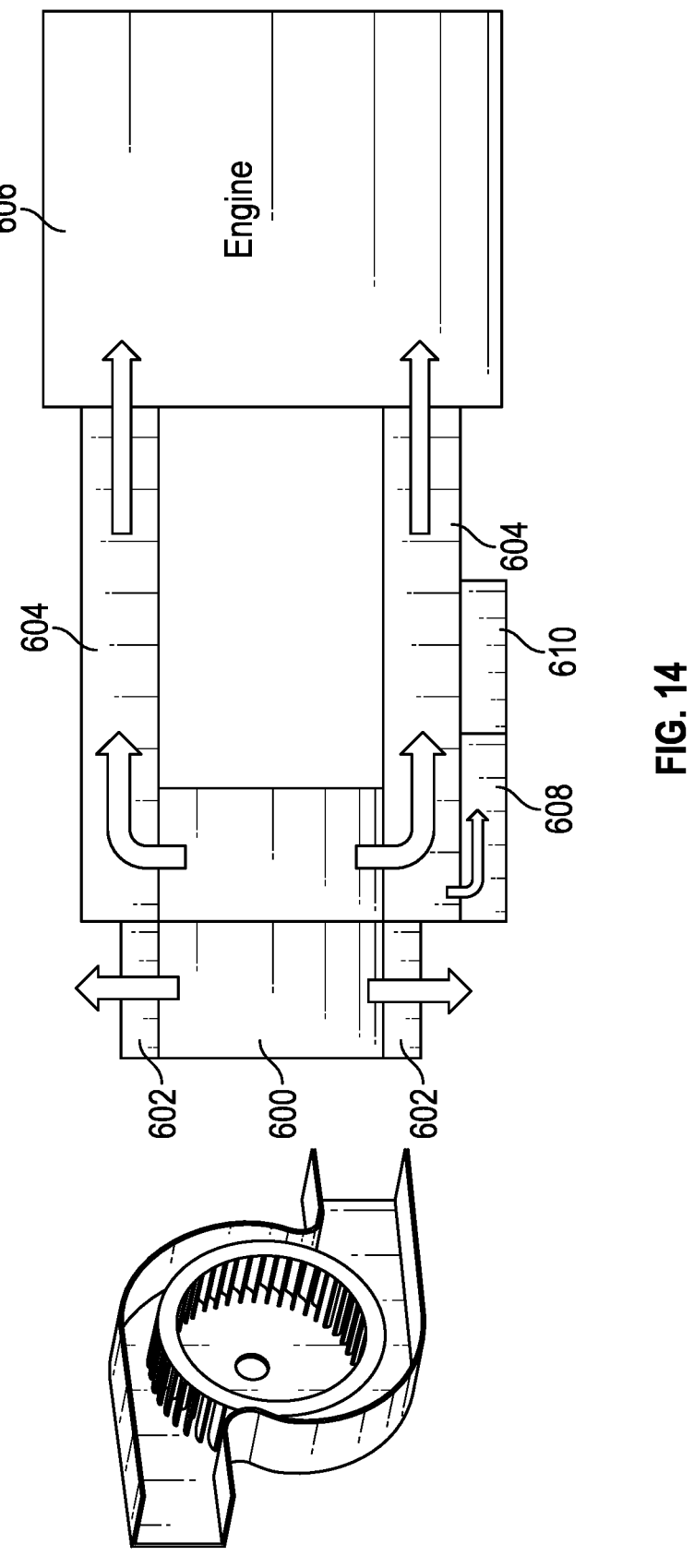
FIG. 14 illustrates a third example schematic of a cooling system for a hybrid powerplant in accordance with an illustrative embodiment.

FIG. 14 illustrates a third example schematic of a cooling system for a hybrid powerplant in accordance with an illustrative embodiment. A blower 600 may provide air to a charge-air cooler 602 and may separately provide air to ducts 604 to cool cylinders of an engine 606. Other air may pass through duct 608 an engine oil cooler 610.

Figure 15:
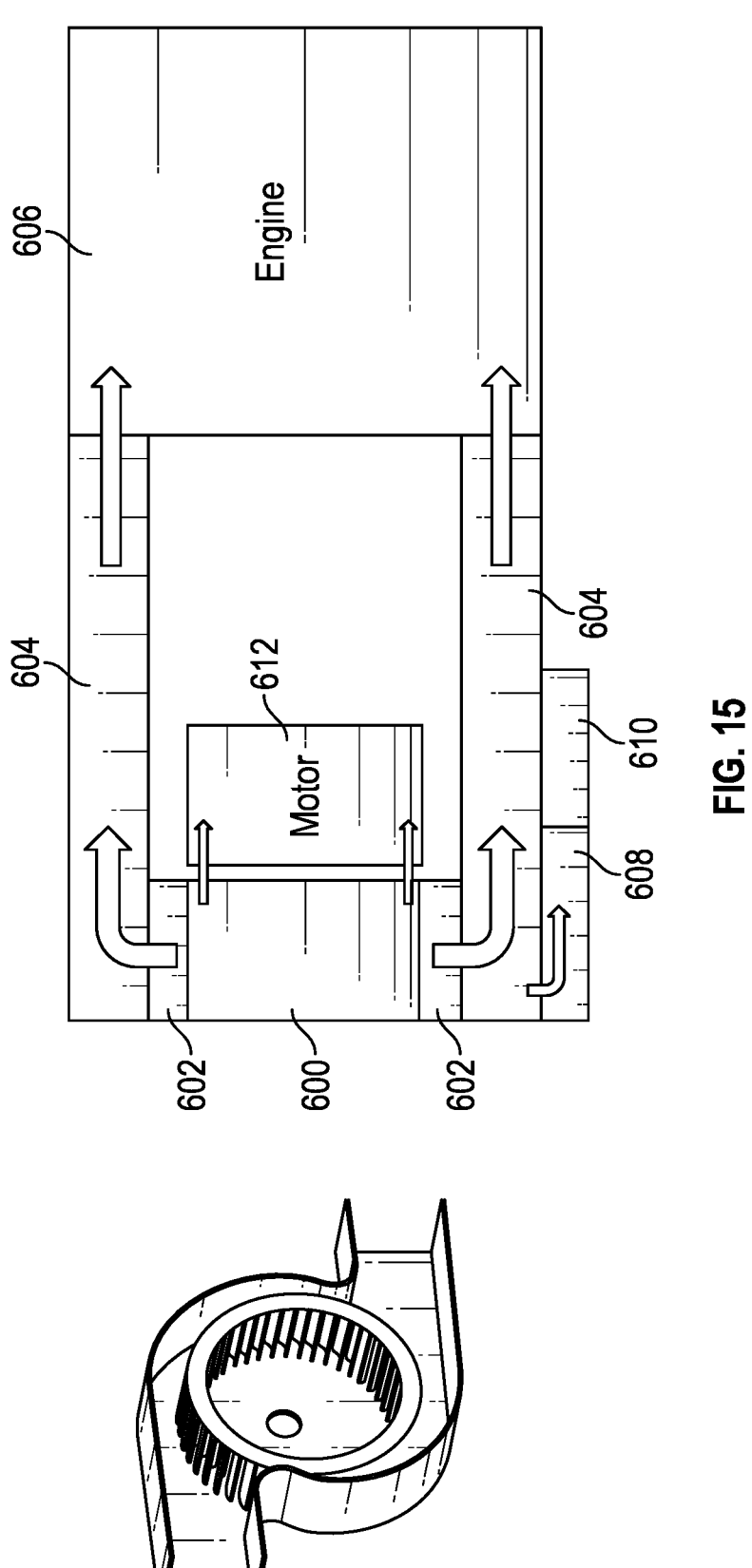
FIG. 15 illustrates a fourth example schematic of a cooling system for a hybrid powerplant in accordance with an illustrative embodiment.

FIG. 15 illustrates a fourth example schematic of a cooling system for a hybrid powerplant in accordance with an illustrative embodiment. FIG. 15 is similar to FIG. 13, example that air is also provided from the blower 600 to a motor 612 (e.g., an electric machine or motor/generator as described herein).

FIG. 16 illustrates a fifth example schematic of a cooling system for a hybrid powerplant in accordance with an illustrative embodiment. FIG. 16 is similar to FIG. 15, except that additional air is provided through duct 614 to a liquid air cooler to cool a motor/generator and/or other power electronics.

Figure 17:
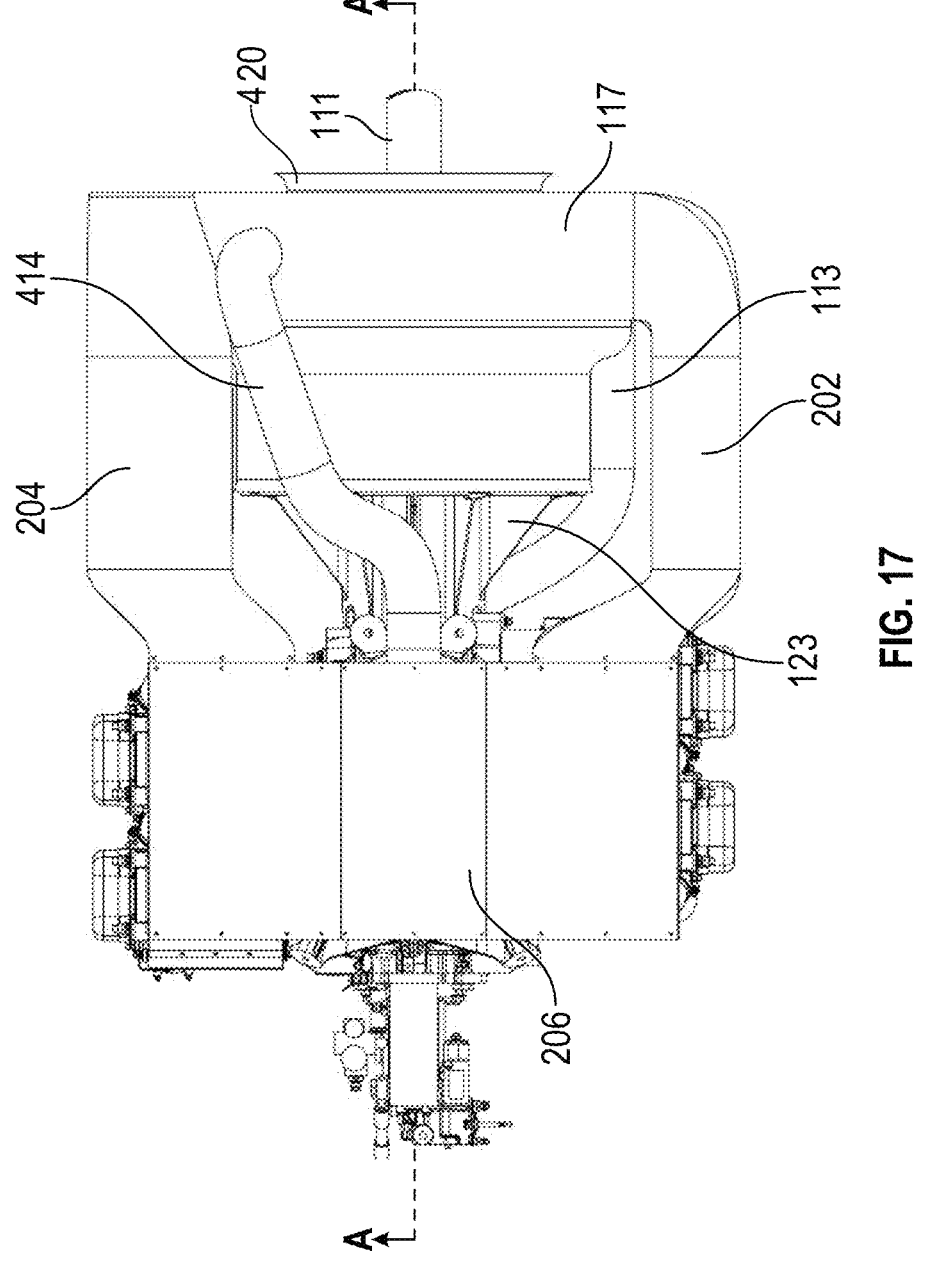
FIG. 17 illustrates a top view of an example hybrid powerplant with a cooling system in accordance with an illustrative embodiment.
Figure 18:
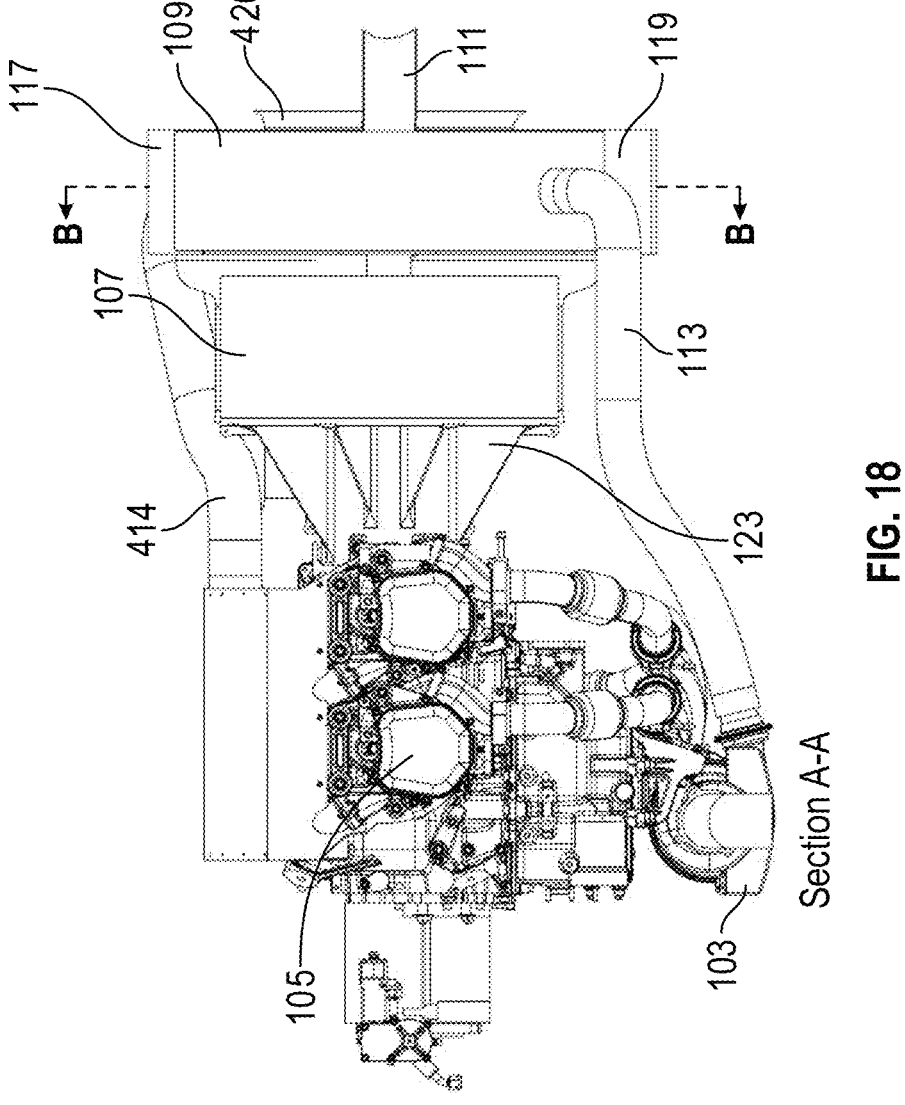
FIG. 18 illustrates a cross-sectional view taken along line A-A of FIG. 17 showing the example hybrid powerplant of FIG. 17 in accordance with an illustrative embodiment.
Figure 19:
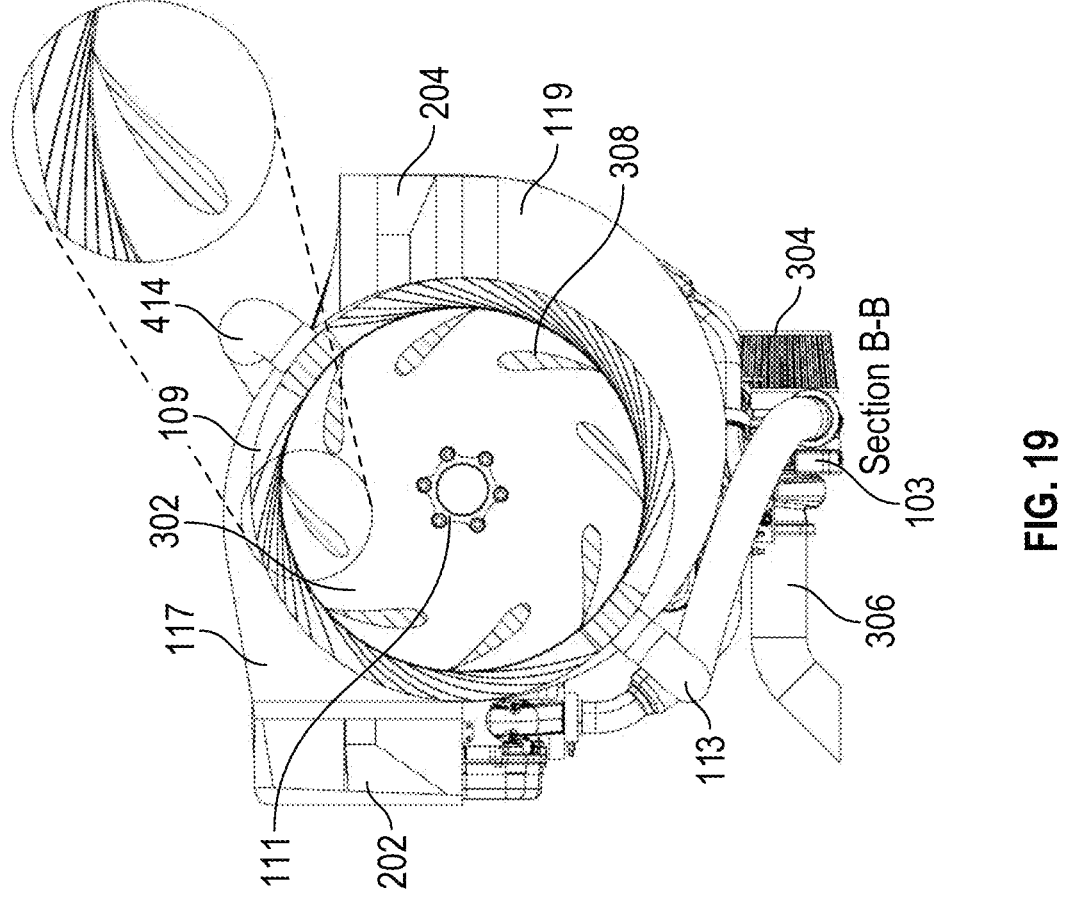
FIG. 19 illustrates a cross-sectional view taken along line B-B of FIG. 18 showing the example hybrid powerplant of FIG. 17 in accordance with an illustrative embodiment.
Figure 20:
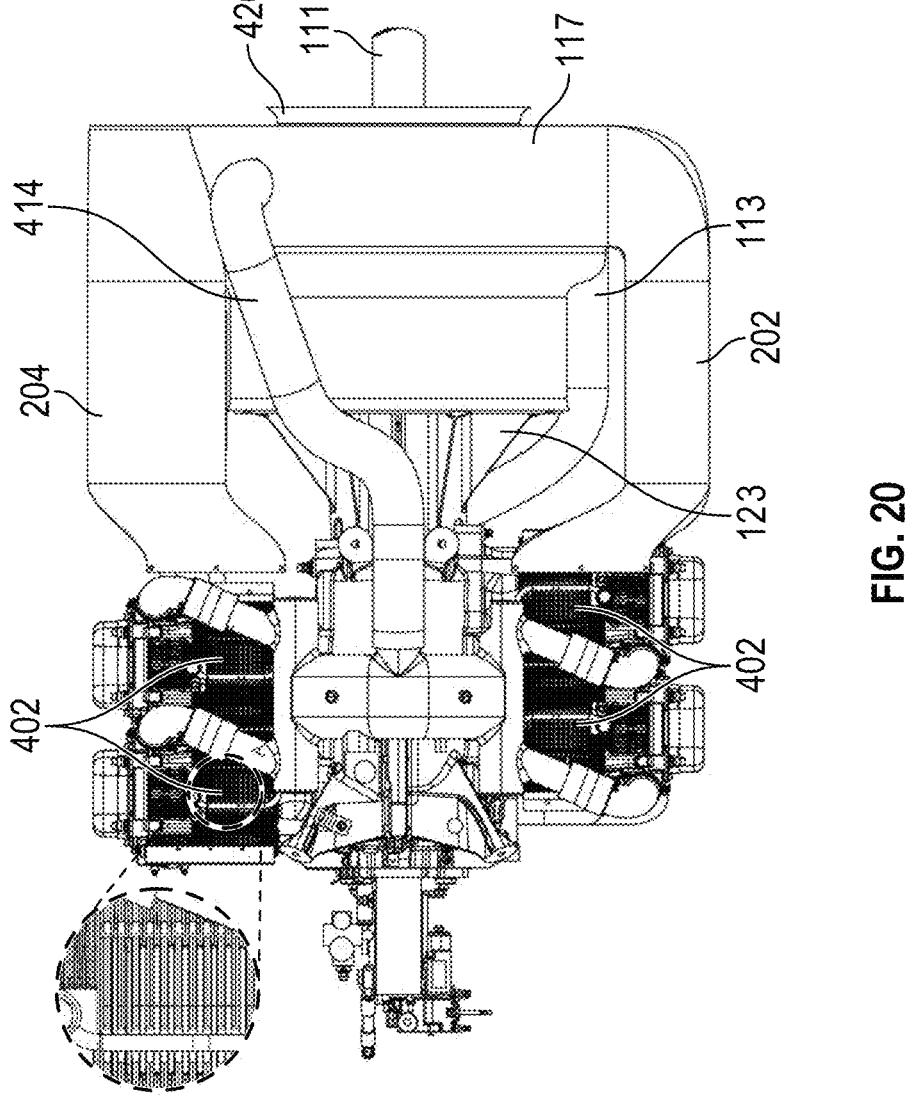
FIG. 20 illustrates an alternate view of the example hybrid powerplant of FIG. 17 showing detail of cooling fins of an engine in accordance with an illustrative embodiment.
Figure 21:
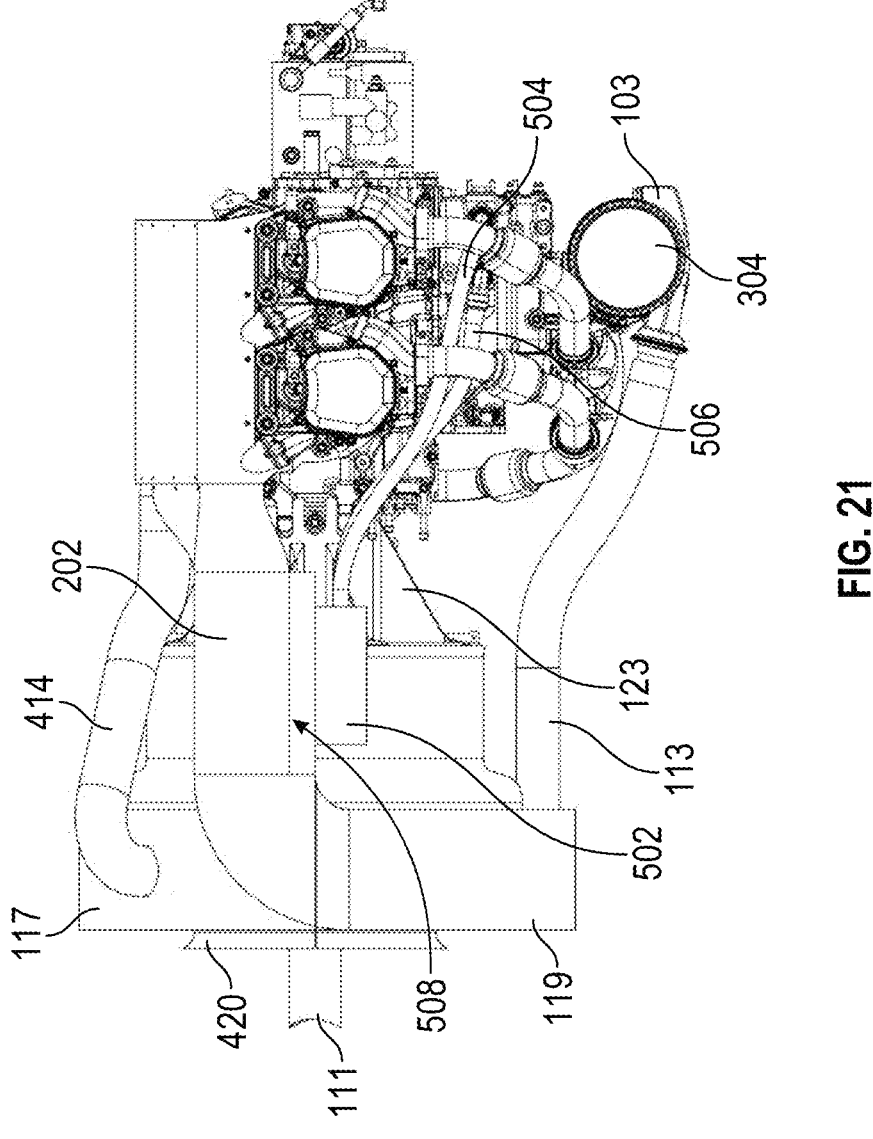
FIG. 21 illustrates a side view of the example hybrid powerplant of FIG. 17 with a cooling system in accordance with an illustrative embodiment.

FIG. 17 illustrates a top view of an example hybrid powerplant with a cooling system in accordance with an illustrative embodiment. FIG. 18 illustrates a cross-sectional view taken along line A-A of FIG. 17 showing the example hybrid powerplant of FIG. 17 in accordance with an illustrative embodiment. FIG. 19 illustrates a cross-sectional view taken along line B-B of FIG. 18 showing the example hybrid powerplant of FIG. 17 in accordance with an illustrative embodiment. FIG. 20 illustrates an alternate view of the example hybrid powerplant of FIG. 17 showing detail of cooling fins of an engine in accordance with an illustrative embodiment. FIG. 21 illustrates a side view of the example hybrid powerplant of FIG. 17 with a cooling system in accordance with an illustrative embodiment.

In particular, FIGS. 17-21 depict an engine 105, where a shaft 111 powers a fan wheel 302 to bring air through a blower intake 420. That air is passed through a top volute 117, a bottom volute 119, a right duct 202, and a left duct 204. The fan wheel 302 may also be surrounded by a charge-air cooler 109, which receives heated charge air from a turbocharger 103 inlet through a duct 113 and outputs cooled charge air through a duct 414 to the engine 105, and cooled by air provided by rotation of the fan wheel 302. FIG. 19 further shows an engine intake filter 304 and an engine exhaust 306. FIG. 19 also shows a fan wheel fin 308 of the fan wheel 302.

A motor/generator mount 123 also mounts a motor generator 107 to the engine 105. The right duct 202 and left duct 204 also provide air to engine baffling 206 to cool the engine 105. FIG. 20 shows the engine cylinder fins 402 used to cool the engine with cool air from the ducts 202 and 204. FIG. 21 further depicts an engine oil cooler 502 that may receive air via the duct 202 to cool oil for the engine, which is fed to the engine through feed 504 and returned to the cooler via a return 506. A portion of the duct 202 may also be separated with a duct separator 508 so that some air is directed to the engine cylinders while other air is directed to the oil cooler 502.

In various embodiments, different aspects of a cooling system may also be controlled to ensure components of a flexible architecture or powerplant are at a desired temperature or within a desired temperature range. An ambient environmental temperature and/or temperatures at various locations within the cooling systems may be sensed and used to control various aspects of the cooling system. Temperature sensors may be located on, in, or near any of the components of the cooling systems or flexible architectures described herein. Temperature sensors may further be located on, in, or near an enclosure of the cooling system and flexible architecture, for example. These temperature sensors may be used to determine actual or approximate temperatures of various components as well as ambient air temperatures in an enclosure or outside of an enclosure. As just one example, cylinders of a piston engine may be air cooled by a cooling system as described herein. If an environment (e.g., ambient temperature) is cold, for example, the exterior of a cylinder may get too cold with significant air cooling while heat from combustion inside the cylinder may cause a piston therein to expand (while the cylinder may conversely contract due to significant air cooling). Accordingly, to avoid having a piston and a cylinder bore of an engine seize up due to temperature differences, a cooling system may be controlled to limit the amount of air used to cool the cylinders of the engine. As such, various embodiments may include one or more throttles, valves, and/or restrictors to prevent some or all air flow from a cooling system from being used to cool an aspect of a powerplant—here the cylinders of an engine. The throttles, valves, and/or restrictors may be placed in various ductwork of a cooling system as described herein or otherwise located in a fluid path between a blower/fan an the component being cooled to limit air flow. The controllers/processors of FIG. 2A or 2B, for example, may be used to send electrical control signals for control of a throttle or valve so that airflow may be limited to particular components as desired (either by fully turning off airflow through a duct for a component or limiting airflow somewhere between fully open and fully closed). Therefore, control such as closed loop control may be achieved for controlling how much airflow and cooling reaches a particular component of a powerplant. Various types of throttles, valves, and/or restrictors may be used, such as controllable butterfly throttles, slide throttles, barrel throttles, etc. The control may also be manually, such as based on a season or average temperature of an environment. For example, semi-permanently installed restrictor discs with different sized openings could be installed in and changed out of a duct to control how much airflow reaches a particular component based on season, geography, etc. (which all may influence average temperature).

FIG. 22A is a flow chart illustrating an example method 2200 for controlling a cooling system in accordance with an illustrative embodiment. At 2202, temperature information is received at a controller or processor from a temperature sensor, where the temperature sensor is installed at, in, or near a component of a powerplant that is desired to be cooled. At 2204, ambient temperature information is received at the processor or controller, for example from a temperature sensor in, on, or near an enclosure in which a flexible architecture is enclosed.

At an operation 2206, the processor or controller determines a level of cooling desired for the powerplant component based on at least one of the temperature associated with the powerplant component or the ambient temperature. Based on that determination, at 2208, the processor may output a signal to an electrically controlled throttle or valve mechanism (or other component of a cooling system capable of controlling or limiting airflow) to control the level of cooling delivered to the powerplant component. For example, instead of or in addition to using a throttle or valve mechanism to control airflow to a specific component of a powerplant, the processor or controller may also control an aspect of the cooling system that affects how much airflow is actually generated by a fan, impeller, or blower of the cooling system. For example as shown in FIG. 22B, a control signal may be sent to a gearbox, pulley, and/or torque converter 2212 attached to fan, impeller, or blower shaft 2214 to cause a different gearing ratio to be used between a shaft 2210 delivering power to the fan, impeller, or blower, thereby causing the fan, impeller, or blower to rotate at a different RPM and thereby control airflow of the cooling system. FIG. 22B is a diagram illustrating an example shaft 2210 indirectly connected to a fan, impeller, or blower shaft 2214 via a gearbox, pulley and/or torque converter 2212 in accordance with an illustrative embodiment.

Figures 28A, 28B:
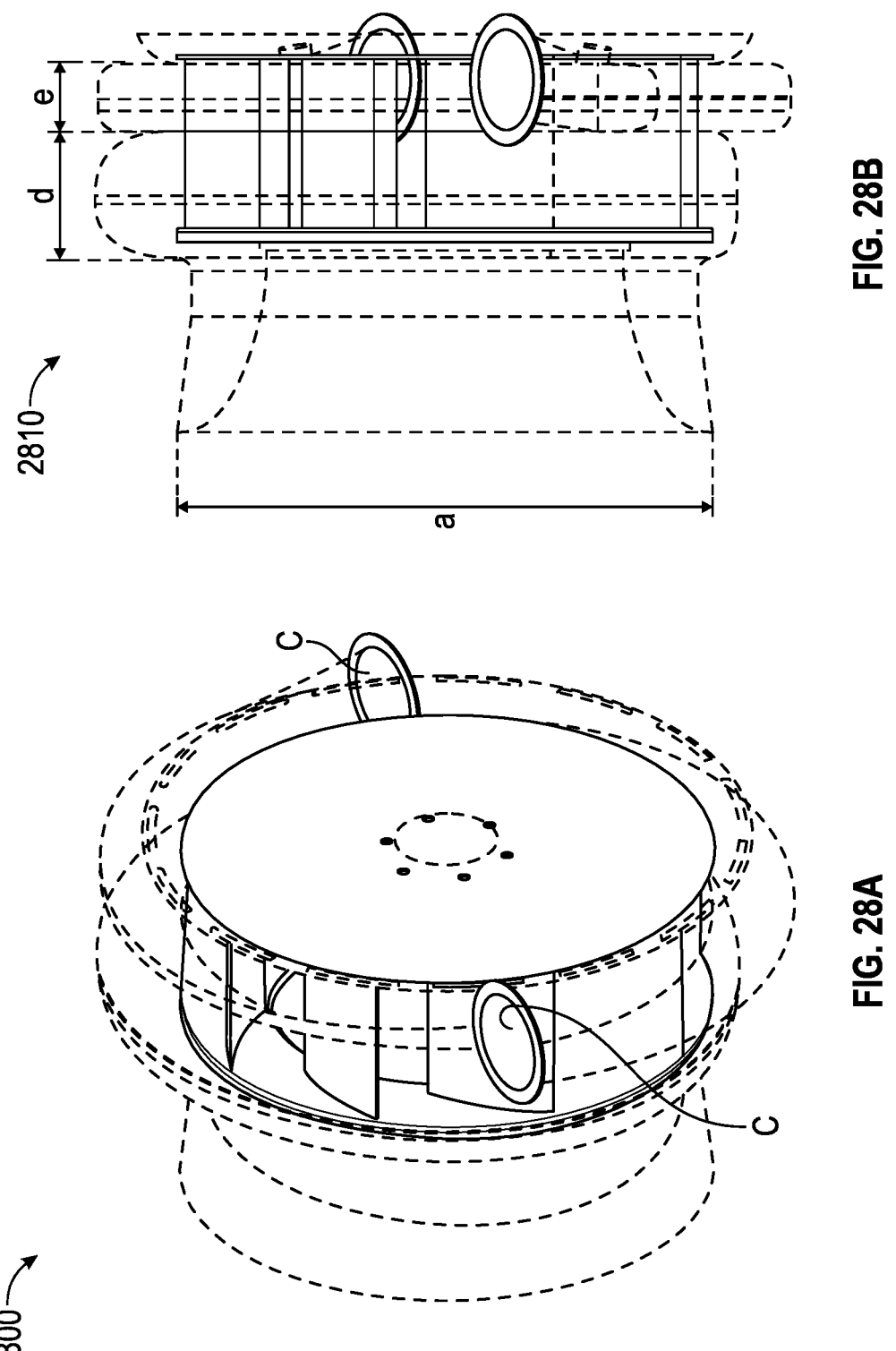
FIGS. 28A-C show portions of a cooling system including cross-sections of ductwork of the cooling system in accordance with an illustrative embodiment.
Figure 28C:
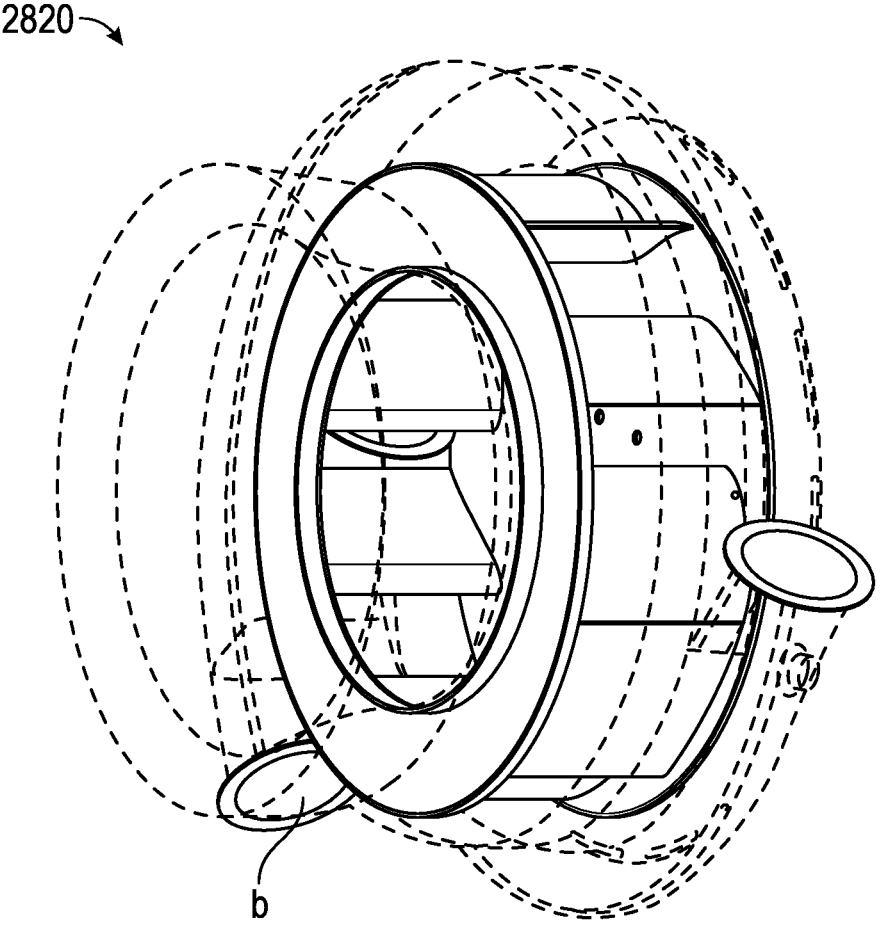
Figures 29A, 29B:
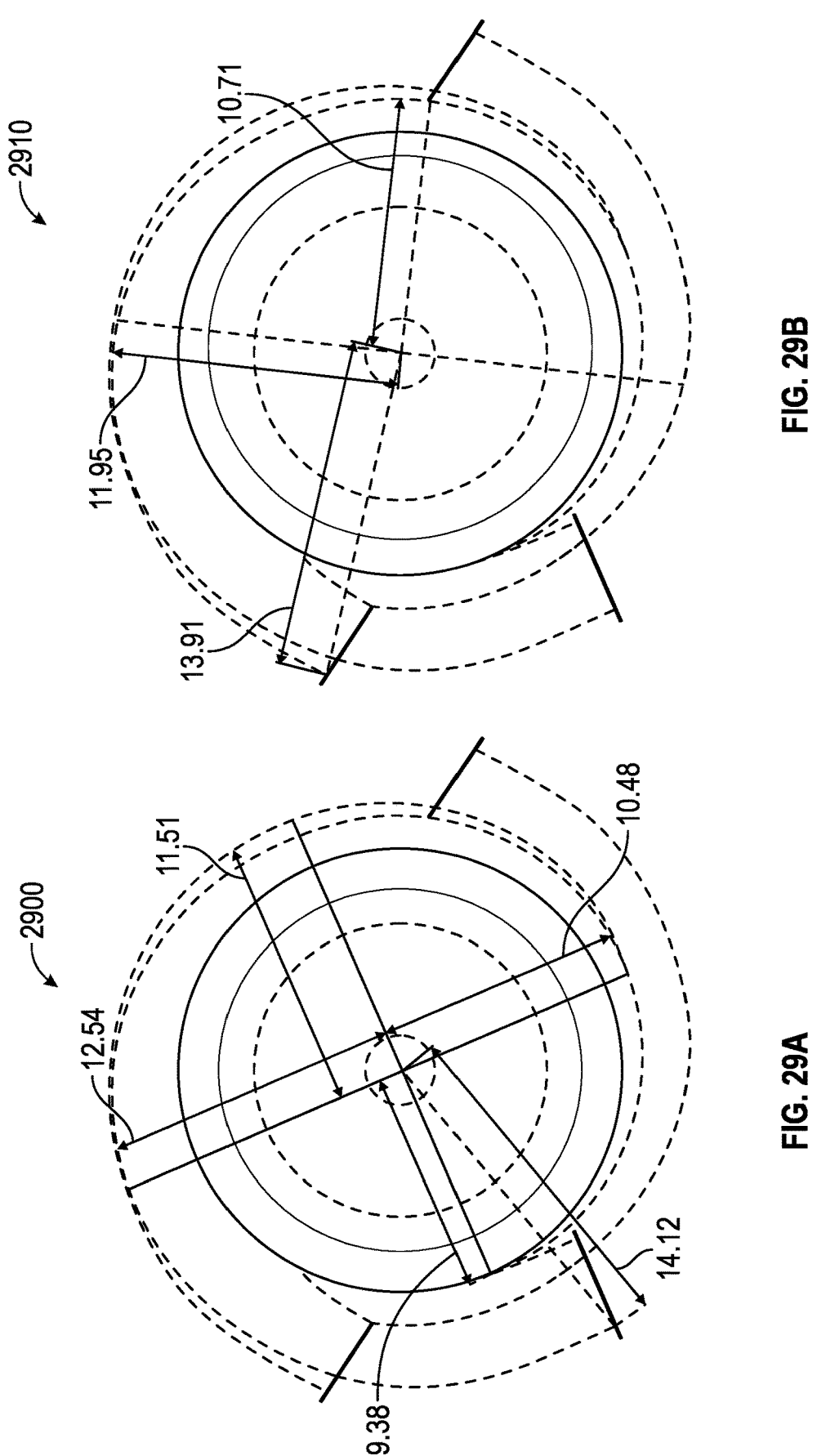
FIGS. 29A and 29B show additional portions of a cooling system including additional detail of ductwork of the cooling system in accordance with an illustrative embodiment.

FIGS. 28A-C show portions of a cooling system including cross-sections of ductwork of the cooling system in accordance with an illustrative embodiment. FIGS. 29A and 29B show additional portions of a cooling system including additional detail of ductwork of the cooling system in accordance with an illustrative embodiment. In particular, FIGS. 28A-C and FIGS. 29A and 29B demonstrate examples of sizing and/or possible proportions for ductwork of an example cooling system. Although various specific sizes of components are discussed below, these sizes are not limiting and other sizes outside of these ranges or values may be used. The sizes below, for example may be used when the cooling system is designed for a turbocharged 5.0 liter diesel compression-ignition piston combustion engine using a flat-4 arrangement, oil cooled cylinder heads, and air-cooled cylinder jugs.

FIG. 28A shows a view 2800 showing a cross-section c of two ducts going to cool air cylinders of an engine. Each of the two ducts may have an internal area through which air may flow of 9.62 inches squared (in $2$). In various embodiments, the area of each one of the ducts may be anywhere from 6 to 15 in$^2$, including 6 in$^2$, 6.5 in$^2$, 7 in$^2$, 7.5 in$^2$, 8 in$^2$, 8.5 in$^2$, 9 in$^2$, 9.5 in$^2$, 10 in$^2$, 10.5 in$^2$, 11 in$^2$, 11.5 in$^2$, 12 in$^2$, 12.5 in$^2$, 13 in$^2$, 13.5 in$^2$, 14 in$^2$, 14.5 in$^2$, or 15 in$^2$. FIG. 28B shows a view 2810 demonstrating a fan wheel diameter a, which may for example be 18.75 inches (in) in an example. In various embodiments, the fan diameter may also be anywhere from 12 to 25 in, such as 12 in, 13 in, 14 in, 15 in, 16 in, 17 in, 18 in, 19 in, 20 in, 21 in, 22 in, 23 in, 24 in, 25 in. FIG. 28B further shows dimensions d and e, where d is an axial length of the fan, impeller, or blower that directs air to one or more heat exchangers of a flexible architecture, and e is an axial length of the fan, impeller, or blower that directs air toward the air cooling cylinders (e.g., through the ducts c shown in FIG. 28A). Different ratios of what proportion of air may be used to direct air to different components of a flexible architecture. In the example of FIG. 28B, 60% of the axial length d is associated with the heat exchangers (so approximately 60% of the air moved by the fan, impeller, or blower is directed toward heat exchangers of the system), while 40% of the air moved is directed to the cylinder cooling. In different embodiments, different proportions are possible, such that anywhere from 20-80% of the air is directed toward heat exchangers and anywhere from 20-80% of the air is directed toward the cylinder cooling. In various embodiments, different splits are possible, such as 20/80, 25/75, 30/70, 35/65, 40/60, 45/55, 50/50, 55/45, 60/40, 65/35, 70/30, 75/25, or 80/20. FIG. 28C shows a view 2820 where a cross-section b of a duct that directs air toward one or more heat exchangers is shown. The duct b may have an internal area through which air may flow of 15.8 inches squared (in$^2$). In various embodiments, the area of each one of the ducts may be anywhere from 8 to 24 in$^2$, including 8 in$^2$, 8.5 in$^2$, 9 in$^2$, 9.5 in$^2$, 10 in$^2$, 10.5 in$^2$, 11 in$^2$, 11.5 in$^2$, 12 in$^2$, 12.5 in$^2$, 13 in$^2$, 13.5 in$^2$, 14 in$^2$, 14.5 in$^2$, 15 in$^2$, 15.5 in$^2$, 16 in$^2$, 16.5 in$^2$, 17 in$^2$, 17.5 in$^2$, 18 in$^2$, 18.5 in$^2$, 19 in$^2$, 19.5 in$^2$, 20 in$^2$, 20.5 in$^2$, 21 in$^2$, 21.5 in$^2$, 22 in$^2$, 22.5 in$^2$, 23 in$^2$, 23.5 in$^2$, or 24 in$^2$.

FIG. 29A shows a side view 2900 of ducts around the fan, impeller, or blower and example dimensions thereof. FIG. 29B shows a side view 2910 of ducts around the fan, impeller, or blower and example dimensions thereof. In FIG. 29A, dimensions associated with a duct directing air to one or more heat exchangers are shown. In FIG. 29B, dimensions associated with a duct directing air to cylinders of an engine are shown. Another duct similar to the dimensions of FIG. 29B may also be included on an opposite side of the fan, impeller, or blower as described herein. The dimensions shown in FIGS. 29A and 29B are in inches relate to an axis of the fan, impeller, or blower. While FIGS. 29A and 29B show example dimensions, other dimensions may be used in various embodiments. For example, each of the dimensions shown may vary within any range of plus or minus 6 in, 5.5 in, 5 in, 4.5 in, 4 in, 3.5 in, 3 in, 2.5 in, 2 in, 1.5 in, 1 in, or 0.5 in of the dimensions shown.

Figure 30:
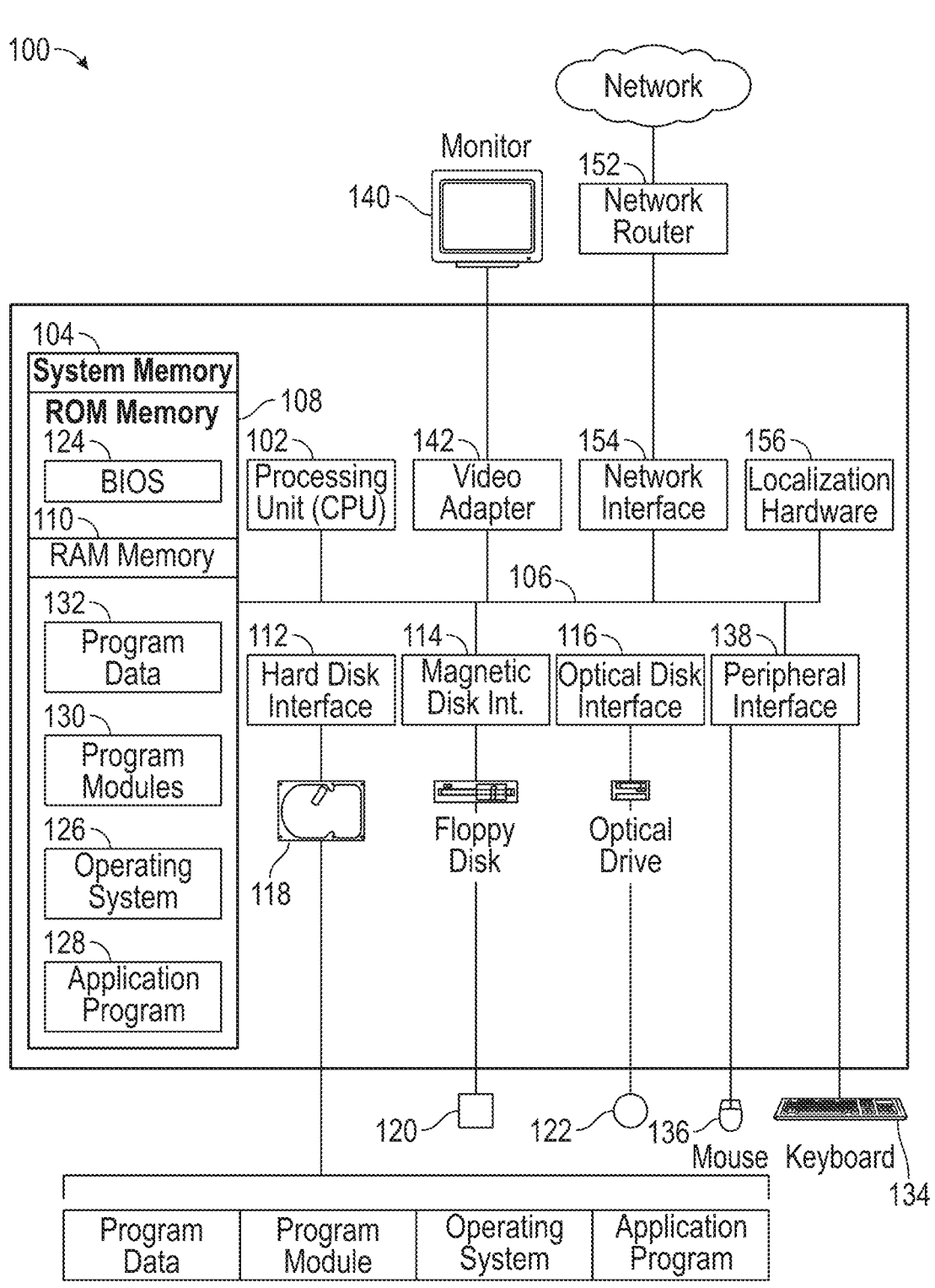
FIG. 30 is a diagrammatic view of an example of a computing environment, in accordance with an illustrative embodiment.

FIG. 30 is a diagrammatic view of an example of a computing environment that includes a general-purpose computing system environment 100, such as a desktop computer, laptop, smartphone, tablet, or any other such device having the ability to execute instructions, such as those stored within a non-transient, computer-readable medium. Various computing devices as disclosed herein (e.g., the processor(s)/controller(s) 205, the main aircraft controller 220, the processor(s)/controller(s) 280, or any other computing device in communication with those controllers that may be part of other components of an aircraft or control system of an aircraft—whether on board the aircraft or remote from the aircraft) may be similar to the computing system 100 or may include some components of the computing system 100. Furthermore, while described and illustrated in the context of a single computing system 100, those skilled in the art will also appreciate that the various tasks described hereinafter may be practiced in a distributed environment having multiple computing systems 100 linked via a local or wide-area network in which the executable instructions may be associated with and/or executed by one or more of multiple computing systems 100.

In its most basic configuration, computing system environment 100 typically includes at least one processing unit 102 and at least one memory 104, which may be linked via a bus 106. Depending on the exact configuration and type of computing system environment, memory 104 may be volatile (such as RAM 110), non-volatile (such as ROM 108, flash memory, etc.) or some combination of the two. Computing system environment 100 may have additional features and/or functionality. For example, computing system environment 100 may also include additional storage (removable and/or non-removable) including, but not limited to, magnetic or optical disks, tape drives and/or flash drives. Such additional memory devices may be made accessible to the computing system environment 100 by means of, for example, a hard disk drive interface 112, a magnetic disk drive interface 114, and/or an optical disk drive interface 116. As will be understood, these devices, which would be linked to the system bus 306, respectively, allow for reading from and writing to a hard disk 118, reading from or writing to a removable magnetic disk 120, and/or for reading from or writing to a removable optical disk 122, such as a CD/DVD ROM or other optical media. The drive interfaces and their associated computer-readable media allow for the nonvolatile storage of computer readable instructions, data structures, program modules and other data for the computing system environment 100. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nanodrives, memory sticks, other read/write and/or read-only memories and/or any other method or technology for storage of information such as computer readable instructions, data structures, program modules or other data. Any such computer storage media may be part of computing system environment 100.

A number of program modules may be stored in one or more of the memory/media devices. For example, a basic input/output system (BIOS) 124, containing the basic routines that help to transfer information between elements within the computing system environment 100, such as during start-up, may be stored in ROM 108. Similarly, RAM 110, hard drive 118, and/or peripheral memory devices may be used to store computer executable instructions comprising an operating system 126, one or more applications programs 128 (which may include the functionality disclosed herein, for example), other program modules 130, and/or program data 122. Still further, computer-executable instructions may be downloaded to the computing environment 100 as needed, for example, via a network connection.

An end-user may enter commands and information into the computing system environment 100 through input devices such as a keyboard 134 and/or a pointing device 136. While not illustrated, other input devices may include a microphone, a joystick, a game pad, a scanner, etc. These and other input devices would typically be connected to the processing unit 102 by means of a peripheral interface 138 which, in turn, would be coupled to bus 106. Input devices may be directly or indirectly connected to processor 102 via interfaces such as, for example, a parallel port, game port, firewire, or a universal serial bus (USB). To view information from the computing system environment 100, a monitor 140 or other type of display device may also be connected to bus 106 via an interface, such as via video adapter 132. In addition to the monitor 140, the computing system environment 100 may also include other peripheral output devices, not shown, such as speakers and printers.

The computing system environment 100 may also utilize logical connections to one or more computing system environments. Communications between the computing system environment 100 and the remote computing system environment may be exchanged via a further processing device, such a network router 152, that is responsible for network routing. Communications with the network router 152 may be performed via a network interface component 154. Thus, within such a networked environment, e.g., the Internet, World Wide Web, LAN, or other like type of wired or wireless network, it will be appreciated that program modules depicted relative to the computing system environment 100, or portions thereof, may be stored in the memory storage device(s) of the computing system environment 100.

The computing system environment 100 may also include localization hardware 186 for determining a location of the computing system environment 100. In some instances, the localization hardware 156 may include, for example only, a GPS antenna, an RFID chip or reader, a WiFi antenna, or other computing hardware that may be used to capture or transmit signals that may be used to determine the location of the computing system environment 100.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various presently disclosed embodiments.

It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

In an illustrative embodiment, any of the operations described herein may be implemented at least in part as computer-readable instructions stored on a computer-readable medium or memory. Upon execution of the computer-readable instructions by a processor, the computer-readable instructions may cause a computing device to perform the operations.

The foregoing description of illustrative embodiments has been presented for purposes of illustration and of description. It is not intended to be exhaustive or limiting with respect to the precise form disclosed, and modifications and variations are possible in light of the above teachings or from practice of the disclosed embodiments. It is intended that the scope of the invention be defined by the claims appended hereto and their equivalents.

What is claimed is:

1. An aerospace hybrid powertrain system comprising:
a power shaft;
an engine configured to output mechanical power via rotation of the power shaft;
an electric machine having the power shaft therein or passing therethrough, wherein the electric machine is configured to generate electrical power based on the rotation of the power shaft, wherein the electrical power is output to a propulsion device of an aircraft; and a fan, impeller, or blower connected to the power shaft and configured to direct air toward:

at least one component associated with the engine; and at least one component associated with the electric machine.

2. The aerospace hybrid powertrain system of claim 1, wherein:

the electric machine is configured to receive power via an electrical input/output from an electric energy storage device to drive the power shaft; and the electric machine is configured to output power via the electrical input/output to an electric motor and/or the electric energy storage device upon rotation of the power shaft by the engine, wherein the electric machine is cooled by cooling elements as a result of the air directed by the fan, impeller, or blower, wherein the cooling elements comprises at least one of a heat exchanger or a finned heat sink.

3. The aerospace hybrid powertrain system of claim 2, wherein 50 to 100 percent of energy output by the power shaft, while the engine is driving the power shaft, is output to the electric machine.

4. The aerospace hybrid powertrain system of claim 1, wherein the engine comprises air cooled cylinders cooled as a result of the air directed by the fan, impeller, or blower.

5. The aerospace hybrid powertrain system of claim 1, wherein the engine uses liquid fuel comprising any of diesel fuel, jet A fuel, gasoline, hydrogen, biofuel, a synthetic fuel substitute.

6. The aerospace hybrid powertrain system of claim 1, wherein the fan, impeller, or blower is:

directly coupled to the power shaft such that the fan, impeller, or blower is directly driven by the power shaft; or indirectly coupled to the power shaft via a gearbox, pulley, or torque converter.

7. The aerospace hybrid powertrain system of claim 1, wherein the fan, impeller, or blower is a first fan, impeller, or blower, and further wherein the system comprises a second fan, impeller, or blower connected to the power shaft.

8. The aerospace hybrid powertrain system of claim 1, further comprising at least two air ducts, wherein the at least two air ducts are configured to receive air from the fan, impeller, or blower and direct air to cool the at least one component associated with the engine and the at least one component associated with the electric machine.

9. The aerospace hybrid powertrain system of claim 8, wherein a first duct of the at least two air ducts is configured to direct air to cool cylinders of the engine.

10. The aerospace hybrid powertrain system of claim 8, wherein a first duct of the at least two air ducts is configured to direct air to a cooler for engine oil of the engine.

11. The aerospace hybrid powertrain system of claim 8, wherein a first duct of the at least two air ducts is configured to direct air to an engine intercooler or charge-air cooler.

12. The aerospace hybrid powertrain system of claim 8, wherein a first duct of the at least two air ducts is a shroud and is configured to direct air to cool the electric machine or related components thereof.

13. The aerospace hybrid powertrain system of claim 1, wherein the engine is a piston engine, a rotary engine, a turboshaft engine, a turboprop engine, a turbofan engine, or a turbojet engine.

14. The aerospace hybrid powertrain system of claim 1, wherein the electric machine is configured to output alternating current (AC) power, and wherein the aerospace hybrid powertrain system further comprises:

a direct current (DC) power output; and power electronics that convert the AC power output of the electric machine into direct current (DC) power, wherein the DC power is output by the aerospace hybrid powertrain system via the DC power output.

15. The aerospace hybrid powertrain system of claim 14, wherein the DC power output is configured to connect to a direct current (DC) bus of an aircraft, and wherein power available on the DC bus is configured to power a propulsion component of an aircraft.

16. An aerospace hybrid powertrain system comprising:

a power shaft;

an engine configured to rotate the power shaft;

an electric machine having the power shaft therein or passing therethrough, wherein the electric machine is configured to generate electrical power based on rotation of the power shaft, wherein the electrical power is output to a propulsion device of an aircraft; and a fan, impeller, or blower connected to a fan, impeller, or blower shaft, wherein the fan, impeller, or blower is configured to direct air toward:

at least one component associated with the engine; and at least one component associated with the electric machine, wherein the fan, impeller, or blower shaft is indirectly provided with mechanical power from the power shaft.

17. The aerospace hybrid powertrain system of claim 16, wherein the power shaft and the fan, impeller, or blower shaft are connected by a gearbox or torque converter, such that the fan, impeller, or blower shaft are permitted to rotate at a different rotation per minute (RPM) than the power shaft.

18. The aerospace hybrid powertrain system of claim 17, further comprising a controller configured to adjust the gearbox or torque converter to adjust an RPM of the fan, impeller, or blower shaft between a first RPM and a second RPM.

19. The aerospace hybrid powertrain system of claim 16, wherein the engine is a piston engine, a rotary engine, a turboshaft engine, a turboprop engine, a turbofan engine, or a turbojet engine.

20. The aerospace hybrid powertrain system of claim 1, wherein the fan, impeller, or blower takes in the ambient air on a first side of the fan, impeller, or blower; wherein the electric machine and the engine are positioned on a second side of the fan, impeller or blower; wherein the first side is opposite the second side; and wherein the fan, impeller, or blower is further configured to intake the ambient air from the first side and direct the ambient air out of the second side toward both of the electric machine and the engine.

21. The aerospace hybrid powertrain system of claim 1, wherein the at least one component associated with the engine or the at least one component associated with the electric machine comprises at least one of a heat exchanger or a finned heat sink configured to cool the at least one component associated with the engine or the at least one component associated with the electric machine.

22. The aerospace hybrid powertrain system of claim 1, wherein the at least one component associated with the electric machine comprises power electronics that convert an alternating current (AC) power output of the electric machine into direct current (DC) power.

23. The aerospace hybrid powertrain system of claim 22, wherein the power electronics comprises at least one inverter.

24. The aerospace hybrid powertrain system of claim 22, wherein the power electronics are cooled by air cooling from the air moved by the fan, impeller, or blower or by liquid cooling via a heat exchanger provided with the air from the fan, impeller, or blower.

25. The aerospace hybrid powertrain system of claim 1, wherein the fan, impeller, or blower is positioned on a first side of the electric machine and the engine is positioned on a second side of the electric machine opposite the first side.

26. An aerospace hybrid powertrain system comprising:
a power shaft;
an engine configured to rotate the power shaft;
an electric machine having the power shaft therein or passing therethrough, wherein the electric machine is configured to generate electrical power based on rotation of the power shaft, wherein the electrical power is output to a propulsion device of an aircraft; and
a fan, impeller, or blower connected to the power shaft and configured to direct air toward:
components of at least one of the engine or the electric machine, and
cooling elements comprising a heat exchanger configured to cool the components of at least one of the engine or the electric machine.

27. The aerospace hybrid powertrain system of claim 26, wherein the power shaft is further configured to provide a mechanical power output to a propulsion mechanism of the aircraft.

28. The aerospace hybrid powertrain system of claim 26, wherein the electric machine is configured to output alternating current (AC) power, and wherein the aerospace hybrid powertrain system further comprises power electronics configured to convert the AC into direct current (DC) power.

\* \* \* \* \*